US010999983B2

(12) United States Patent
Walker et al.

(10) Patent No.: US 10,999,983 B2
(45) Date of Patent: May 11, 2021

(54) VOLUMETRIC BUDGET BASED IRRIGATION CONTROL

(71) Applicant: Rain Bird Corporation, Azusa, CA (US)

(72) Inventors: Ryan L. Walker, San Diego, CA (US); Harvey J. Nickerson, El Cajon, CA (US); Blake Snider, Allen, TX (US)

(73) Assignee: Rain Bird Corporation, Azusa, CA (US)

( * ) Notice: Subject to any disclaimer, the term of this patent is extended or adjusted under 35 U.S.C. 154(b) by 0 days.

(21) Appl. No.: 16/812,040

(22) Filed: Mar. 6, 2020

(65) Prior Publication Data

US 2020/0205358 A1   Jul. 2, 2020

Related U.S. Application Data

(63) Continuation of application No. 16/218,202, filed on Dec. 12, 2018, now Pat. No. 10,582,674, which is a
(Continued)

(51) Int. Cl.
  *A01G 25/16*   (2006.01)
  *G05B 13/02*   (2006.01)

(52) U.S. Cl.
  CPC ........... *A01G 25/16* (2013.01); *G05B 13/021* (2013.01)

(58) Field of Classification Search
  CPC .............................. A01G 25/16; G05B 13/021
  See application file for complete search history.

(56) References Cited

U.S. PATENT DOCUMENTS

| 4,176,395 A | 11/1979 | Evelyn-Veere |
| 5,023,787 A | 6/1991 | Evelyn-Veere |

(Continued)

FOREIGN PATENT DOCUMENTS

| JP | 2015073107 A | * 4/2015 | ........... H01L 21/563 |
| WO | 2001095277 | 12/2001 | |

(Continued)

OTHER PUBLICATIONS

EPO; App. No. 10822643.2; Extended European Search Report dated Nov. 17, 2014.
PCT; International Search Report corresponding to International Application No. PCT/US2007/068242; dated Jul. 28, 2008; 4 Pages.
PCT; International Search Report corresponding to International Application No. PCT/US2010/051699; dated Nov. 30, 2010; 2 Pages.

(Continued)

*Primary Examiner* — Laura M Menz
(74) *Attorney, Agent, or Firm* — Fitch, Even, Tabin & Flannery LLP

(57) ABSTRACT

The present embodiments provide systems, processes and/or methods of controlling irrigation. In some embodiments, methods are provided that receive (4112) water usage information corresponding to a first volumetric water usage at a site location having an irrigation controller (130), wherein the first volumetric water usage corresponds to volumetric water usage from a beginning of a budget period of time to a first time within the budget period of time; determine (4114) automatically whether a volumetric water budget at the site location will be met for the budget period of time based on at least the first volumetric water usage, the volumetric water budget corresponding to a specified volume of water for use during the budget period of time; determine (4116) automatically, in the event the volumetric water budget will not be met, an adjustment to the irrigation by the irrigation controller; and output (4118) signaling to effect the adjustment.

21 Claims, 37 Drawing Sheets

Related U.S. Application Data continuation of application No. 14/989,771, filed on Jan. 6, 2016, now Pat. No. 10,188,050, which is a continuation of application No. 13/500,882, filed as application No. PCT/US2010/051699 on Oct. 6, 2010, now Pat. No. 9,258,952.

(60) Provisional application No. 61/322,710, filed on Apr. 9, 2010, provisional application No. 61/261,685, filed on Nov. 16, 2009, provisional application No. 61/249,519, filed on Oct. 7, 2009.

(56) References Cited

U.S. PATENT DOCUMENTS

| | | | |
|---|---|---|---|
| 5,097,861 A | 3/1992 | Hopkins | |
| 5,229,937 A | 7/1993 | Evelyn-Veere | |
| 5,251,153 A | 10/1993 | Nielsen | |
| 5,479,339 A | 12/1995 | Miller | |
| 5,696,671 A | 12/1997 | Oliver | |
| 6,098,898 A | 8/2000 | Storch | |
| 6,314,340 B1 | 11/2001 | Mecham | |
| 6,778,099 B1 | 8/2004 | Meyer | |
| 6,944,523 B2 | 9/2005 | Addink | |
| 6,947,854 B2 | 9/2005 | Swarztrauber | |
| 6,963,808 B1 | 11/2005 | Addink | |
| 6,978,794 B2 | 12/2005 | Dukes | |
| 7,012,546 B1 | 3/2006 | Zigdon | |
| 7,050,887 B2 | 5/2006 | Alvarez | |
| 7,058,478 B2 | 6/2006 | Alexanian | |
| 7,058,479 B2 | 6/2006 | Miller | |
| 7,225,057 B2 | 5/2007 | Froman | |
| 7,266,428 B2 | 9/2007 | Alexanian | |
| 7,317,972 B2 | 1/2008 | Addink | |
| 7,330,796 B2 | 2/2008 | Addink | |
| 7,412,303 B1 | 8/2008 | Porter | |
| 7,707,125 B2* | 4/2010 | Haji-Valizadeh | E03B 7/02 705/413 |
| 7,711,454 B2 | 5/2010 | Addink | |
| 7,983,574 B2* | 7/2011 | Kolb | G03G 15/553 399/24 |
| 8,072,059 B2* | 12/2011 | Shim, II | H01L 21/568 257/698 |
| 8,466,543 B2* | 6/2013 | Fleischman | H01L 24/06 257/686 |
| 8,878,353 B2* | 11/2014 | Haba | H05K 1/11 257/686 |
| 9,258,952 B2* | 2/2016 | Walker | A01G 25/16 |
| 9,263,394 B2* | 2/2016 | Uzoh | H01L 21/76898 |
| 9,379,074 B2* | 6/2016 | Uzoh | H01L 23/49811 |
| 9,379,078 B2* | 6/2016 | Yu | H01L 24/13 |
| 9,496,152 B2* | 11/2016 | Cho | H01L 21/568 |
| 9,506,785 B2* | 11/2016 | Turk | G01F 1/065 |
| 9,583,456 B2* | 2/2017 | Uzoh | H01L 28/20 |
| 9,653,433 B2* | 5/2017 | Yu | H01L 21/31053 |
| 9,728,527 B2* | 8/2017 | Uzoh | H01L 24/13 |
| 9,735,084 B2* | 8/2017 | Katkar | H01L 23/36 |
| 9,812,402 B2* | 11/2017 | Awujoola | H01L 24/48 |
| 10,085,392 B2* | 10/2018 | Neesen | G06F 3/0484 |
| 10,115,678 B2* | 10/2018 | Awujoola | H01L 24/76 |
| 10,157,884 B2* | 12/2018 | Yu | H01L 25/0657 |
| 10,188,050 B2* | 1/2019 | Walker | G05B 13/021 |
| 10,381,326 B2* | 8/2019 | Woychik | H01L 21/6835 |
| 10,490,528 B2* | 11/2019 | Prabhu | H01L 24/44 |
| 10,582,674 B2 | 3/2020 | Walker | |
| 2001/0049563 A1 | 12/2001 | Addink | |
| 2005/0171646 A1 | 8/2005 | Miller | |
| 2006/0009928 A1 | 1/2006 | Addink | |
| 2006/0155489 A1 | 7/2006 | Addink | |
| 2006/0184285 A1 | 8/2006 | Evelyn-Veere | |
| 2006/0271297 A1* | 11/2006 | Repelli | G01W 1/10 702/3 |
| 2006/0272830 A1* | 12/2006 | Fima | G01M 3/2807 169/16 |
| 2007/0140274 A1 | 6/2007 | Battistutto | |
| 2007/0203860 A1 | 8/2007 | Golden | |
| 2007/0293990 A1 | 12/2007 | Alexanain | |
| 2008/0001595 A1 | 1/2008 | Ha | |
| 2008/0033775 A1* | 2/2008 | Dawson | G06Q 10/0635 705/7.28 |
| 2008/0119948 A1 | 5/2008 | O'Connor | |
| 2008/0154437 A1 | 6/2008 | Alexanian | |
| 2008/0288116 A1 | 11/2008 | Nickerson | |
| 2008/0302172 A1 | 12/2008 | Kates | |
| 2009/0008471 A1 | 1/2009 | Wilson | |
| 2009/0008472 A1 | 1/2009 | Wilson | |
| 2009/0043427 A1 | 2/2009 | Addink | |
| 2009/0099701 A1* | 4/2009 | Li | A01G 25/16 700/284 |
| 2009/0138105 A1 | 5/2009 | Crawford | |
| 2009/0236752 A1* | 9/2009 | Lee | H01L 24/97 257/777 |
| 2009/0271045 A1* | 10/2009 | Savelle, Jr. | A01G 25/167 700/284 |
| 2009/0309755 A1 | 12/2009 | Williamson | |
| 2010/0030389 A1* | 2/2010 | Palmer | H05B 47/16 700/284 |
| 2010/0049563 A1 | 2/2010 | Lopez Seco | |
| 2010/0246152 A1* | 9/2010 | Lin | H01L 24/92 361/783 |
| 2010/0268391 A1* | 10/2010 | Anderson | A01G 25/167 700/284 |
| 2011/0054642 A1* | 3/2011 | Bondar | G05B 15/02 700/29 |
| 2011/0077785 A1* | 3/2011 | Nickerson | G05B 15/02 700/284 |
| 2012/0193785 A1* | 8/2012 | Lin | H01L 24/97 257/737 |
| 2012/0239211 A1* | 9/2012 | Walker | A01G 25/16 700/284 |
| 2013/0001797 A1* | 1/2013 | Choi | H01L 25/105 257/774 |
| 2013/0035774 A1* | 2/2013 | Warren | A01G 25/167 700/90 |
| 2013/0049224 A1* | 2/2013 | Sutardja | H01L 27/108 257/774 |
| 2013/0187268 A1* | 7/2013 | Lin | H01L 21/56 257/737 |
| 2013/0256914 A1* | 10/2013 | Cheng | H01L 24/81 257/777 |
| 2013/0334692 A1* | 12/2013 | Lim | H01L 24/81 257/766 |
| 2014/0035892 A1* | 2/2014 | Shenoy | H01L 23/49827 345/205 |
| 2015/0076714 A1* | 3/2015 | Haba | H01L 21/4846 257/784 |
| 2015/0123268 A1* | 5/2015 | Yu | H01L 25/0657 257/737 |
| 2015/0187743 A1* | 7/2015 | Yu | H01L 21/568 257/741 |
| 2015/0206848 A1* | 7/2015 | Boja | H01L 23/5384 257/774 |
| 2015/0206865 A1* | 7/2015 | Yu | H01L 24/17 257/737 |
| 2015/0235934 A1* | 8/2015 | Wu | H01L 23/49894 257/777 |
| 2015/0235936 A1* | 8/2015 | Yu | H01L 24/97 257/738 |
| 2015/0235989 A1* | 8/2015 | Yu | H01L 23/5385 257/712 |
| 2015/0318263 A1* | 11/2015 | Yu | H01L 24/92 257/774 |
| 2015/0318267 A1* | 11/2015 | Yu | H01L 21/0214 257/774 |
| 2015/0357309 A1* | 12/2015 | Liu | H01L 25/50 257/692 |
| 2016/0079222 A1* | 3/2016 | Sato | H01L 24/17 257/738 |
| 2016/0092600 A1* | 3/2016 | Chan | G06F 16/24575 707/769 |

(56) References Cited

U.S. PATENT DOCUMENTS

| | | | |
|---|---|---|---|
| 2016/0113220 A1* | 4/2016 | Walker | G05B 13/021 |
| | | | 700/284 |
| 2016/0157446 A1* | 6/2016 | Bentwich | A01G 25/167 |
| | | | 700/284 |
| 2016/0295819 A1* | 10/2016 | Porter | G05D 7/0676 |
| 2016/0307876 A1* | 10/2016 | Yu | H01L 25/0657 |
| 2017/0367277 A1* | 12/2017 | Mohindra | A01G 25/162 |
| 2019/0110415 A1* | 4/2019 | Walker | A01G 25/16 |
| 2019/0123028 A1* | 4/2019 | Yu | H01L 24/13 |

FOREIGN PATENT DOCUMENTS

| | | | | |
|---|---|---|---|---|
| WO | 2007131169 | | 11/2007 | |
| WO | 2011044289 | | 4/2011 | |
| WO | WO-2011044289 A1 | * | 4/2011 | ............. A01G 25/16 |
| WO | WO-2015183742 A1 | * | 12/2015 | ............. H01L 24/13 |

OTHER PUBLICATIONS

PCT; Written Opinion of the International Searching Authority corresponding to International Application No. PCT/US2010/051699; dated Nov. 30, 2010; 8 Pages.
U.S. Appl. No. 13/500,882 ; Office Action dated Dec. 18, 2014.
U.S. Appl. No. 13/500,882; Notice of Allowance dated Oct. 5, 2015.
U.S. Appl. No. 13/500,882; Office Action dated Apr. 3, 2015.
U.S. Appl. No. 14/989,771; Notice of Allowance dated Sep. 13, 2018.
U.S. Appl. No. 14/989,771; Office Action dated Feb. 22, 2018.
U.S. Appl. No. 16/218,202; Notice of Allowance dated Oct. 16, 2019.
U.S. Appl. No. 16/218,202; Office Action dated Jul. 9, 2019.
Williamson; U.S. Appl. No. 60/797,540, filed May 4, 2006; 13 Pages.

* cited by examiner

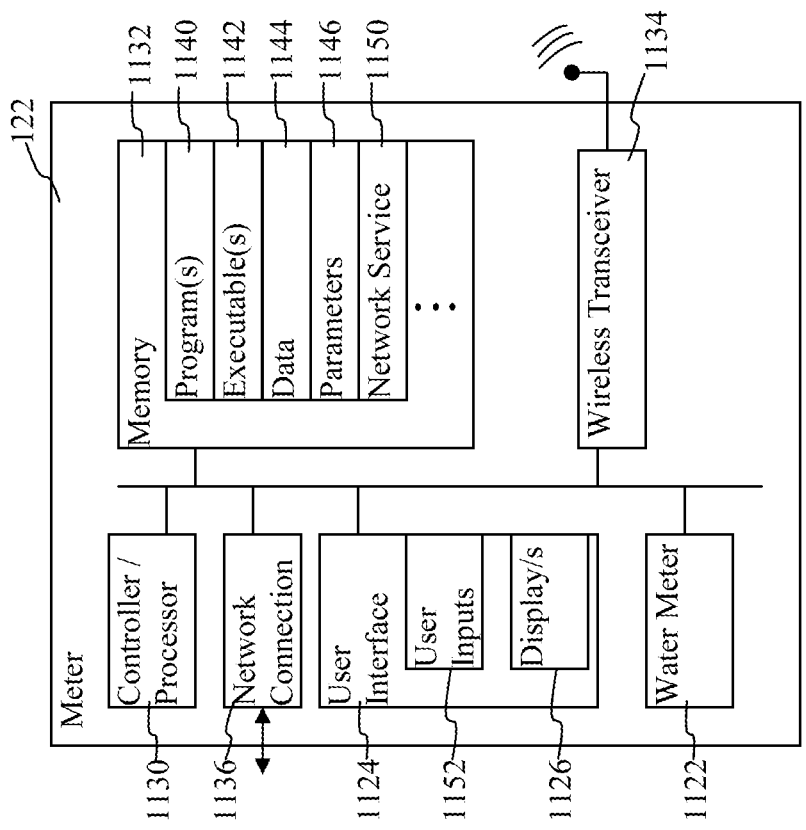
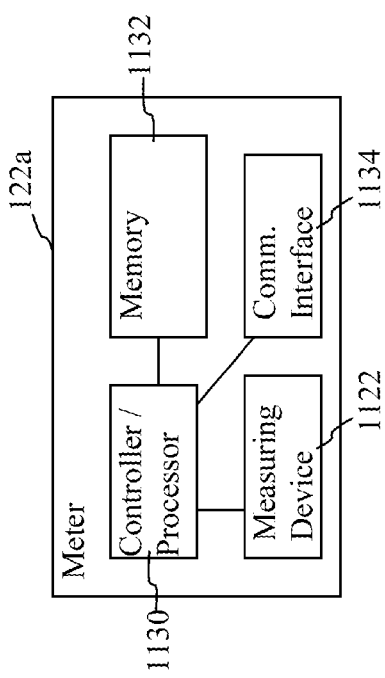
FIG. 11B
FIG. 11A

Current TIME: 1:35:09 PM     Current Date: July 27, 2009

Billing Period: July 1, 2009 – July 31, 2009

EXCEEDED CURRENT BUDGET

| | | |
|---|---|---|
| Total Water Budget: | 10,000 gal./month | Estimated Water Usage during Current Budget Period: | 16,327 gal. |
| Current Water Usage during current budget period: | 14,221 gal. | Estimated Usage in Excess of Budget: | 6327 |
| Cost per unit: | $ 0.007 per gal. | Penalties to Exceed Current Budget | $ 0.014 per gal. exceeded |
| Estimated Cost for Water Usage: (Estimated x Cost per unit) | $ 114.29 | Estimated Cost to Exceed Budget: | $ 88.58 |
| | | Total Estimated Cost: | $ 202.87 |

[ Menu ] [ Graph ] [ Budget Info. ] [ Water Authority ] [ Time/Date ] [ Irrigation ]

FIG. 31

Current TIME: 1:35:09 PM     Budget Period – July 2009     Current Date: July 27, 2009

SECOND TIER BUDGET

| Total Water Budget SECOND TIER: | 15,000 gal./month | Estimated Water Usage during Current Budget Period: | 16,327 gal. |
|---|---|---|---|
| Current Water Usage during current budget period: | 14,221 gal. | Estimated Usage in Excess of Budget: | 1327 |
| Cost per unit: | $ 0.014 per gal. | Penalties to Exceed Current Budget: | $ 0.028 per gal. exceeded |
| Estimated Cost for Water Usage: (Estimated x Cost per unit) | $ 228.58 | Estimated Total Cost to Exceed Budget: | $ 37.16 |
| | | Total Estimated Cost: | $ 265.73 |

[ Menu ]    [ Graph ]    [ Budget Info. ]    [ Water Authority ]    [ Time/Date ]    [ Irrigation ]

VOLUMETRIC BUDGET BASED IRRIGATION CONTROL

This application is a continuation of U.S. application Ser. No. 16/218,202 filed Dec. 12, 2018 entitled VOLUMETRIC BUDGET BASED IRRIGATION CONTROL which is a continuation of U.S. application Ser. No. 14/989,771 filed Jan. 6, 2016 entitled VOLUMETRIC BUDGET BASED IRRIGATION CONTROL which is a continuation of U.S. application Ser. No. 13/500,882 filed Jun. 4, 2012, entitled VOLUMETRIC BUDGET BASED IRRIGATION CONTROL, which is the U.S. National Stage of International Application Serial No. PCT/US2010/051699 filed Oct. 6, 2010 and entitled VOLUMETRIC BUDGET BASED IRRIGATION CONTROL, which claims the benefit of all three of U.S. Provisional Application No. 61/249,519, filed Oct. 7, 2009, by Snider et al., entitled VOLUMETRIC BUDGET BASED IRRIGATION CONTROL, U.S. Provisional Application No. 61/261,685, filed Nov. 16, 2009, by Snider et al., entitled VOLUMETRIC BUDGET BASED IRRIGATION CONTROL, and U.S. Provisional Application No. 61/322,710, filed Apr. 9, 2010, by Snider et al., entitled VOLUMETRIC BUDGET BASED IRRIGATION CONTROL, all of which are incorporated in their entirety herein by reference.

BACKGROUND OF THE INVENTION

1. Field of the Invention

The present invention relates generally to irrigation control, and more specifically to irrigation controllers that control irrigation.

2. Discussion of the Related Art

Water continues to be a precious commodity. Further, the conservation of water continues to be a topic of great interest to governments, water authorities, municipalities, farms, corporations, and individual consumers. Additionally, as the true cost of water becomes better understood, the price of water continues to rise, making conservation of water more important to all stakeholders.

Municipalities, water districts, and other agencies that supply water to consumers sometimes regulate the distribution of water in attempts to conserve water, reduce water usage, maintain water reserves as well as for numerous other reasons. Methods used to regulate water distribution often involve restrictions on the use of water for irrigation, restrictions on the on the periods during which water can be used for irrigation, and cost increases when water use is exceeded and other such methods.

SUMMARY OF THE INVENTION

Several embodiments of the invention advantageously address the needs above as well as other needs by providing methods of controlling irrigation, at least in part, by receiving water usage information corresponding to a first volumetric water usage at a site location having an irrigation controller, wherein the first volumetric water usage corresponds to volumetric water usage from a beginning of a budget period of time to a first time within the budget period of time; determining automatically whether a volumetric water budget at the site location will be met for the budget period of time based on at least the first volumetric water usage, the volumetric water budget corresponding to a specified volume of water for use during the budget period of time; determining automatically, in the event the volumetric water budget will not be met, an adjustment to the irrigation by the irrigation controller; and outputting signaling to effect the adjustment.

Other embodiments provide apparatuses for use in controlling irrigation. Some of these embodiments comprise a processor; and a memory that stores executable program code, wherein the processor is configured to execute the executable program code to: receive water usage information corresponding to a first volumetric water usage at a site location having an irrigation controller, wherein the first volumetric water usage corresponds to volumetric water usage from a beginning of a budget period of time to a first time within the budget period of time; determine automatically whether a volumetric water budget at the site location will be met for the budget period of time based on at least the first volumetric water usage, the volumetric water budget corresponding to a specified volume of water for use during the budget period of time; determine automatically, in the event the volumetric water budget will not be met, an adjustment to irrigation by the irrigation controller; and output signaling to effect the adjustment.

BRIEF DESCRIPTION OF THE DRAWINGS

The above and other aspects, features and advantages of several embodiments of the present invention will be more apparent from the following more particular description thereof, presented in conjunction with the following drawings.

FIG. 11A depicts a simplified block diagram of an example meter according to some embodiments.

FIG. 11B depicts a simplified block diagram of an implementation of a water flow meter according to some embodiments.

FIG. 31 depicts a simplified display screen, according to some embodiments, displaying an example of a budget information table.

FIG. 32 depicts a simplified display screen, according to some embodiments, displaying an additional example of a budget information table.

Figure 1:
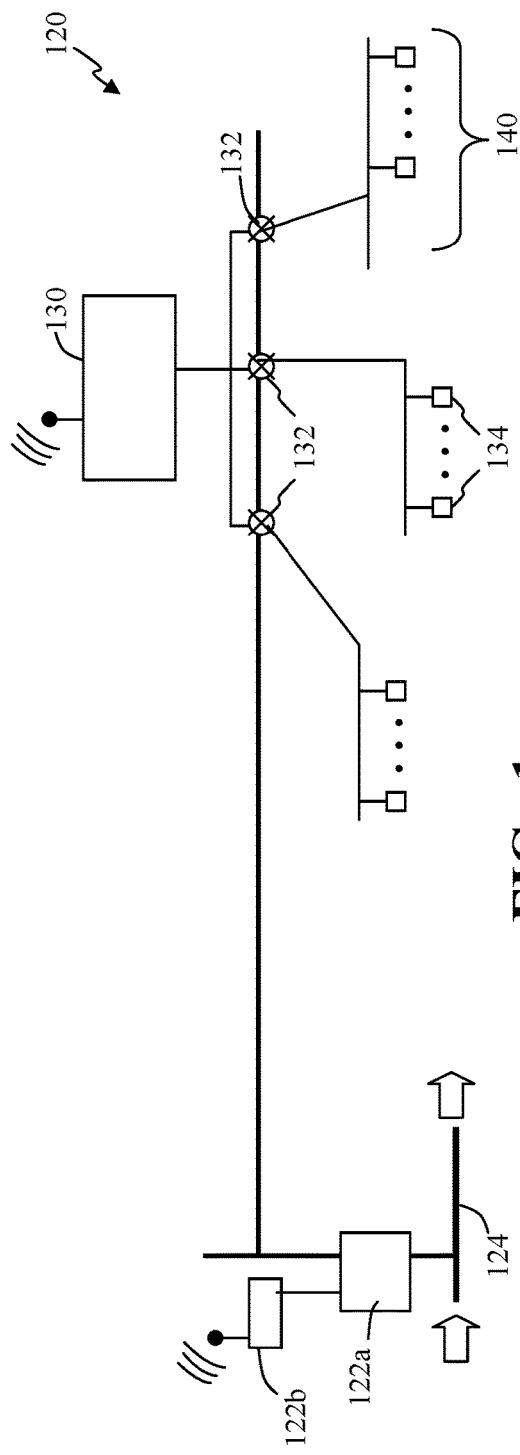
FIG. 1 depicts a simplified diagram of a system according to some embodiments that implements water irrigation according to one or more volumetric water budgets or fixed volumes of water.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments," or similar language means that a particular feature, structure, or characteristic described in connection with the embodiment or embodiments is included in at least one embodiment of the present invention. Thus, appearances of the phrases "in one embodiment," "in an embodiment," "in some embodiments," "in accordance with some embodiments," and similar language throughout this specification may, but do not necessarily, all refer to the same embodiment or embodiments.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 depicts a simplified diagram of a system 120 according to some embodiments that implements water irrigation according to one or more volumetric water budgets or fixed volumes of water. The system 120 includes one or more water measuring devices 122a connected to a water source or supply 124, a communication device 122b, and an irrigation controller 130 connected to one or more valves 132 that in turn each distribute water to one or more irrigation delivery devices 134. The valves are depicted for simplicity in series on a water source or water line. However, it will be apparent to those skilled in the art that the valves are typically in parallel allowing one valve to be closed while one or more down stream valves can still open and supply water to the water delivery devices 134. The irrigation controller 130 controls and/or instructs the valves 132 to open allowing water to be delivered to the one or more water delivery devices 134 associated with the one or more activated valves 132. In some instances, one or more valves are associated with an irrigation zone 140 to be watered, and often the irrigation controller 130 implements the irrigation in accordance with runtimes defined for each zone 140. The property or irrigation site being irrigated can be substantially any property or site, such as a residence, a commercial site, school, park, a golf course, a housing development and/or other such property.

The water measuring device 122a can be substantially any device that can output an indication corresponding to or that can be used to determine a water usage and/or rate of water flow, and can measure water usage and/or consumption at the property or irrigation site, and can measure in units per volume, a flow rate or other such measurements. For example, the water measuring device 122a can be a water meter, a flow meter, a valve with a measurement capability (e.g., a valve with an internal flow meter), or other device that provides information that can be utilized to determine a volumetric consumption. For simplicity the below description refers to the water measurement devices 122a as a meter. It will be understood, however, that the meter 122a is not limited to a water meter but can be other devices or a combination of devices that can provide information utilized in determining water consumption and/or usage.

In some embodiments, the communication device 122b is in communication with both the meter 122a and the irrigation controller 130 to supply water usage information as measured by the meter 122a to the irrigation controller 130. The communication device 122b can be a separate device that communicationally couples with the meter 122a, or in some instances may be directly coupled with or incorporated into the meter 122a. In still other embodiments, the communication device 122b includes a separate water meter to measure flow along with data collection processing to track the measured water flow and a communication capability, whether over wired or wireless communication.

The irrigation controller 130 is in communication with the meter 122a, through the communication device 122b (or with a meter within the communication device), to receive water usage, flow information or other information corresponding to or that can be used to determine water usage, such as but not limited to water usage measured is units of volume, water flow or other such measures. The communication between the communication device 122b and the irrigation controller 130 can be over wired communication, wireless communication (e.g., Wi-Fi, Bluetooth, RF, IR, cellular, satellite, ZigBee and/or other such wireless communication), optical or other such communication. Further, the communication can be over a direct link, over a distributed local network and/or over a wide area distributed network, such as the Internet. Similarly, the communication between the communication device 122b and the meter 122a can be over wired communication, direct connection, wireless communication, optical or other such communication, and over a direct link, over a distributed local network or over a wide area distributed network, such as the Internet.

Again, the meter 122a tracks water flow, the volume of water and/or other such measure of water use (e.g., volumetric water use) delivered to the property or irrigation site, where at least a portion of the water passing the meter is distributed by the water delivery devices 134 of the irrigation system. The metered information is supplied to the irrigation controller 130 and used by the irrigation controller 130 in adjusting the irrigation relative to a volumetric water budget specified for a budget period, where the budget period can be substantially any relevant period and can be time based, event based or other such periods. In some instances, the irrigation controller 130 utilizes the metered information to determine whether the water usage has exceeded the budget and/or may further determine in some embodiments whether continued water use is predicted to exceed the water budget during the budget period. In those instances where the irrigation controller determines that water usage has exceeded the water budget and/or anticipates exceeding the volumetric water budget, the irrigation controller 130 takes actions relative to further water use.

The irrigation controller 130 can use one or more volumetric water budgets in adjusting irrigation to maintain water usage within the prescribed water budgets over the budget period of time. For example, there may be a limited water budget for a given billing period, such as a monthly water budget. The irrigation controller 130 can attempt to limit water usage, at least relative to irrigation usage, to try and keep the water usage within the water budget over that given budget period. In some embodiments, multiple volumetric water budgets may be defined, such as a billing period budget as well as a given daily or irrigation event. The irrigation controller 130 may take both water budgets into account in determining irrigation and/or whether adjustments should be implemented relative to irrigation.

The water budgets define a limited volume of water over a given budget period, such as but not limited to, a volume of water use over a billing cycle (e.g., a month or multiple months), a cost of water used over a budget period, a volume of water use per day, a volume of water used over an irrigation cycle or an irrigation zone cycle, or other such limits. The budget period can be substantially any budget period, such as but not limited to a billing period, a month, a week, a day, an irrigation cycle, an irritation event, an irrigation occurrence, an annual budget or a fraction of a year (e.g., quarterly budget), and other such budgets. In many embodiments, the budget period spans multiple irrigation cycles. Further, the budget period can be a rolling budget. For example, a budget amount or volume of water may be utilized in a rolling, fixed number of days, such as a budget period may be a fixed number of days that continues to roll with each successive day or plurality of days; a fixed number of hours or minutes that continues to roll; a rolling number of irrigation occurrences or events; a rolling number of irrigation zones; a rolling number of irrigation cycles; other such rolling periods or combinations of such periods. In those instances where multiple water budgets are being applied the irrigation controller can evaluate water usage relative to each relevant budget. For example, in some embodiments a first volumetric water budget may apply for a water usage over a billing period, while a second volumetric water budget may apply for water usage over a given day and/or a third volumetric water budget may apply for water delivery for a given zone during irrigation. Some embodiments may allow different water budgets for different areas and/or zones of the property or properties controlled by one or more irrigation controllers. For example, a user may specify a first budget (e.g., dollar amount, volume of water (e.g., gallon) and/or other such budgets) and/or a relative priority) for one or more zones (e.g., for zones covering a front yard of a property) and a second budget and/or priority for one or more other zones (e.g., for zones covering a back yard of the property), which the irrigation controller 130 can convert to runtimes based on known, estimated or learned water flow rates, types of water deliver devices, water pressure, runtimes and/or other such parameters. Similarly, there may be an irrigation water budget for water used in irrigation, and a non-irrigation water budget for water usage other than irrigation. Further, different irrigation areas or zones may have different budgets and/or priorities relative to actions taken. These priorities can be user specified, based on plant life being irrigated, types of water delivery devices 134, type of soil, slope or terrain, and other such factors or combinations of factors.

Utilizing the one or more relevant water budgets and the one or more budget periods the irrigation controller 130 can take action relative to water usage and the water budgets. In some instances, the irrigation controller takes action simply by providing notification. In other instances, the irrigation controller 130 can take action to adjust water usage. The action or actions taken can vary widely depending on one or more factors and the capabilities of the irrigation controller. The water usage, in some embodiments, may be limited to irrigation water use, while in other embodiments water use may be based on both irrigation water use and non-irrigation water use. Further, the one or more water budgets may be specified by a user, a water authority, a community association and/or other such source or sources. Additionally, the one or more budgets may be defined as a volume of water, a cost budget or other such budgets. The irrigation controller, in some embodiments, receives water usage information, whether a flow rate, measured volume of water or other such measure from one or more meters 122a, calculates a water usage or otherwise determines water usage, and evaluates water usage relative to the budget. The water usage can be based on an accumulated water use and/or predicted accumulated water use, for example over multiple irrigation cycles during a budget period that can spans multiple irrigation cycles, with the accumulated water usage or predicted accumulated water usage being considered when evaluating irrigation runtimes and water usage in relation to the water budget.

Irrigation restrictions may additionally be applied and/or implemented by the irrigation controller 130 while also evaluating water usage relative to the water budget. These restrictions may include, but are not limited to, windows of unavailability, restricted dates or days where irrigation cannot be applied or when irrigation is only allowed, minutes of watering per property, minutes of watering per irrigation or irrigation event, volume of water per property, volume of water per irrigation or irrigation event, minutes per zone that are allowed, volume of water per zone allowed, certain times during the day when irrigation is not allowed or can only be implemented, restrictions relative to a type of water delivery device 134 in the zone (e.g., one or more zones may be available to deliver water on a given day because of the type of water delivery device(s) 134 within that zone (e.g., drip lines), while one or more other zones may not be available to deliver water because the one or more zones utilize different types of water deliver devices (e.g., sprinklers)), type of plant life being irrigated (e.g., restrictions because of the plant life, or some zones may be exempt from restrictions because of the type of plant life, such as vegetable garden), geographic and/or physical location of the property being irrigated and/or zones being irrigated, and other such restrictions. Similarly, different zones being irrigated may have different levels of restrictions (e.g., a first zone with drip lines may be restricted to a first runtime and/or budget, while a second zone with sprinklers have been restricted to a reduced runtime and/or budget). As a specific example, there may be some ranking or priority that can aid in determining and/or applying restrictions.

The one or more water budgets, budget information and/or restriction information can be received from one or more sources. In some instances, water budget information and/or restriction information can be defined by the irrigation controller manufacturer, specified by a user, supplied to the irrigation controller 130 from a remote source via a communication link, relayed by another device (e.g., relayed from another irrigation controller, relayed from another device where a user can enter budget information, relayed from another device in communication with a source, and/or received from other such relevant device), manually entered by a contractor or water authority representative, received from a source over power line communications or other such sources or combinations of sources. As one example, the irrigation controller 130 may wirelessly receive budget information from a water authority. In another example, a user may manually enter the budget information, for example, through a user interface or other data entry capability. In yet another example, the irrigation controller 130 may be in communication with the meter 122a that in turn is in communication with a water authority (e.g., over an Automatic Meter Reading (AMR) network, an Advanced Metering Infrastructure (AMI) technology, or other such communication links and/or techniques) such that the meter 122a can relay budget information to the irrigation controller 130. Similarly, the irrigation controller 130 may be connected with an AMR and/or AMI to receive information from a water authority or other source. In some implementations, the irrigation controller 130 may connect with a wired or wireless network to receive information, such as over the Internet, a dedicated network, radio, Worldwide Interoperability for Microwave Access (WiMAX), 900 MHz wireless communication, Wi-Fi, Bluetooth, cellular, satellite, ZigBee or other such connections and/or communication schemes. As another example, the budget and/or restriction information may be pre-programmed in the irrigation controller 130 by the manufacturer and/or distributor, and the user can enter a zip code or address of the property to access the budget and/or restriction information relevant to the property where irrigation is controlled relative to the budget and/or restrictions. Similarly, the zip code or address can be communicated to an authority to receive the relevant budget and/or restriction information.

Figure 2:
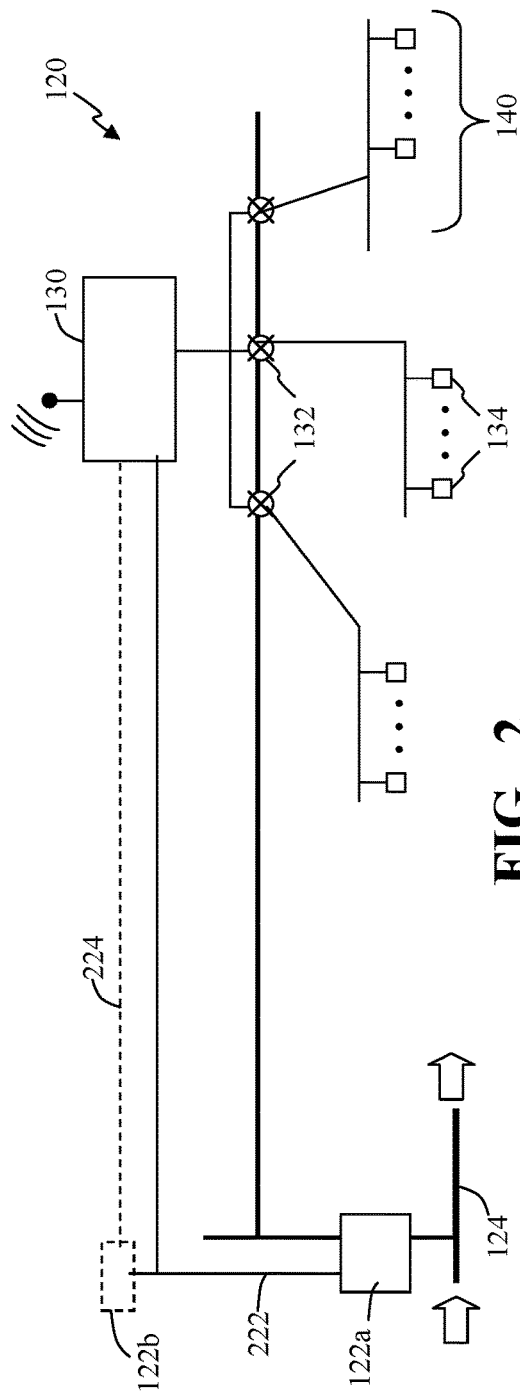
FIG. 2 depicts a simplified diagram of the irrigation system of FIG. 1 according to some embodiments where a water flow meter is coupled with the irrigation controller over a wired or other such communication path.

FIG. 2 depicts a simplified diagram of the irrigation system 120 according to some embodiments where the meter 122a is coupled with the irrigation controller 130 over a wired, fiber optic or other such communication path 222. In some optional implementations, the meter 122a interfaces with a communication device 122b (e.g., over the wired communication path 222), and the communication device 122b is in turn coupled over a wired communication path 224 with the irrigation controller 130.

Figure 3:
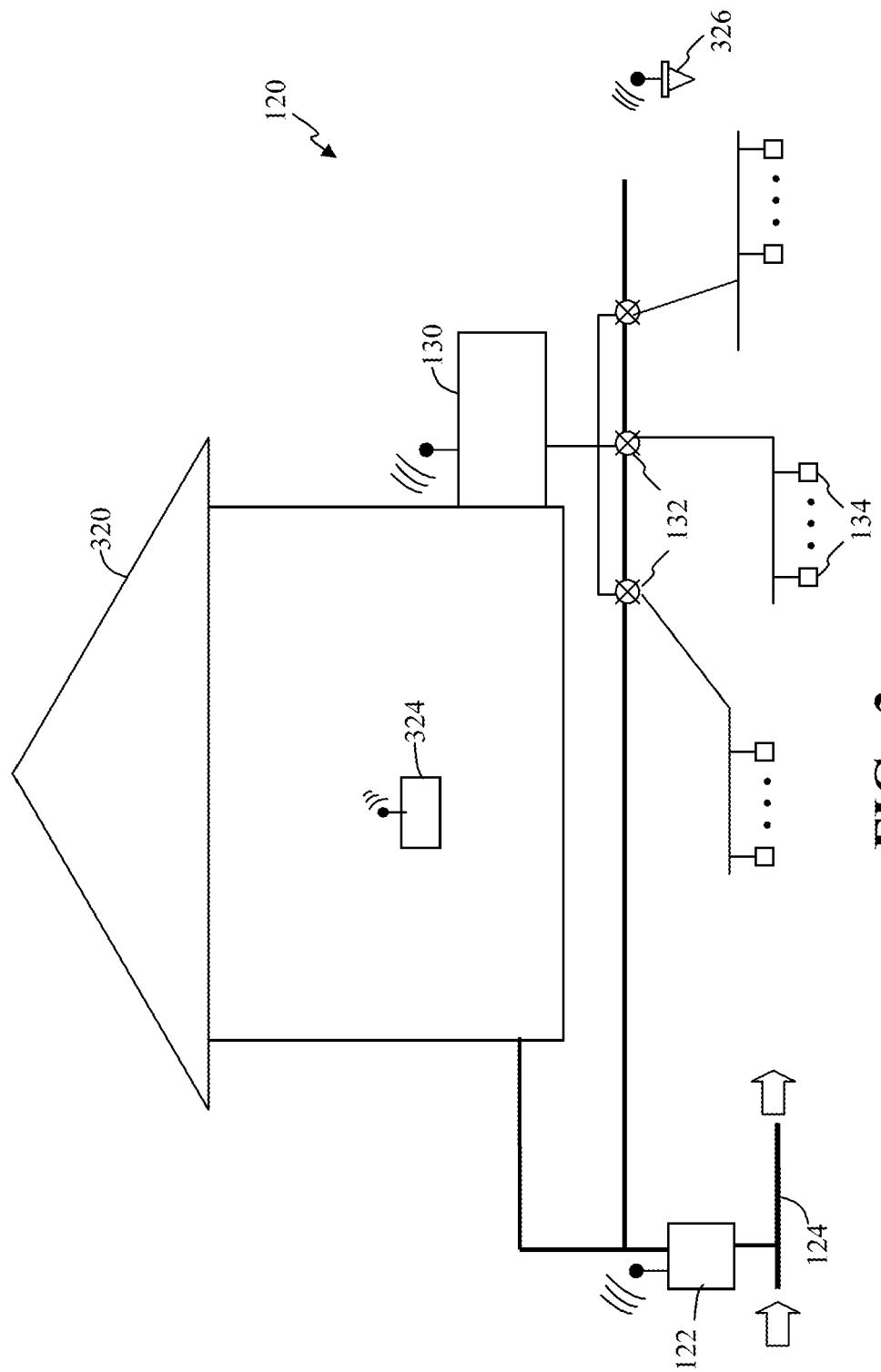
FIG. 3 depicts a simplified diagram of the irrigation system of FIG. 1 associated with one or more buildings.

FIG. 3 depicts a simplified diagram of the irrigation system 120 associated with one or more buildings 320, such as a house, apartment complex, office building, office complex, other commercial site, manufacturing facility, industrial park, housing development, golf course facility, hotel, resort or other structure or structures. The building 320 is also connected with one or more water sources 124 to receive water for use within the building, with one or more meters 122 measuring water flow, usage or other relevant information. As such, the water usage at the property includes irrigation usage as well as other non-irrigation water usage. The irrigation controller 130, in this example, is directly associated with the building or buildings 320, however, the irrigation controller 130 does not have to be fixed or proximate the building but instead can be separate from the building. Further, in some embodiments, the irrigation controller may be a distributed irrigation controller implemented by multiple different devices operating in cooperation, such as a plurality of controllers or a plurality of computers devices, servers and/or such devices distributed over a local area network, home area network, a wide area network and/or the Internet, which may include in some embodiments the implementation of a central irrigation control. Similarly, the meter 122 or other source supplying water usage information may not be positioned on the property but may be distant from the property while still measuring water flow and/or usage at the property.

Additionally, in this representative implementation, the irrigation controller 130 may control irrigation based on a water budget for the property, which includes both irrigation water use and non-irrigation water use such as water use within the building 320. As introduced above, the meter 122 in some implementations may include the ability to directly communicate with the irrigation controller 130 (e.g., by incorporating the communication device 122b into the meter 122a). In the example system depicted in FIG. 3, the meter 122 is in wireless communication with the irrigation controller 130; however, other methods of communication as described above and further below can be employed. The meter 122, similar to meter 122a, can be substantially any device that can output an indication corresponding to or that can be used to determine a water usage and/or rate of water flow, and can measure water usage and/or consumption at the property, and can measure in units per volume, a flow rate or other such measurements.

Furthermore, in some implementations, a separate display device 324 can be provided within the building 320. The separate display device 324 is in communication with the irrigation controller 130 over wired communication, wireless communication, optical or other such communication. Further, the communication can be over a direct link, over a distributed local network, home area network, local power lines, over a wide area distributed network, such as the Internet, or a combination of such networks. In some embodiments, the display device 324 is coupled with the meter 122 to receive water usage information from the meter, and in some instances may relay information to the irrigation controller 130. The display device 324, in accordance with some implementations, can be configured to provide relatively basic information, such as a notification or alert relative to water usage in relation to a water budget (e.g., water usage has exceeded the budget), while in other implementations the display device 324 can provide more detailed information, such as the information identified above and/or other such information. The separate display device 324 can provide information to users within the building 320 about the irrigation controller 130, water use, water budget information, current statistics relative to irrigation and/or water use, water use relative to the budget, costs associated with previous, current and/or continued water use, and/or other such information as full described below. Additionally, the display device 324 may be cooperated with and/or in communication with other devices and/or systems in the building 320 to receive and display information about these other devices and/or systems, such as a security or alarm system, one or more appliances, interior environment control system and/or other such systems. Further in some implementations, the display device 324 can provide users with a user interface that allows the users to interact with the display device 324, obtain desired information from the display device and/or configure the display device. In some embodiments, the display device 324 can communicate directly with the meter 122 and/or a communication device 122b and provide water use information without interaction with the irrigation controller 130.

In some embodiments, the irrigation controller 130 may additionally communicate with one or more sensors and/or detectors 326. The one or more sensors 326 can be substantially any relevant sensor, such as but not limited to, soil moisture sensor, rain sensor, temperature sensor, wind sensor, humidity sensor and other such relevant sensors. The irrigation controller 130 can receive the sensed information from the one or more sensors 326 through direct connections, wireless connections (e.g., Wi-Fi, Bluetooth, cellular, satellite, ZigBee and/or other such wireless communication) or other such relevant communication mechanisms.

Figure 4:
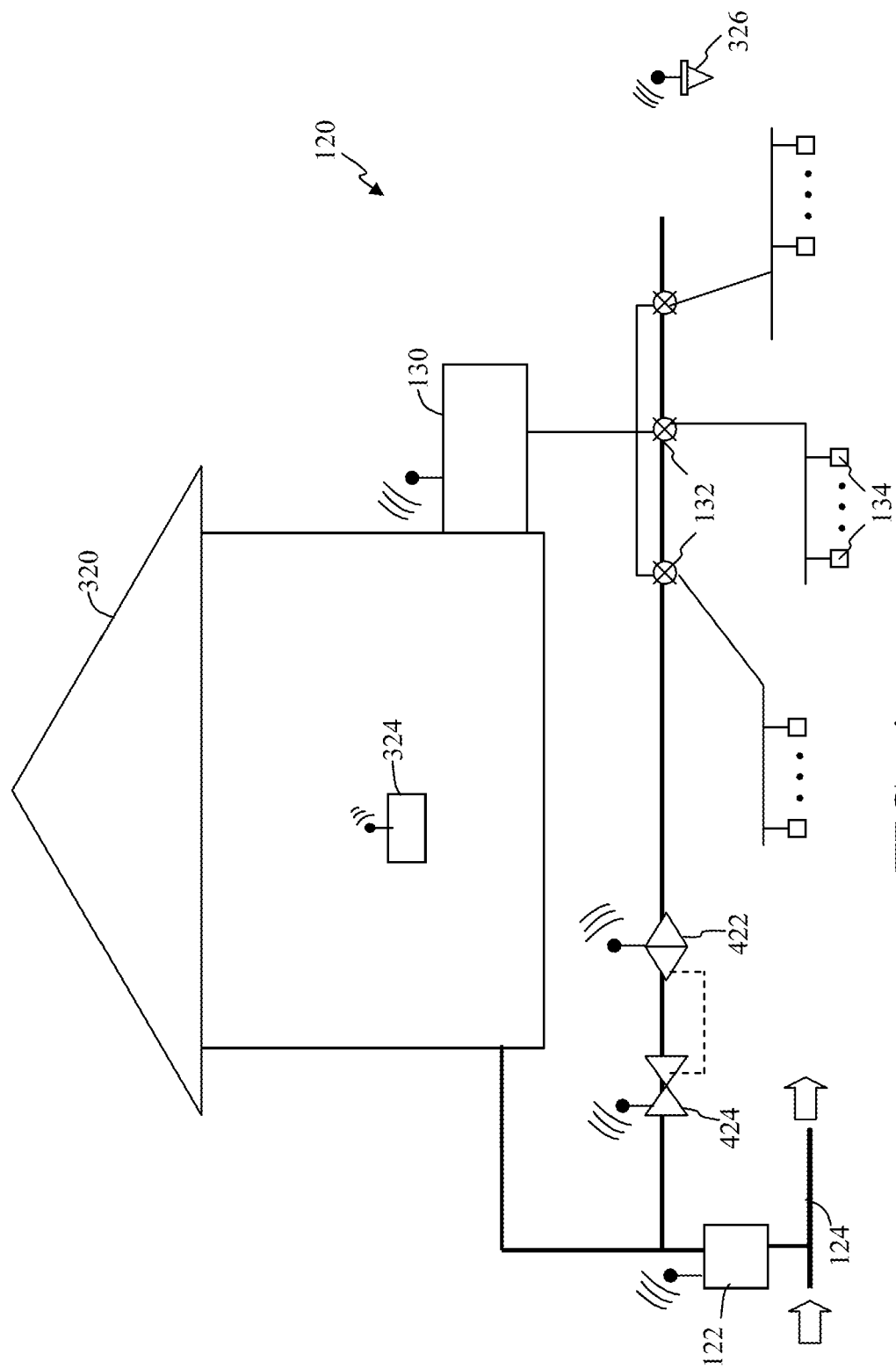
FIG. 4 depicts a simplified diagram of the irrigation system of FIG. 1 associated with the building and having a separate meter and valve.

FIG. 4 depicts a simplified diagram of the irrigation system 120 associated with the building 320. The system 120 can further include one or more separate water measurement devices, such as one or more water flow sensors, meters or other relevant water measuring devices 422, which in some instances may be dedicated for irrigation. In these embodiments, the dedicated water meter 422 is in communication with the irrigation controller 130 over wired communication, wireless communication, optical or other such communication. Further, the communication can be over a direct link, over a distributed local network, power line network and/or over a wide area distributed network, such as the Internet. Additionally or alternatively, one or more additional dedicated meters can be incorporated into the system 120, such as a meter associated with each valve, a meter dedicated to the building 320 or one building of a plurality of buildings, and other such implementations. As one example, the separate meter 422, in some implementations, can be a Flowstar meter available from Itron of Liberty Lake, Wash., and similarly can be cooperated with a radio based endpoint also available from Itron. In some embodiments, an American Water Works Association (AWWA) meter, such as a municipal water meter may be utilized for the meter 122 and/or separate meter 422. Other meters and/or data collection and/or communication devices can be utilized in other embodiments.

Additionally or alternatively, in some embodiments the one or more separate water measurement devices 422 is in communication with the display device 324 over wired communication, wireless communication, optical or other such communication. Further, the communication can be over a direct link, over a distributed local network, power line network and/or over a wide area distributed network, such as the Internet. Similarly, the display device 324 may be in communication with the separate shut-off valve 424 over wired communication, wireless communication, optical or other such communication. Further, the communication can be over a direct link, over a distributed local network, power line network and/or over a wide area distributed network, such as the Internet. This would allow the display device 324 to provide some budget control by receiving water usage information, for example from the separate meter 422, and controlling the shut-off valve 424 relative to the water budget, either through direct communication with the shut-off valve 424 (or other valve), or through communications with the separate meter 422 that can control the shut-off valve 424 (or other valve).

As described above, the irrigation controller 130 controls the amount of water delivered through the irrigation system by opening and closing the valves 132. This control can be based on scheduled timing, environmental conditions, historic information, soil moisture information, and/or other such information. Further, the irrigation controller 130 is provided with a water budget for a predefined budget period of time. Based at least on the water budget and water use information the irrigation controller 130 can alter the irrigation. The water usage, at least in part, can be supplied in some instances by the separate meter 422. Further, by obtaining irrigation water usage information from the separate meter 422 the non-irrigation water usage for the property can more readily be determined, for example by subtracting the measured irrigation water use as measured by the meter 422 from the water use as measured by the meter 122. Still further, the separate meter 422 can notify the irrigation controller 130 in the event there is a leak within the irrigation system as opposed to a leak in another part of the property, such as within the building 320.

Still referring to FIG. 4, some embodiments may additionally include a separate valve 424 that can be activated to shut off water flow to the irrigation system. This shut off valve 424 may be directly connected with the separate volumetric meter 422 such that the volumetric meter may close the shut off valve 424 upon detection that a budget of water has been exceeded. For example, the separate volumetric meter 422 can include a meter controller implemented through one or more processors and/or microprocessors with internal memory and/or coupled with additional memory within the separate meter 422 with the one or more processors and/or microprocessors being configured and/or programmed to evaluate meter readings and implement software stored in the memory to determine whether a water budget is exceeded and to trigger an activation of the shut off valve 424. It is noted that the water budget considered by the separate meter 422 may be the same as or a different water budget than one or more budgets evaluated by the irrigation controller 130 and/or the separate display device 324. For example, the water authority or other source may communicate a budget, a new budget or changes to a budget, non-irrigation budget, usage information, water credits information, costs information, tier information and other relevant information. In other instances, the irrigation controller 130 may be in communication with the shut off valve 424 to signal the valve to close and shut off irrigation. In other embodiments the shut off valve 424 may additionally or alternatively be in communication with the water meter 122 or a remote water authority that can activate the shut off valve 424 to open or close.

Figure 5:
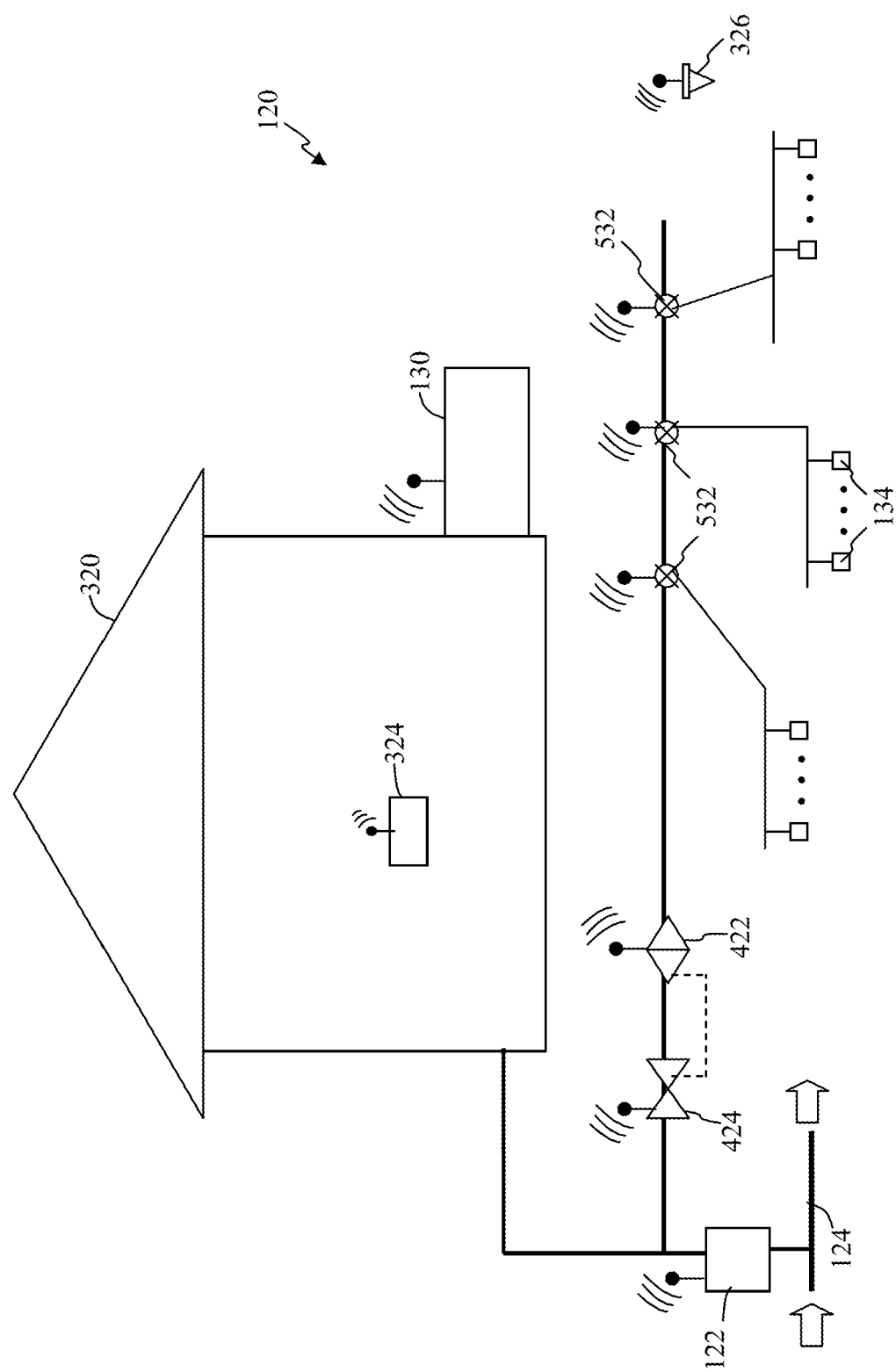
FIG. 5 depicts a simplified diagram of an example irrigation system according to some embodiments where the irrigation controller is in wireless communication with one or more valves.

FIG. 5 depicts a simplified diagram of an example irrigation system 120 according to some embodiments where irrigation can be adjusted and/or controlled relative to a water budget where the irrigation controller 130 is in wireless communication with one or more valves 532 (e.g., Wi-Fi, RF, IR, Bluetooth, cellular, satellite, ZigBee and/or other such wireless communication). The irrigation system 120 includes the water source 124, the meter 122, the irrigation controller 130 and one or more valves 532 cooperated with the one or more water delivery devices 134. Some embodiments may include one or more separate meters 422, shut off valves 424 and/or sensors 326. Additionally, in some implementations the irrigation system 120 may be associated with a building 320 that can include a separate display device 324 in communication with the irrigation controller 130 and/or other source of information. In the embodiment depicted in FIG. 5, the irrigation valves 532 can be in wireless communication with the irrigation controller 130 and/or include valve controllers that are in wireless communication with the irrigation controller 130 to wirelessly receive instructions to open or close.

Figure 6:
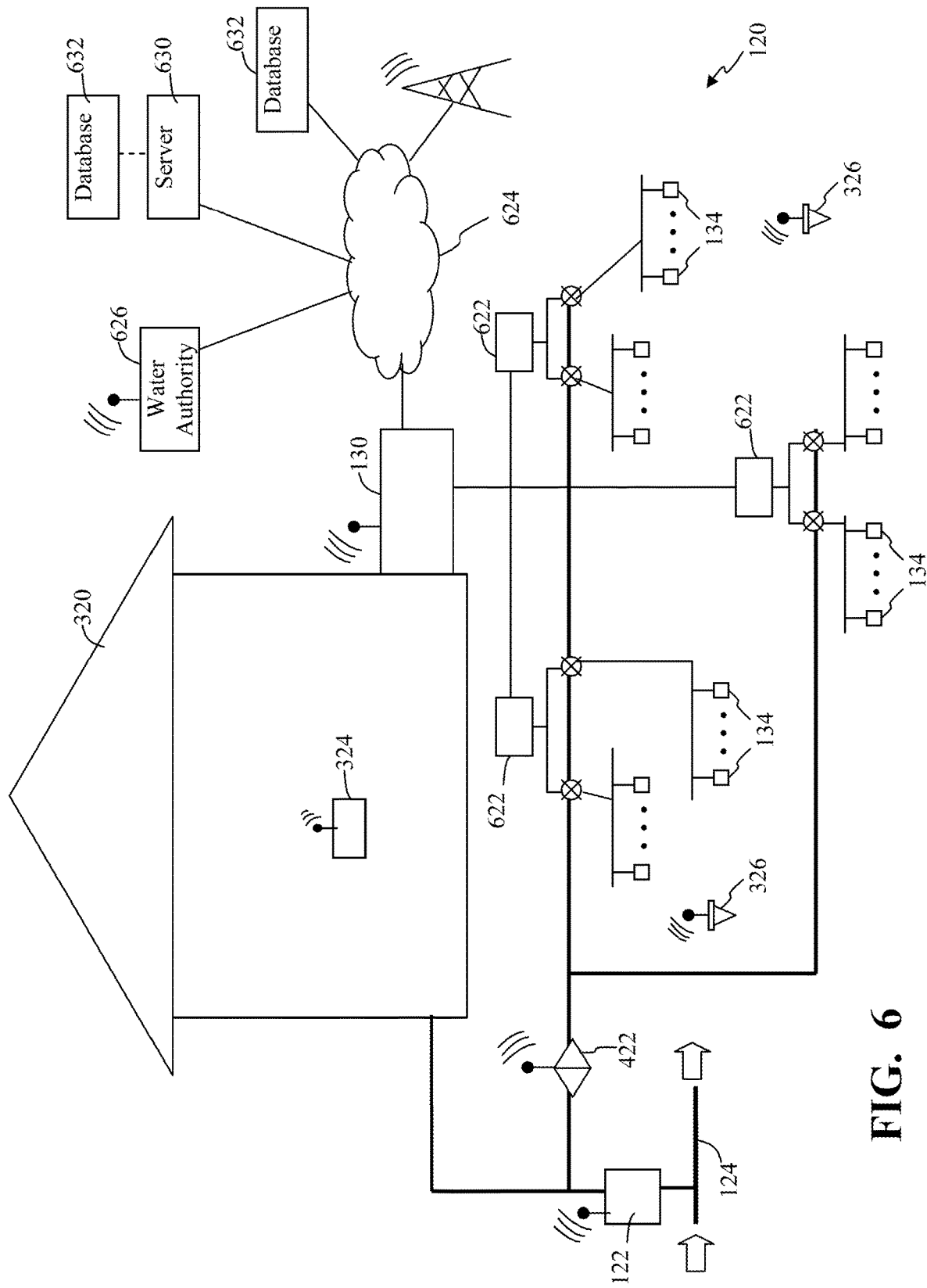
FIG. 6 depicts a simplified diagram of a system according to some embodiments that includes a central irrigation controller and one or more satellite irrigation controllers.

FIG. 6 depicts a simplified diagram of a system 120 according to some embodiments that implements irrigation control. The system 120 in this representative example further includes one or more sub-irrigation controllers, satellite controllers, and/or decoder based systems 622. These systems are referred to below for simplicity as a satellite controller 622. The one or more satellite controllers 622 are communicationally coupled with the irrigation controller 130. In some implementations, the irrigation controller 130 communicates control and/or irrigation scheduling to the satellite controllers 622 and the satellite controllers 622 implement the irrigation scheduling as dictated by the irrigation controller 130. The irrigation controller 130, in some implementations in accordance with the configuration of FIG. 6, can be considered a central irrigation controller that can be a dedicated central irrigation control device or can be implemented through a computer, such as a desk top computer or laptop, or other relevant device. Further, the irrigation controller 130 can receive alterations to irrigation scheduling and/or can determine adjustments to irrigation scheduling, such as adjustments with regards to a volumetric water budget. The irrigation controller 130 can communicate with the satellite controllers through wired or wireless communication methods. In some embodiments, the system may be a decoder-based irrigation control system. For example, in a decoder based irrigation control system, a computer based or stand alone irrigation controller (e.g., one version of irrigation controller 130) sends operational power and data over a multi-wire (e.g., 2 or 3 wire) transmission line to many decoder units (e.g., decoder units could be one form of controllers 622) each coupled at various locations to the multi-wire line (not shown). Each decoder unit derives operational power from the multi-wire line and controls the operation of one or more irrigation valve or other sprinkler device/s. The controller 130 functionally includes or is coupled to a field interface device that modulates or encodes data, typically on a power waveform, to power and address and communicate with the decoder units. Decoder-based systems are generally well-known in structure and operation by those of ordinary skill in the art. An example of a known decoder system includes the PAR+ES Decoder controller system and FD-101, FD-102, FD-202, FD-401 and FD-601 decoders commercially available from Rain Bird Corporation of Asuza, Calif.

In some implementations as introduced above, the irrigation controller 130 can further be connected with a distributed network 624, such as a local area network (LAN), home area network, a powerline communication network, the Internet or other such network. This allows the irrigation controller 130 to connect with one or more remote devices and/or services 626, 630, 632, such as a weather data service, an evapotranspiration (ET) data service, a water authority 626, historic information (e.g., historic weather data, historic ET data, and other such historic data), and other relevant devices and/or services. Further in some instances, the irrigation controller 130 can be remotely accessed by a user from over the network 624 via a computer, wireless device (e.g., personal digital assistant, cellular phone or other such wireless device), or other such devices. In some embodiments, the water authority 626 can communicate with the meter 122 and/or the irrigation controller 130 via the network 624, over a dedicated network, wirelessly or other such communication methods. For example, the water authority or other source may communicate a budget, a new budget or changes to a budget, usage information, water credits information, costs information, tier information and other relevant information.

Figure 7A:
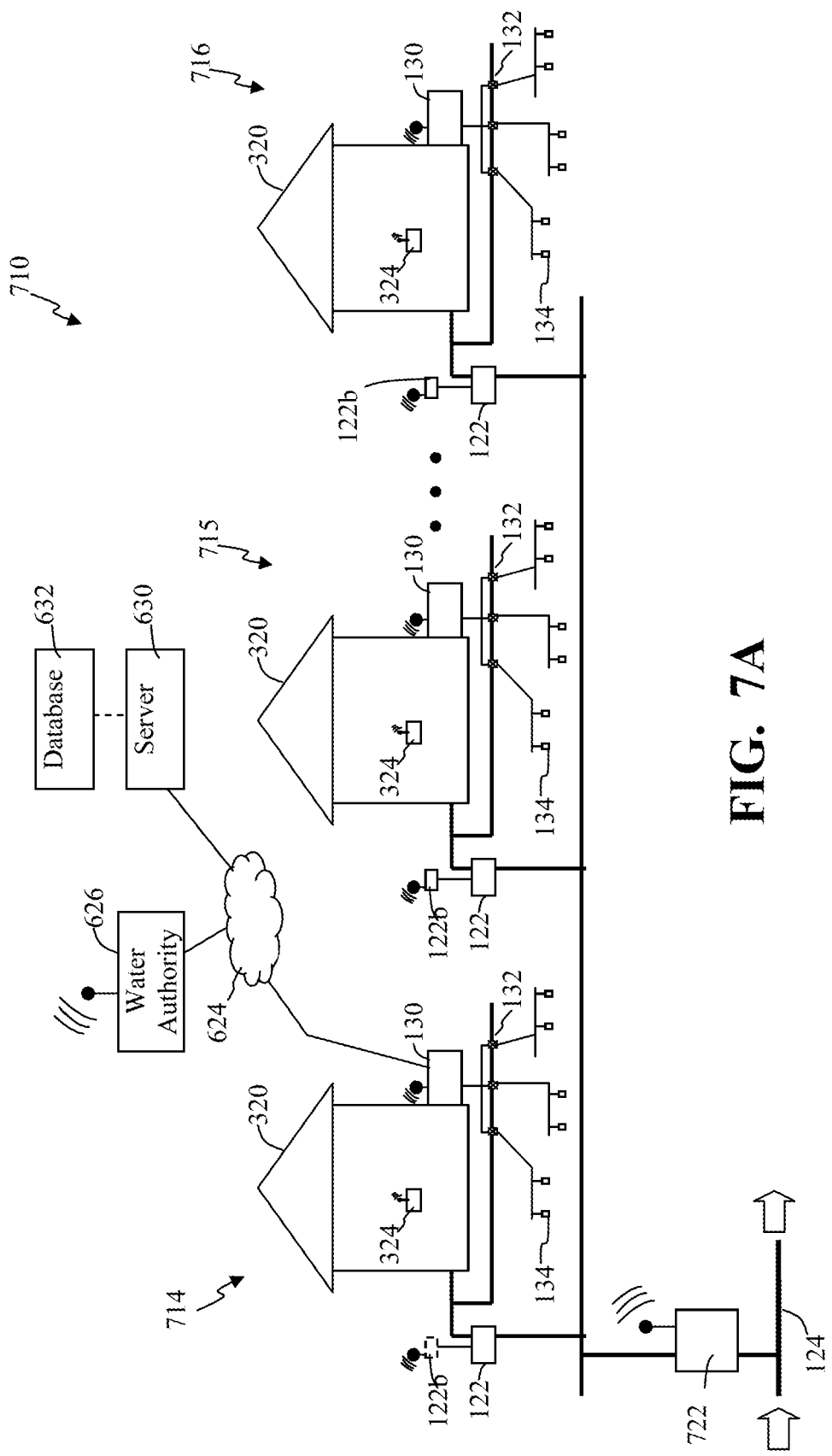
FIG. 7A depicts a simplified diagram of a system according to some embodiments where irrigation is controlled with some collective cooperation across multiple meters and/or irrigation controllers.

FIG. 7A depicts a simplified diagram of a system 710 according to some embodiments where irrigation is controlled with some collective cooperation. The system 710 provides a cooperative water usage over a plurality of properties 714-716. For example, there may be defined a cooperative water budget for the cooperation of properties, while one or more additional water budgets may be associated with each property. As a specific example, an industrial park can include multiple different buildings 320, where a cooperative water budget may be defined for the industrial park. Again in some instances, there may also be individual water budgets associated with each building (which may include irrigation water usage of property surrounding and/or associated with that building). As another example, a townhouse community may have a cooperative water budget for the community while also having individual water budgets for each townhouse 320 within the community. Similarly, a golf course or resort may include multiple buildings (e.g., club house, restaurant, hotel, spa and the like), with a cooperative water budget, where the water budget may be set by the property owner, a cooperative of property owners, a water authority and/or other party. One or more additional budgets may also be associated with one or more of the buildings and/or surrounding property.

As a result, the water usage and water budgets over the plurality of properties can be taken into account in attempting to control water use and/or in adjusting irrigation relative to each property 714-716 individually as well as the community or cooperation of properties. For example, the individual water budgets corresponding to the given properties 714-716 can be determined as a function of the community water budget. In other embodiments, the individual properties 714-716 do not have individual water budgets, and instead the irrigation controllers 130 adjust irrigation relative to water usage over the community.

Still referring to FIG. 7A, the community may include one or more community water meters 722 measuring water usage at the community. The community meter 722 can be similar to meter 122 or can cooperate with a communication device (e.g., communication device 122*b*) or include a transceiver to allow the community meter 722 to forward measured water usage to one or more of the irrigation controllers 130. The properties 714-716, in some instance, can also include individual meters 122 (and/or meter 122*a*). In other embodiment, a community meter 722 is not used, and instead the individual meters 122 of each property 714-716 are used to determine relative community water usage that can be used by the one or more irrigation controllers 130 in controlling and/or potentially adjusting irrigation.

A communication device 122*b* can be cooperated with the individual meters 122*a*, or the meters 122 can incorporate a transceiver, such as a wireless transceiver. The irrigation controller 130 at each property controls valves 132 relative to each property to control irrigation. One or more of the properties 714-716 may also include a separate display device 324 to receive water usage information, notification and/or statistics. In some instances, a separate display device 324 limits information available through the display device to information specific to the property, while in other instances a separate display device may provide information about the community. Further, users can be notified of potential costs for water usage, increased costs for continued water usage, imposed restrictions due to predicted excess water usage, costs and/or penalties for exceeding budgets and other relevant information. For example, due to water usage and/or predicted water usage over the community, the individual users may be notified that excess fees may result if water usage at the properties exceed property budgets in attempts to keep the community water usage within budget.

In some instances, one or more of the irrigation controllers 130 can be coupled with a distributed network 624, such as the Internet, and services and/or sources 626, 630, 632 accessible over the network 624. Additionally or alternatively, one or more of the irrigation controllers 130 can further be configured to communicate with one or more of the other irrigation controllers (e.g., over a 900 MHz wireless communication channel, over direct wired communication, over a distributed network, or other such relevant communication mechanisms). For example, a first irrigation controller may have access to the network 624 and can receive budget information from a water authority or other source (e.g., a community association) and can forward that information to one or more other irrigation controllers. Additionally, in some instances, the information can be forwarded from irrigation controller to irrigation controller until those irrigation controllers 130 that may need the information have the relevant information. The individual irrigation controllers may additionally include addressing or other identifiers that allow specific communications and/or information to be addressed or otherwise directed to a specific irrigation controller (e.g., when different properties 714-716 have different water budgets).

Furthermore, the irrigation system 710 of the community can be configured with a main or central irrigation controller with a plurality of satellite controllers, with the central irrigation controller forwarding irrigation scheduling for the satellite controllers, or forwarding water budgets specific to the satellite controllers to allow the satellite controllers to control irrigation relative to the corresponding water budget. The example embodiment depicted in FIG. 7A shows each individual property with an irrigation controller 130. It is noted, however, that a single irrigation controller 130 may provide control of irrigation over the community while tracking water usage of the community as well as at individual properties so as to predict water usage and attempt to at least adjust irrigation in attempts to keep water usage within a budget for the community. Similarly, the single controller may notify one or more of the individual property owners, for example through the separate display devices 324, through an irrigation controller when present at the property or through other notification, that the particular user may be charged with a penalty if water use at the property exceeds a property budget.

Figure 7B:
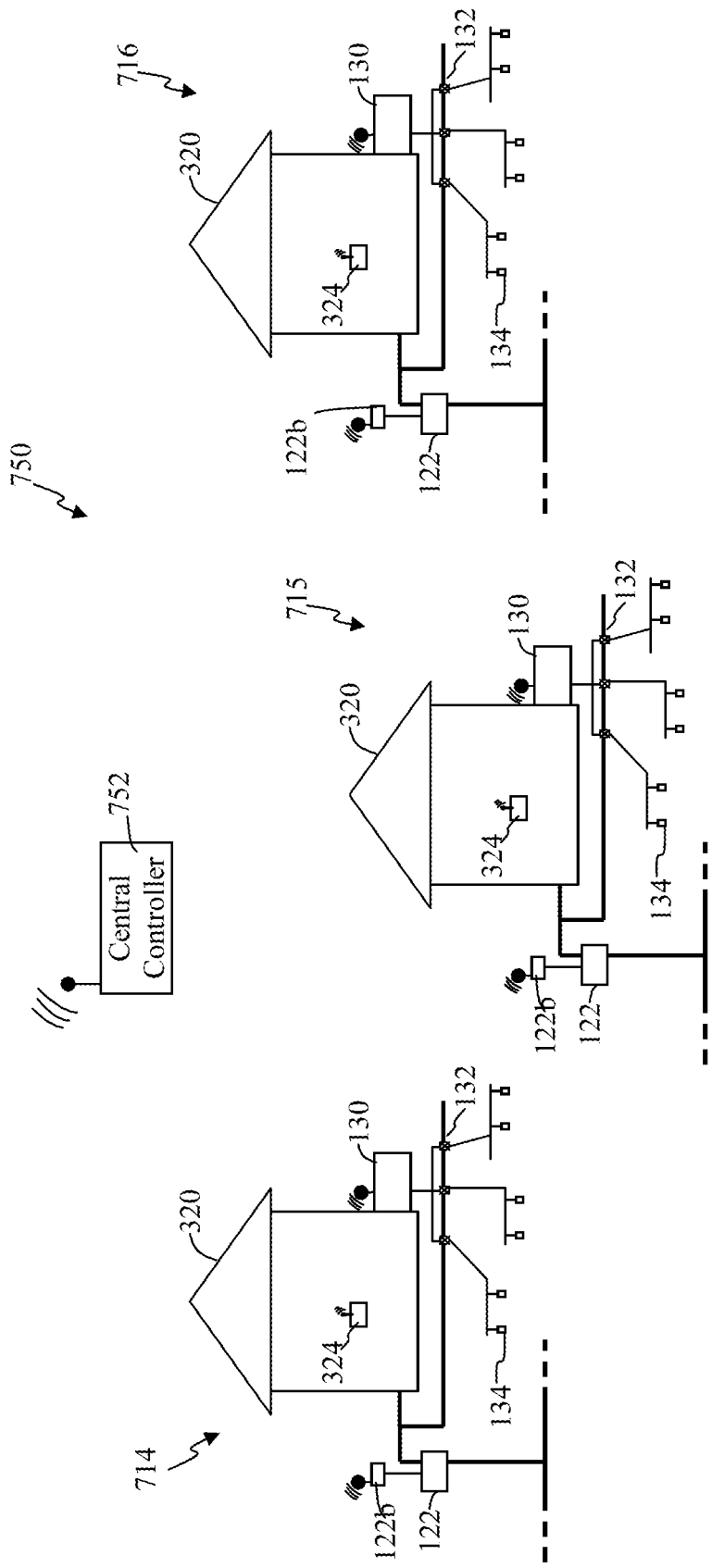
FIG. 7B depicts a simplified diagram of an irrigation system with a central irrigation controller in communication with a plurality of sub-controllers or satellite controllers.

FIG. 7B depicts a simplified diagram of an irrigation system 750 according to some embodiments where irrigation is controlled through a central irrigation controller 752 in communication with a plurality of sub-controllers or satellite controllers 130, which may be similar to the satellite controllers 622 described above with regard to FIG. 6. The central irrigation controller 752 provides a cooperative water usage over a plurality of properties 714-716. The communication between the central irrigation controller 752 and the sub-controllers 130 can be over wireless, wired, fiber optic, optical or other relevant communication paths, and further can be over direct communication links, over local area network, home area network, one or more distributed networks, such as the Internet, or a combination of such networks. The properties 714-716 can be at substantially any geographic location and can be substantially any distance from the central irrigation controller 752 as long the central irrigation controller is in at least intermittent communication with the distributed irrigation controllers 130 at the various properties. Further, each property 714-716 includes one or more meters 122 and/or dedicated meters (not shown in FIG. 7B). The central irrigation controller 752 can utilize the measured and/or determined water usage to determine whether adjustments to irrigation at individual properties need to be implemented (e.g., adjustments at a first property 714 due to predictions that the water budget is expected to be exceeded at the first property 714). Similarly, the central irrigation controller 752 may, in some embodiments, implement adjustments at one or more of the properties 714-716 as a result of an expectation that a predicted cooperative total water usage over two or more of the multiple properties 714-716 is predicted to be exceeded a cooperative water budget.

Figure 7C:
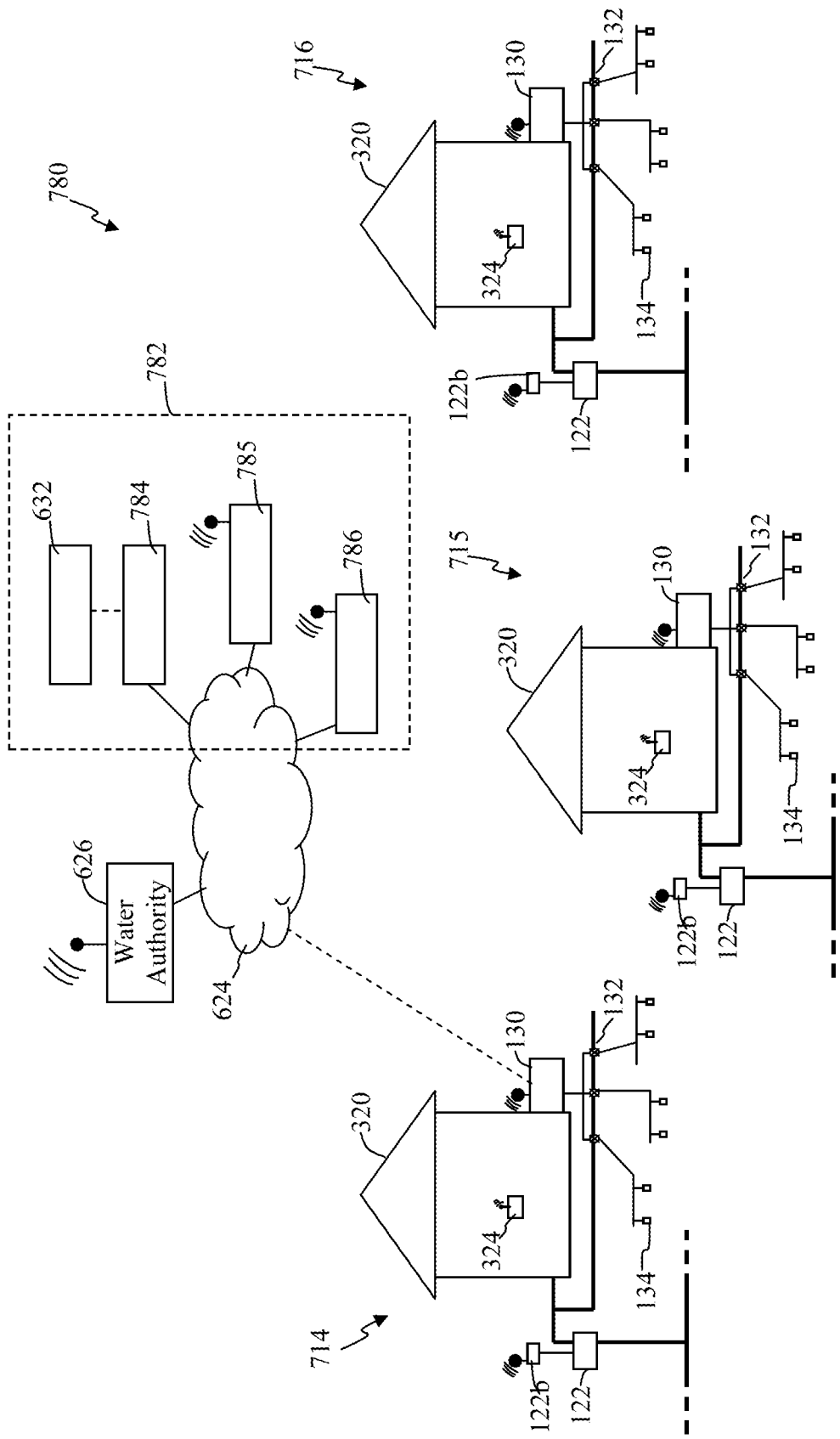
FIG. 7C depicts a simplified diagram of an irrigation system according to some embodiments where irrigation is controlled through a distributed central irrigation controller in communication with one or more irrigation controllers or in some instances satellite controllers.

FIG. 7C depicts a simplified diagram of an irrigation system 780 according to some embodiments where irrigation is controlled through a distributed central irrigation controller 782 in communication with one or more irrigation controllers 130 or in some instances satellite controllers 130. The distributed central irrigation controller 782 is implemented through one or more devices 784-786 distributed over and in communication through a distributed network 624. The distributed devices 784-786 can be servers, computers or other relevant devices that can provide some or all of the irrigation control to control irrigation and/or provide instructions to one or more local controllers 130, including provide some or all of the water use and budget analysis as described above and further below. In some embodiments, the distributed irrigation controller 782 provides substantially all of the irrigation control while the local irrigation controllers 130 simply implement instructions and/or schedules provided by the distributed irrigation controller 782. One or more distributed devices 784-786 can communicate with the irrigation controller 130 over the distributed network 624 and/or via wireless communication (e.g., cellular, satellite or other such relevant wireless communication).

Figure 8B:
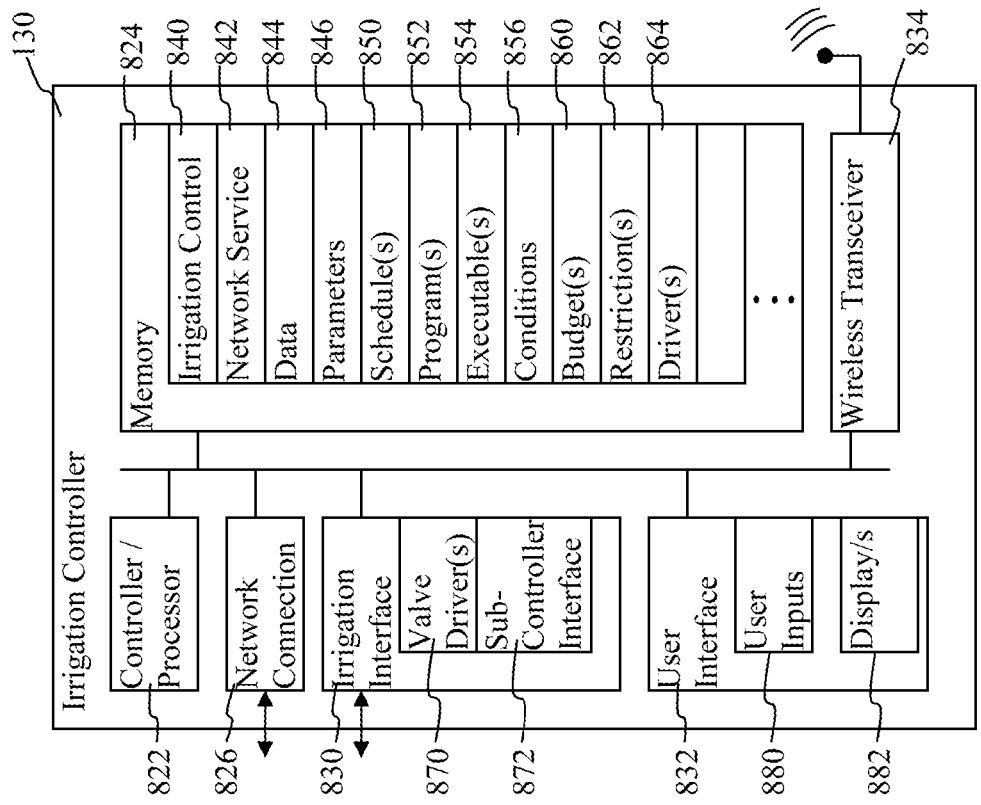
FIG. 8B depicts a simplified block diagram of an irrigation controller according to some embodiments.
Figure 8A:
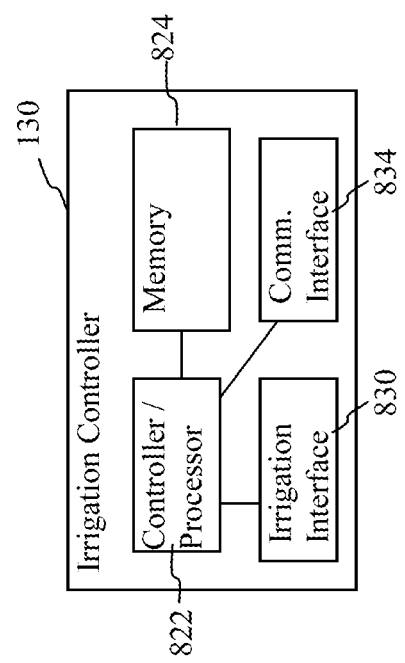
FIG. 8A depicts a simplified block diagram of an irrigation controller according to some embodiments.

FIG. 8A depicts a simplified block diagram of an irrigation controller 130 according to some embodiments. The irrigation controller includes a controller 822, one or more memory and/or digital storage 824, an irrigation interface 830 and a communication interface 834 (for example, a receiver, transmitter or transceiver). The controller 822 can be implemented through one or more processors, microprocessors, logic devices, hardware, firmware and/or combinations thereof. Thus, irrigation control may be performed using substantially any relevant processor logic or logic circuit. The irrigation control provides control over the irrigation and can be software and/or firmware implemented by the controller 822. The memory 824 can be memory separate from the controller 822, can be memory as part of the controller 822 and/or a combination of separate memory and memory of the controller. The irrigation interface 830 provides a communication interface to interact and/or control valves 132 or other relevant devices. The communication interface 834 allows the irrigation controller 130 to at least receive information, such as information relevant to water usage. Further, the communication interface 834 can provide wireless and/or wired communications. In some embodiments, memory of the controller 130 (e.g., within controller 822 and/or memory 824) stores executable program code or instructions that when executed by a processor of the controller 822 cause the irrigation controller 130 to perform one or more functions such as described herein.

FIG. 8B depicts a simplified block diagram of an irrigation controller 130 according to some embodiments. The irrigation controller includes a controller 822, one or more memory and/or digital storage 824, a network interface 826, the irrigation interface 830, a user interface 832 and one or more communication links and/or transceivers 834. The memory 824 can be memory separate from the controller 822, can be memory as part of the controller 822 and/or a combination of separate memory and memory of the controller. The irrigation control provides control over the irrigation and can be software and/or firmware implemented by the controller 822. The controller 822 can be implemented through one or more processors, microprocessors, logic devices, hardware, firmware and/or combinations thereof. Thus, irrigation control may be performed using substantially any relevant processor logic or logic circuit.

The memory 824 can generally store executable program code including one or more of irrigation control software and/or applications 840, a network service software and/or applications 842, data 844, parameters 846, one or more irrigation schedules 850, programs and/or software 852, executables, 854, conditions and/or statistics 856, one or more budgets including at least one water budget 860, restrictions 862 when applicable, drivers 864 and the like. In some instances, the memory 824 may additionally store one or more: soil conditions and parameters, web pages, web page formatting, geographic data, depictions of geographic areas, meter data, billing information, budget periods, costs, fees, penalties, and/or other relevant programs and data. The memory can be implemented through RAM, ROM, EPROM, flash memory or other memory technology, CD-ROM, digital video disk (DVD) or other optical disk storage, magnetic storage, and/or substantially any other medium or combinations of medium and/or storage that can be used to store the desired information and that can be accessed by the controller 822. In many embodiments, the irrigation controller 130 is a stand alone device that can be positioned relative to valve 132 to control irrigation. In other embodiments, the irrigation controller 130 may be implemented through a computer, such as personal computer (PC), laptop or the like that includes the processor(s) 822, memory 824 and interfaces 832.

The network connection 826 and network service 842, in part, allows the irrigation controller 130 to communicate with other devices, whether over a local network, a distributed network, the Internet, a power line communication network and/or other such networks. For example, the network connection 826 can allow the irrigation controller to receive changes, budgets, updates, parameters, conditions, data, meter data, billing information, budget periods, costs, fees, penalties, information about buying, selling and/or trading water usage and/or credits, and other information, as well as communicate instructions, status information, provide diagnostic information, notifications, warnings, information about water usage, buying, selling and/or trading water usage and/or credits, and substantially any action and/or to transmit or receive substantially any information relevant to the irrigation controller 130. In forwarding information, in some embodiments, the controller 822 and/or network service 842 identifies the type of device expected to receive the communication to determine the type of information and/or content to be forwarded, and/or how to format the information and/or content. For example, a first type of the separate display device 324 may have a certain level of functionality while a second type of separate display device 324 may have additional functionality that the first display device does not have, and as such, additional and/or different information and data may be provided to the second display device than is provided to the first display device. Similarly, in some instances the irrigation controller 130 may communicate with other types of devices, such as a computer, a wireless portable device or the like, and as such, the type of, amount and format of the content or information can be identified and configured relative to the type of device receiving the information. Further, in some embodiments, the irrigation controller 130 may be implemented on a general purpose personal computer including irrigation control software 840 that implements at least in part the irrigation control functionality.

The irrigation interface 830 allows the irrigation controller 130 to activate irrigation, for example, by communicating with one or more valves 132 and/or satellite controllers 622. For example, the irrigation interface 830 can include one or more valve drivers 870 and/or one or more satellite controller interfaces 872. The controller 822 can forward instructions to the valves 132 through the valve drivers 870, and similarly can communicate with satellite controllers 622 through the satellite controller interfaces 872.

The user interface 832 allows a user to directly interact with the irrigation controller 130. The user interface can include user inputs 880 such as but not limited to physical buttons and/or keypad, touch screen, pointing device (e.g., mouse, mouse pad, track ball, stylist, etc.), and the like. The user interface 832 can additionally include one or more display devices 882, which can include but is not limited to, one or more lights, light emitting diodes (LED), and one or more displays (e.g., liquid crystal display (LCD), LCD touch screen, plasma display panel, light emitting diode display (such as but not limited to organic light emitting diode (OLED), light emitting polymer (LEP), organic electro luminescence (OEL), and the like), and other relevant displays). The transceiver 834 provides the irrigation controller 130 with the capability to transmit and/or receive information, data, budgets, parameters, conditions, sensor data, meter data and/or other such relevant information. The transceiver 834 can be a wired transceiver, wireless transceiver, optical transceiver or other such transceiver or combination of transceivers.

Figure 9B:
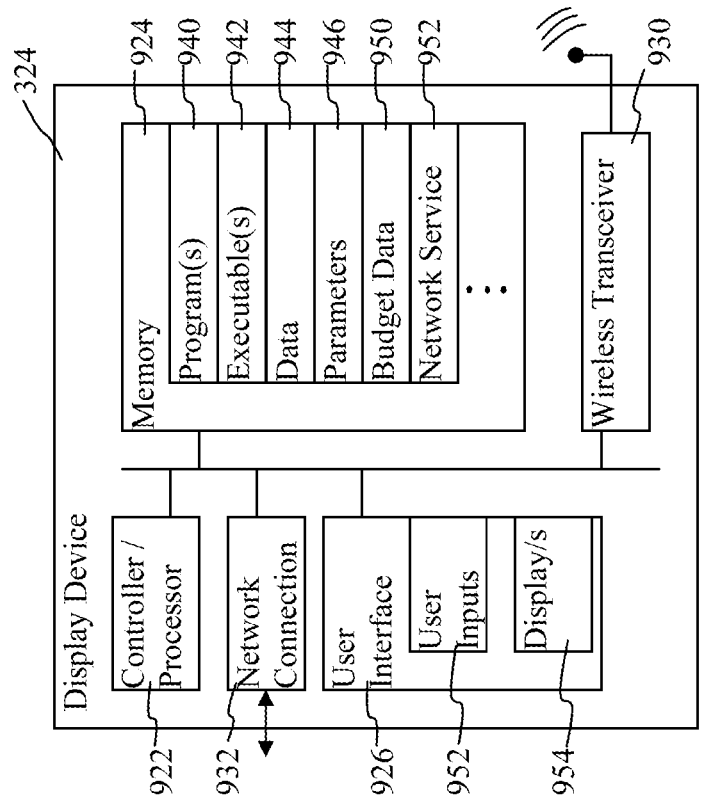
FIG. 9B depicts a simplified block diagram of an implementation of a separate display device according to some embodiments.
Figure 9A:
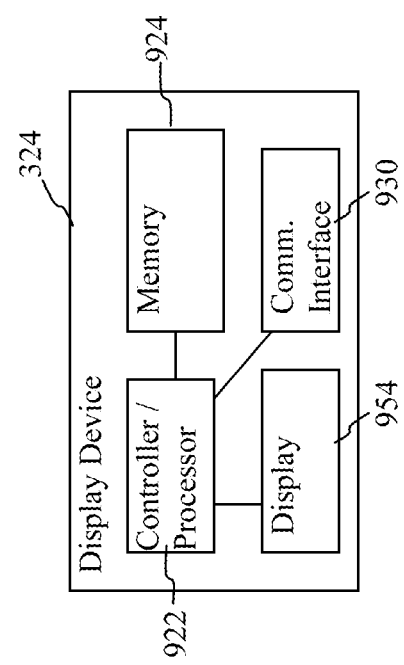
FIG. 9A depicts a simplified block diagram of an example implementation of a separate display device according to some embodiments.

FIG. 9A depicts a simplified block diagram of an example implementation of a separate display device 324 according to some embodiments. The display device 324 includes a display device controller 922, one or more memory and/or digital storage 924, a display 954 and a communication interface 930 (for example, a receiver, transmitter or transceiver). The display device controller 922 can be implemented through one or more processors, microprocessors, logic devices, hardware, firmware and/or combinations thereof. The memory 924 can be memory separate from the display device controller 922, can be memory as part of the display device controller 922 and/or a combination of separate memory and memory of the display device controller. The communication interface 930 allows the display device to at least receive information that can be utilized by the display device controller 922 in generating and displaying information on the display 954, such as budget information and/or notifications when a water budget is exceeded. Further, the communication interface 930 can provide wireless and/or wired communications. In some embodiments, memory of the display device 324 (e.g., within controller 922 and/or memory 924) stores executable program code or instructions that when executed by a processor of the controller 922 cause the display device 324 to perform one or more functions such as described herein.

FIG. 9B depicts a simplified block diagram of an implementation of a separate display device 324 according to some embodiments. The display device 324 includes a display device controller 922, one or more memory and/or digital storage 924, a user interface 926 and one or more communication links and/or transceivers 930. In some embodiments, the display device 324 can include a network interface and/or connection 932.

The display device controller 922 can be implemented through logic devices, hardware, firmware and/or combinations thereof. In some embodiments, the controller is implemented at least in part through one or more processors and/or microprocessors configured to receive and process information and data, and display relevant information through the user interface 926. The display device controller 922 can include a graphics processor or the one or more processors or microprocessors implementing the display device controller 922 can provide graphics processing allowing the display device 324 to display content and/or graphics through the user interface 926.

The memory 924 can be memory separate from the display device controller 922, can be memory as part of the display device controller 922 and/or a combination of separate memory and memory of the display device controller. Further, the memory 924 can generally store executable program code including one or more of programs and/or software 940, executables, 942, data 944, parameters 946, one or more budgets and/or budget data 950, network services 952 and the like. The memory can be implemented through RAM, ROM, EPROM, flash memory or other memory technology, CD-ROM, digital video disk (DVD) or other optical disk storage, magnetic storage, and/or substantially any other medium or combinations of medium and/or storage that can be used to store the desired information and that can be accessed by the display device controller 922. In some embodiments, the display device 324 is a computer and/or implemented through a computer.

The user interface 926 allows a user to directly interact with the display device 324. In some embodiments, the user interface includes user inputs 952, such as but not limited to physical buttons and/or keypad, touch screen, pointing device (e.g., mouse, mouse pad, track ball, stylist, etc.), and the like. The user interface 926 can additionally include one or more display devices 954, which can include but is not limited to, one or more lights, light emitting diodes (LED), and one or more displays (e.g., liquid crystal display (LCD), LCD touch screen, plasma display panel, light emitting diode display, and other relevant displays).

The transceiver 930 provides the display device 324 with the capability to receive and/or transmit information, data, budgets, parameters, conditions, sensor data, meter data and/or other such relevant information. The transceiver 930 can be a wired transceiver, wireless transceiver, optical transceiver or other such transceiver or combination of transceivers. The network connection 932 allows the display device 324 to communicate with other devices, whether over a local network, a distributed network, the Internet, a power line communication network and/or other such networks. For example, the network connection 932 can allow the display device to receive notifications that a water budget is exceed, notification of predictions relative to water usage and/or predictions of exceeding the water budget, meter data, billing information, budget periods, costs, fees, penalties and other such information, as well as communicate information such as communication information to a water authority or a user's remote device (e.g., wireless phone).

Figure 10B:
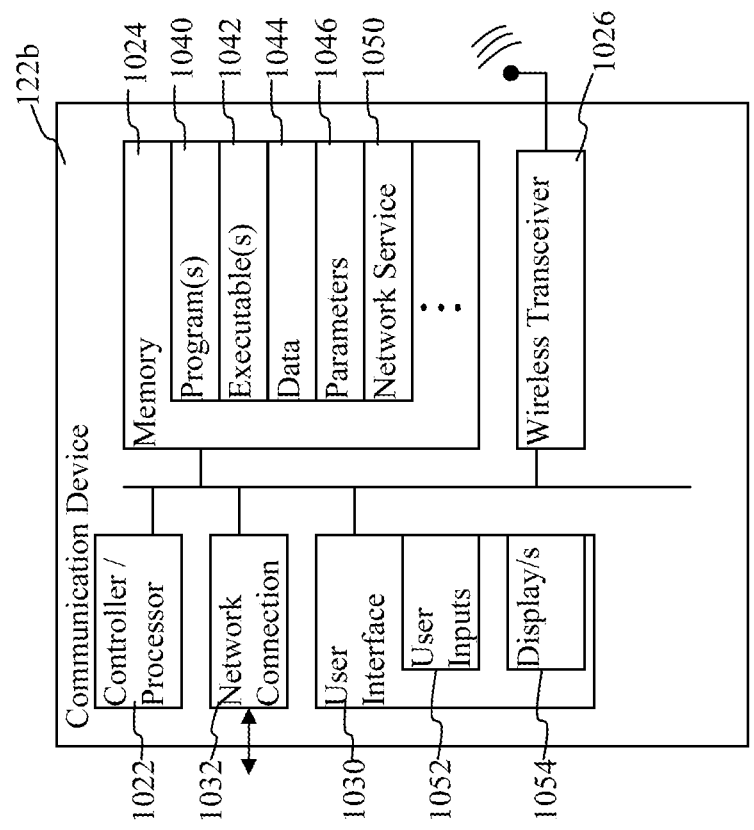
FIG. 10B depicts a simplified block diagram of an implementation of a communication device according to some embodiments.
Figure 10A:
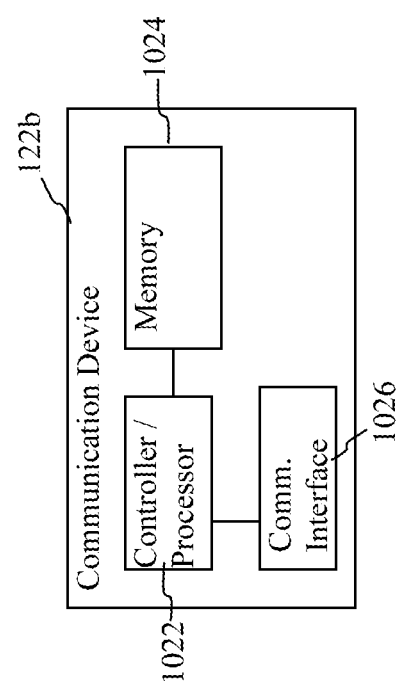
FIG. 10A depicts a simplified block diagram of an example implementation of a communication device according to some embodiments.

FIG. 10A depicts a simplified block diagram of an example implementation of a communication device 122*b* according to some embodiments. The communication device 122*b* includes a communication device controller 1022, a memory and/or digital storage 1024 and a communication interface 1026 (for example, a receiver, transmitter or transceiver). The communication device controller 1022 can be implemented through one or more processors, microprocessors, logic devices, hardware, firmware and/or combinations thereof. The memory 1024 can be memory separate from the communication device controller 1022, can be memory as part of the communication device controller 1022 and/or a combination of separate memory and memory of the communication device controller. The communication interface 1026 allows the communication device 122*b* to at least forward measured water usage information that can be utilized in determining water usage. Further, the communication interface 1026 can provide wireless and/or wired communications. As described above, the communication device 122*b* may be a separate device in communication with one or more meters 122, or may be implemented into a water measuring device or other device in communication with a water measuring device. In some embodiments, memory of the communication device 122*b* (e.g., within controller 1022 and/or memory 1024) stores executable program code or instructions that when executed by a processor of the controller 1022 cause the communication device 122*b* to perform one or more functions such as described herein.

FIG. 10B depicts a simplified block diagram of an implementation of a communication device 122*b* according to some embodiments. The communication device 122*b* includes a communication device controller 1022, one or more memory and/or digital storage 1024, and one or more communication links, transmitter, receiver and/or transceivers 1026. In some implementations, the communication device 122*b* may additionally include a user interface 1030 and/or a network interface and/or connection 1032. As described above, the communication device 122*b* may additionally include, in some embodiments, a water meter that measures water flow, volumes of water and/or usage.

The communication device controller 1022 can be implemented through one or more processors, microprocessors, logic devices, hardware, firmware and/or combinations thereof. In some embodiments, the communication device controller 1022 is implemented at least in part through one or more processors and/or microprocessors configured to receive and process information and data. Additionally in some implementations, the communication device controller 1022 can include a graphics processor or the one or more processors or microprocessors implementing the communication device controller 1022 can provide graphics processing allowing the communication device 122*b* to display content and/or graphics through the user interface 1030.

The memory 1024 can be memory separate from the communication device controller 1022, can be memory as part of the communication device controller 1022 and/or a combination of separate memory and memory of the communication device controller. Further, the memory 1024 can generally store executable program code including one or more of store programs and/or software 1040, executables, 1042, data 1044, parameters 1046, network services 1050 and the like. The memory can be implemented through RAM, ROM, EPROM, flash memory or other memory technology, CD-ROM, digital video disk (DVD) or other optical disk storage, magnetic storage, and/or substantially any other medium or combinations of medium and/or storage that can be used to store the desired information and that can be accessed by the communication device controller 1022.

As introduced above, some embodiments include a user interface 1030 that allows a user to directly interact with the communication device 122*b*. The user interface can include user inputs 1052, such as but not limited to physical buttons and/or keypad, touch screen, pointing device, and the like. The user interface 1030 can additionally include one or more display devices 1054, which can include but is not limited to, one or more lights, light emitting diodes (LED), and one or more displays (e.g., liquid crystal display (LCD), LCD touch screen, plasma display panel, light emitting diode display, and other relevant displays).

The transceiver 1026 provides the communication device 122*b* with the capability to transmit and receive information, data, meter data and/or other such relevant information, and can be implemented as a wired transceiver, wireless transceiver, optical transceiver or other such transceiver or combination of transceivers. The transceiver 1026 can provide the communication device with the capability to communicate with, for example, a meter 122, one or more separate meters 422, the irrigation controller 130, the display device 324 and/or other devices or services, such as a watering authority. Similarly, the network connection 1032 allows the communication device 122b to communicate with devices over other networks, whether over a local network, a distributed network, the Internet, a power line communication network and/or other such networks. For example, the network connection 1032 can allow the communication device 122b to communicate with a meter 122, one or more separate meters 422, irrigation controller 130, display device 324 and/or other devices or services, such as a watering authority.

FIG. 11A depicts a simplified block diagram of an example meter 122 according to some embodiments. The meter 122 includes a water measuring device, such as a water meter, flow sensor or other such measuring device 1122, a meter controller 1130, memory 1132 and a communication interface 1134 (for example, a receiver, transmitter or transceiver). The water measuring device 1122 measures water flow, volumes of water, usage and/or consumption. The meter controller 1130, when incorporated, can be implemented through one or more processors, microprocessors, logic devices, hardware, firmware and/or combinations thereof, and is configured to initiate communication of water usage, flow and/or other relevant information, which may simply be a pulse based on a certain number rotations of a paddle wheel, water flow or measured amount of water, or may include more detailed information such as measured volumes of water. The memory 1132 can be memory separate from the meter controller 1130, part of the meter controller 1130 and/or a combination of separate memory and memory of the meter controller. The communication interface 1134, in some embodiments, is simply a transmitter that transmits the relevant measured information or is coupled with a separate communication device 122b that in turn communicates the information from the water meter 122a. Additionally or alternatively, the communication interface 1134 allows the meter 122a to forward information that can be utilized by the irrigation controller 130, the display device 324 or other such devices. Further, the communication interface 1134 can provide wireless and/or wired communications. In some embodiments, memory of the meter 122 (e.g., within controller 1130 and/or memory 1132) stores executable program code or instructions that when executed by a processor of the controller 1130 cause the meter 122 to perform one or more functions such as described herein.

FIG. 11B depicts a simplified block diagram of an implementation of a meter 122 according to some embodiments. The meter 122 includes a water meter water meter, flow sensor or other such device 1122, and in some instances can include an optional user interface 1124. The water meter 1122 measures water flow, volumes of water, usage and/or consumption, and the user interface 1124 can provide information about the measured water flow and/or usage. In some instances, the user interface includes a display 1126 that comprises one or more counters. In other embodiments that include a display, the display may include but is not limited to, one or more lights, light emitting diodes (LED), and one or more displays (e.g., liquid crystal display (LCD), LCD touch screen, plasma display panel, light emitting diode display, and other relevant displays). The meter 122 may, in some embodiments, additionally include a meter controller 1130, one or more memory and/or digital storage 1132, one or more communication links, communication transmitter, receiver and/or transceivers 1134, and a network interface and/or connection 1136.

The meter controller 1130, when incorporated, can be implemented through one or more processors, microprocessors, logic devices, hardware, firmware and/or combinations thereof configured and/or programmed to monitor water usage and/or flow, report the usage and in some implementations communicate water usage or receive instructions, scripts, software and/or upgrades relative to updates, control operations, resetting and other such functionality. The memory 1132 can be memory separate from the meter controller 1130, can be memory as part of the meter controller 1130 and/or a combination of separate memory and memory of the meter controller. Further, the memory 1132 can generally store executable program code including one or more of store programs and/or software 1140, executables 1142, data 1144, parameters 1146, network services 1150 and the like, accessible by at least the meter controller 1130 to be utilized and/or implemented by the meter controller. The memory 1132 can be implemented through RAM, ROM, EPROM, flash memory or other memory technology, CD-ROM or other optical disk storage, magnetic storage, and/or substantially any other medium or combinations of medium and/or storage that can be used to store the desired information and that can be accessed by the meter controller 1130.

In some embodiments the user interface 1124 may optionally include user inputs 1152, such as but not limited to physical buttons and/or keypad, touch screen, pointing device, and the like. The transceiver 1134 can provide the meter 122 with the capability to transmit and receive information, meter data and/or other such relevant information, and receive information, such as upgrades, reset commands or other such information and/or instructions. The transceiver 1134 (or separate transmitter and receiver) can provide wired, wireless or optical communication. Similarly, the network connection 1136 can allow the meter 122 to communicate with other devices and/or services, such as a water authority, whether over a local network, a distributed network, the Internet, AMI, AMR, a power line communication network and/or other such networks.

The water meter 1122 measures water flow and usage relative to the given property or through a given water line. For example, a water meter is used by a water authority in billing the water used at a given property. The present embodiments can utilize the meter 122 (and/or in some instances one or more separate meters 422) to track the water usage as provided by the one or more meters 122, 422 to make adjustments to water usage, at least with respect to irrigation water usage, in attempts to keep water usage within a budget. Some simplified embodiments utilize the meter 122 or a separate meter 422 to similarly track the water usage to notify a user when water usage exceeds a water budget and in some instances is predicted to exceed a water budget.

Figure 12A:
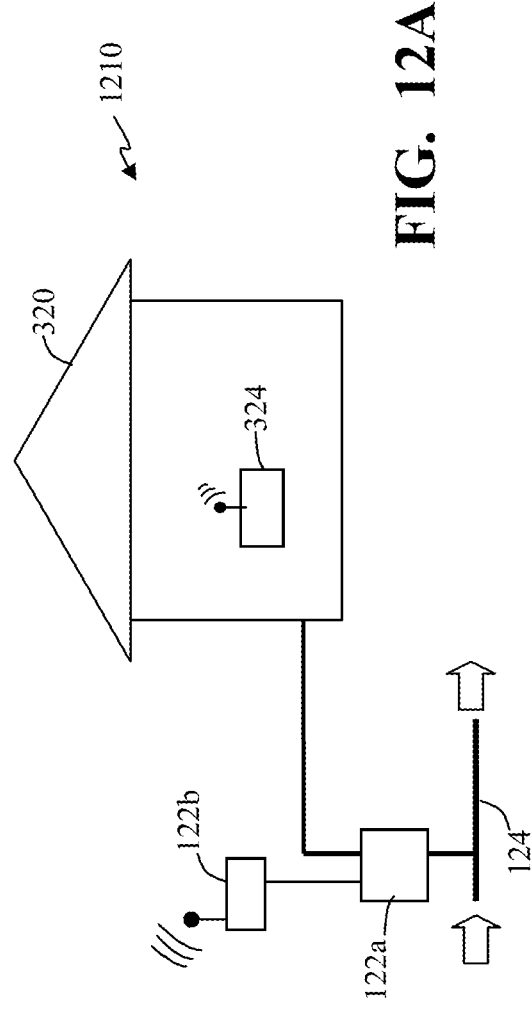
FIG. 12A depicts a simplified block diagram of a notification system according to some embodiments.

FIG. 12A depicts a simplified block diagram of a notification system 1210 according to some embodiments. The notification system includes one or more meters 122 that track water usage from a water source 124 and communicate that water usage information to the separate display device 324. In some instances, a separate communication device 122b is included that communicates the measured water usage, while in other instances the meter 122 incorporates the communication device 122b and/or the communication functionalities to communicate the measured water usage.

Upon receiving the water usage information the display device 324 can determine whether water usage exceeds and/or is predicted to exceed a water budget for a given period of time. These calculations and/or evaluations of water usage can be similar to those described above and further below. The display device 324 can then notify a user of the current statistics relative to water usage, including whether the budget is exceeded, whether predicted water usages is predicted to exceed the budget, costs associated with water usage and/or exceeding the water budget and other relevant information. Further, in some embodiments, the display device 324 may be configured and/or other programmed with the functionality to identify how water usage may be adjusted, which might include the functionality to identify how irrigation water usage may be adjusted. This information can be provided to the user give the user relevant information for making adjustments, for example, to the irrigation controller as suggested by the display device in those instances where an irrigation controller is incapable of receiving metered data and/or incapable of determining potential adjustments that might be made relative to the water budget.

Figure 12B:
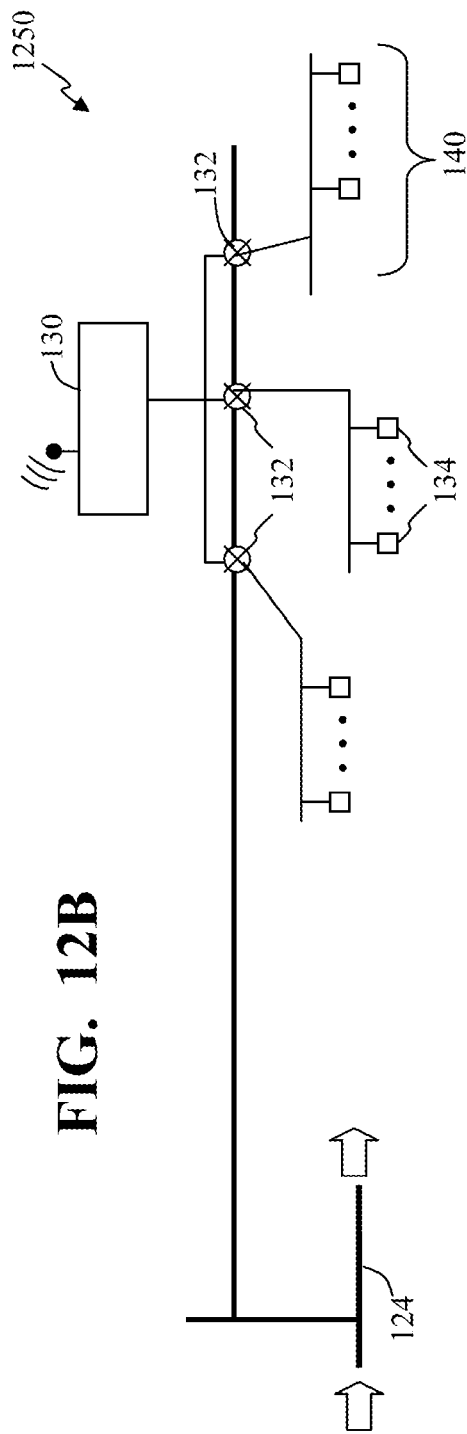
FIG. 12B depicts a simplified diagram of a system according to some embodiments that implements water irrigation according to one or more volumetric water budgets or fixed volumes of water.

FIG. 12B depicts a simplified diagram of a system 1250 according to some embodiments that implements water irrigation according to one or more volumetric water budgets or fixed volumes of water. The system 1250 includes a water source or supply 124, an irrigation controller 130, one or more valves 132 and water delivery devices 134. The water source or supply 124 is connected with the one or more valves 132 that in turn each distribute water to one or more irrigation delivery devices 134. The valves are depicted for simplicity in series on a water source or water line. However, it will be apparent to those skilled in the art that the valves are typically in parallel allowing one valve to be closed while one or more down stream valves can still open and supply water to the water delivery devices 134.

The irrigation controller 130 is connected to the one or more valves 132 and controls and/or instructs the valves 132 to open allowing water to be delivered to the one or more water delivery devices 134 associated with the one or more activated valves 132 or close to prevent water from being delivered to the one or more water delivery devices associated with the valve. In some instances, one or more valves are associated with an irrigation zone 140 or geographic area to be watered, and often the irrigation controller 130 implements the irrigation in accordance with runtimes defined for each zone 140.

Further, for simplicity, the system 1250 is depicted with a single irrigation controller 130. It is noted, however, that the irrigation controller 130 can be a single irrigation controller, a plurality of controllers in communication, a central controller in cooperation with one or more satellite controllers 622, a remote central control 752 in cooperation with a plurality of additional irrigation controllers 130 and/or satellite controllers 622, a distributed irrigation controller 782 or the like. Still further, for simplicity, the system 1250 is shown with the irrigation controller 130 unassociated with a buildings 320. Again, it is noted that it will be apparent to those skilled in the art that the irrigation controller 130 of the system 1250 can be associated with one or more buildings 320, properties and the like as described above and further below.

The irrigation controller 130 provides control over the irrigation, at least in part, based on one or more water budgets, that are typically defined over a budget period or that are associated with an irrigation event. Additionally, the irrigation controller 130 determines water usage or estimates water usage without the use of a meter, flow sensor or other water usage measurement device. In some embodiments, the irrigation controller may be provided with usage information, such as from a user, that correlates with one or more irrigation events. Additionally or alternatively, the irrigation controller can estimate water usage calculated based on one or more factors, such as but not limited to estimated water pressure, water pipe size(es), types and number of water deliver devices (e.g., type of sprinkler, drip, etc.), irrigation runtime(s), and other such factors. Utilizing the provided water usage correlation and/or calculated water usage the irrigation controller can track water usage relative to the water budget and take actions when the estimated water usage exceeds a budget and/or is predicted to exceed a budget relative to a budget period. Further as described above and further below, the irrigation controller 130 can use one or more volumetric water budgets in determining whether irrigation should be adjusted to maintain water usage within the prescribed one or more water budgets.

Additionally, as introduced above and fully described below, the irrigation controller can provide information to a user based on the evaluation of estimated water usage relative to the one or more water budgets. For example, the irrigation controller 130 can still display calculated water use information, budget information, predicted cost information, provide warnings relative to usage and the budgets, and other such information as described fully below.

Figure 13:
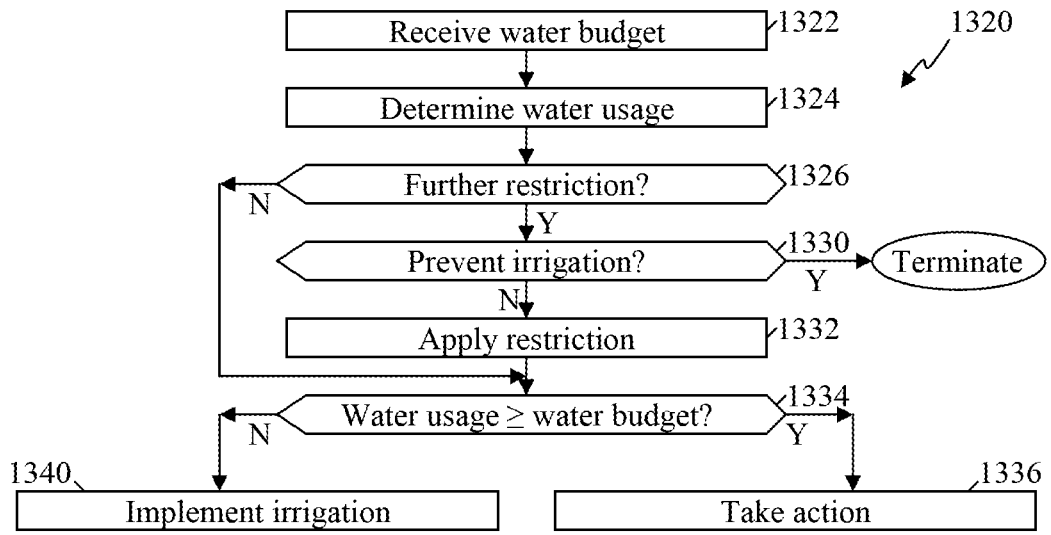
FIG. 13 depicts a simplified flow diagram of a process for use in controlling irrigation relative to a water budget.

FIG. 13 depicts a simplified flow diagram of a process 1320 for use in controlling irrigation relative to a water budget. In step 1322, the irrigation controller 130 receives and/or determines a water budget. The water budget can be entered into the irrigation controller 130 by a user through a user interface, received in communications from the meter 122, received from over a distributed network 624 (e.g., an intranet, local area network, the Internet or other relevant distributed networks), wirelessly received and/or other such methods. In some implementations, the water budget is communicated from a water authority. For example, the water authority may have communication capabilities with the meter 122 that can forward the information to the irrigation controller 130; may communicate with the irrigation controller 130 via a distributed network, such as the Internet; may forward the information to a portable storage medium (e.g., a magnetic strip, a thumb drive, a memory stick, an optical disc and the like) that can be accessed by the irrigation controller 130; wirelessly transmit the water budget (e.g., via radio frequency communication); forwarded through a notification (e.g., paper, email, radio broadcast, or other such notification) to a user allowing the user to enter the budget; and other such methods. Further, the water budget can be defined as a fixed volume of water, can be defined as a cost of water that the irrigation controller 130 can use to calculate a volumetric water budget, can be defined as runtimes relative to known flows, or other such budgets or combinations of budgets.

In step 1324, water usage information is received and/or calculated. The water usage information can be a continued accumulation of water use, a pulse of predefined flow or amount of water, or other such indication of water usage. In some instances, the water usage information can be provided relative to the predefined budget period relative to the water budget. As one example, the meter 122 can supply a measured amount of water use from a previous reading, while in other instances, the measured water usage is a continuous counting of defined volumes of water (e.g., a gallon). In some instances the water usage is calculated. For example, flow rates can be detected, such as from the meter 122 or meter 422. Additionally or alternatively, water usage or an estimate of water usage can be calculated based on irrigation run times, knowledge of water delivery devices 132, water pressure and/or other such factors.

In optional step 1326, it is determined whether further restrictions on water usage and/or irrigation are to be applied. In those instances where further restrictions are to apply step 1330 is entered to determine whether the identified restrictions dictate that the current time or event being evaluated is restricted as a non-irrigation time or event (e.g., restrictions dictate that irrigation should not be implemented at a specified time, for a specified event, over a defined period of time, on the current day, over a specified irrigation zone or zones, and/or other designations). In those instances where restrictions dictate that irrigation should not occur the process 1320 terminates with respect to the time or event being evaluated and can be repeated any number of times relative to other times or events, including multiple times during a single budget period, a single day and the like. Alternatively, step 1332 is entered to apply any further restrictions, such as when implementing adjustments to irrigation scheduling (e.g., irrigation is limited to occur between 12:00 AM and 6:00 AM, and other such restrictions).

In step 1334, the water usage is evaluated relative to the water budget. For example, the evaluation can include determining whether the water use has a predefined relationship relative to the water budget. In those instances where the evaluation indicates that one or more actions should be taken, for example the water use has a predefined relationship relative to the water budget, step 1336 is entered where the irrigation controller 130 takes action relative to further irrigating. This action can include reducing water usage, increasing irrigation runtimes for example when irrigation run times were previously reduced due to early evaluations of water usage, skipping irrigation events, skipping days of irrigation, preventing irrigation on one or more zones, reducing irrigation runtimes, and other such actions and combinations of actions. Alternatively, when the evaluation of the water usage does not recommend action be taken (e.g., the water use does not have the predefined relationship with the water budget) step 1340 is entered where irrigation is implemented and/or allowed to proceed as scheduled, including scheduled in accordance with previous adjustments to irrigation scheduling (e.g., where based on prior evaluations of irrigation water usage the irrigation schedule was adjusted to reduce irrigation runtimes).

The predefined relationship of the water usage relative to the water budget can depend on many factors including the capabilities of the irrigation controller 130 and the information available to the irrigation controller. For example, the predefined relationship may be a determination of whether water usage has exceeded the water budget within the give budget period of time. In other instances, the relationship may be based on an estimated and/or predicted further use of water during the defined budget period. Additionally, the predefined relationship may take into consideration non-irrigation water usage (e.g., water use within a building 320) as well as irrigation use. Further, priorities may be taken into account when determining the predefined relationship and whether the water use has the predefined relationship, for example, water use within the building may be defined as a higher priority than water use for irrigation.

The process 1320 described above can similarly be implemented, in some embodiments, while applying more than one water budget. For example, there may be a billing period water budget as well as a daily or weekly water budget. As such, the process 1320 may take into account each relevant budget and/or repeat the process for each relative budget, which may take into account prior adjustments made in attempts to comply with previously evaluated water budgets.

For example, the process 1320 may evaluate water usage relative to a monthly water budget and potentially make adjustments to irrigation relative to the evaluated water usage in relation to the monthly budget, and then further evaluate predicted irrigation water usage relative to a given daily water budget and/or irrigation event budget and potentially make further adjustments relative to the intended irrigation.

As described above, the water usage can be provided to the irrigation controller 130 or the irrigation controller can determine the water usage based on one or more parameters. For example, in some implementations, the irrigation controller 130 receives water usage information from the meter 122 (and/or meter 422 when relevant). This information can be a continuously accumulating amount, an accumulated amount over a specified period, an accumulated amount relative to a last time water usage information was provided or other relevant information. The irrigation controller 130 can then determine a water usage relative to the budget period.

Figure 14:
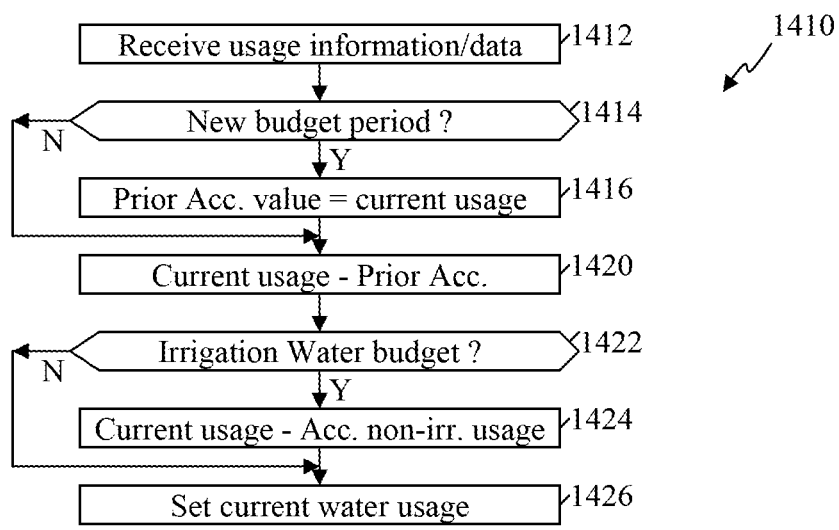
FIG. 14 depicts a simplified flow diagram of a process, according to some embodiments, to determine the current water usage relative to a current budget period.

FIG. 14 depicts a simplified flow diagram of a process 1410, according to some embodiments, to determine the current water usage relative to a current budget period when water usage data is provided to the irrigation controller 130 as continuous accumulated water usage, such as data that might be provided from standard water meters at a house. In step 1412, water usage data is received. Again, the usage data can be supplied from one or more different sources. In step 1414, it is determined whether a new budget period has started since a previous usage data was received. In those instances where a new budget period has started step 1416 is entered where a prior accumulated use value is set equal to the received current use data, where the prior accumulated use value defines an accumulated water usage (e.g., as received from the meter, which again in this example may be supplying a continuous accumulation or counting of the water usage) at the beginning of the current budget period. In some instances, a non-irrigation usage value is further reset in step 1416.

In step 1420, the prior accumulated water use value is subtracted from the current usage data. In step 1422, it is determined whether the water budget is an irrigation water budget and applied exclusively to irrigation water usage. For example, when the water budget only applies to an amount or volume of water that can be used for irrigation, and does not take into consideration other water usage at the property (e.g., household water usage), then the process 1410 advances to step 1424. In step 1424, an accumulated non-irrigation water usage value is determined and subtracted from the current water usage determined in step 1420 to provide a revised current water usage relative to irrigation. In step 1426 the current water usage relative to the current water budget is set equal to the usage determined in step 1420 or step 1424.

In other implementations the current water usage may be provided by the meter 124, 422 relative to the current budget period (e.g., an accumulation for the current budget period, a daily accumulation, usage during an irrigation period, or other such usage information). In still other instances, the current water usage may be calculated by the irrigation controller 130 based on prior irrigations. For example, the irrigation controller 130 may receive flow data from the meter 122 and/or one or more flow meters 422 (such as meter exclusive for the irrigation). Based on the flow data, the irrigation controller 130 can determine based on an irrigation run times the amount and/or volume of water delivered through the irrigation system for a given irrigation cycle. Each calculated water use for each irrigation cycle during the budget period can be accumulated to determine a total current water usage data.

Figure 15:
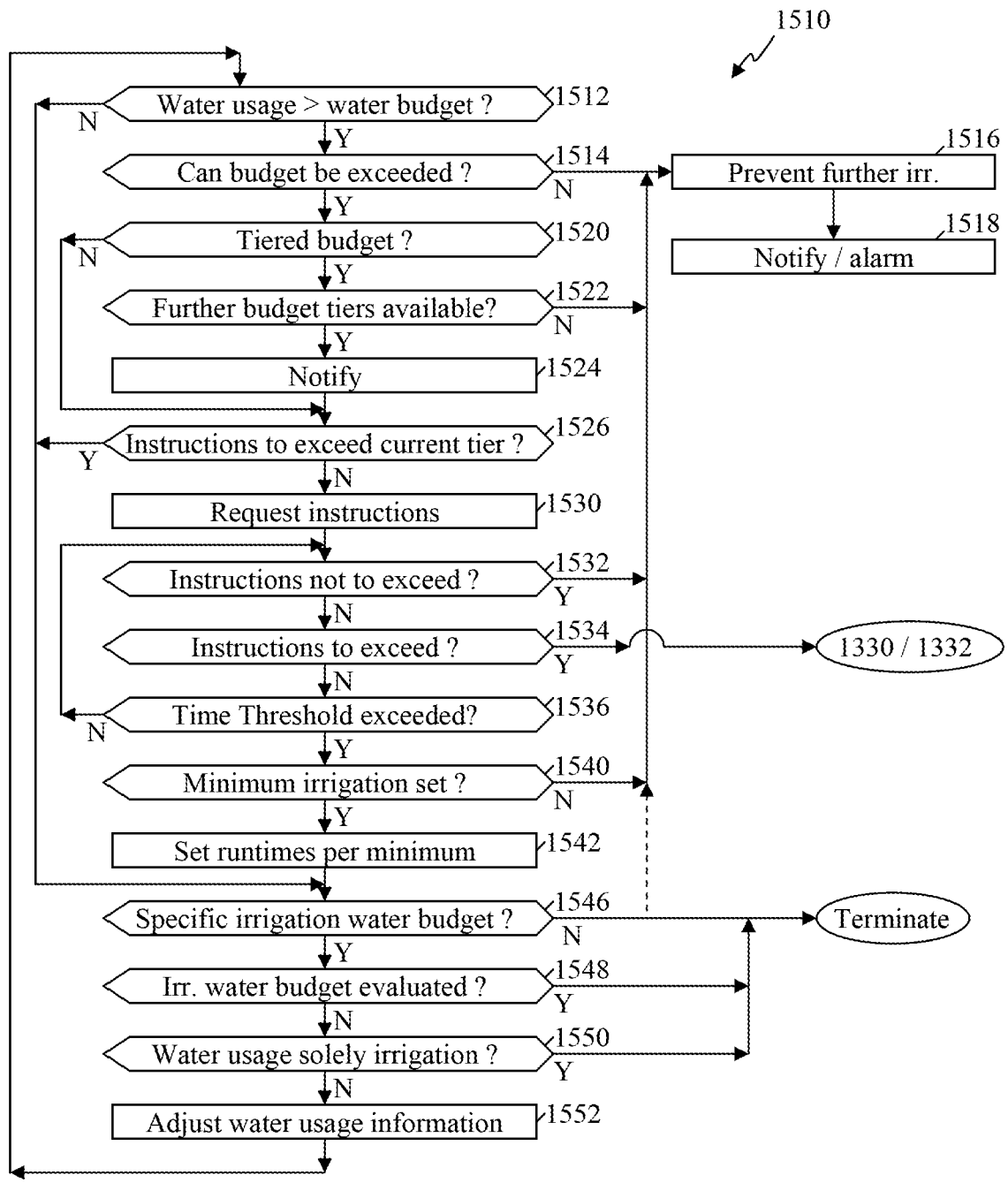
FIG. 15 depicts a simplified flow diagram of an example process used in evaluating the received or determined water usage relative to a water budget according to some embodiments.

FIG. 15 depicts a simplified flow diagram of an example process 1510 used in evaluating the received or determined water usage relative to a water budget according to some embodiments. In some instances, the process 1510 can be utilized to implement some or all of step 1334 of the process 1320 of FIG. 13. In step 1512 it is determined whether a received, determined or calculated current water use exceeds a first water budget. This determination can be based on the volume of water used, a cost of the water or other such comparisons. In those instances where the water budget has not been exceeded, the process 1510 skips to step 1546 to determine whether a further water usage budget is defined that is to be evaluated, such as to determine whether there is a further water budget that is specific for irrigation. Again, the water usage budget may not be limited to irrigation usage, but instead may include other water usage at a property (e.g., where a meter 122 tracks usage of both non-irrigation water use and irrigation water use, such as depicted in FIG. 3).

When it is determined, in step 1512, that the water usage budget has been exceeded step 1514 is entered where it is determined whether continued water use may be allowed in excess of the water budget being evaluated. For example, the water usage budget may define a guideline usage and not a maximum, may define one tier of a plurality of tiers of water usage budgets (e.g., the cost per unit of water may increase when entering a subsequent tier) or other instances where the water usage budget may be exceeded. In those instances where the water usage budget cannot be exceeded (e.g., there are no tiers or the budget defines a maximum tier, the user defines that the budget cannot be exceed, once the budget is exceeded further irrigation is not allowed, or other such factors), step 1516 is entered preventing further watering during the specified budget period. In some instances, the process 1510 may further include step 1518, where an alarm, warning or other relevant notification is provided. For example, the irrigation controller 130 may show a warning on the display 882 of the irrigation controller 130, may generate an audible alarm, may illuminate one or more lights and/or flash one or more lights, or other such indicators. Alternatively or additionally, an alarm or other notification may be provided to the user through the separate display device 324, or a notification can be sent through some other communication mechanisms, such as an email, automated telephone call, a text message or other relevant communication. Some embodiments may additionally allow a user to instruct or define an override to allow irrigation even though the water usage budget has been exceeded, may reset the water budget to a different or second level or budget (e.g., a different tier knowing that the cost would be greater) or other such overrides. In this instance, the process 1510 might return to step 1512 to further evaluate the override water budget relative to the water usage.

When it is determined in step 1514 that the water usage budget can potentially be exceeded, the process continues to step 1520 to determine whether the water budget is a tiered budget or whether there is a second budget greater than the first budget that may apply. In those instances where the water budget does not define one tier of a plurality of tiers the process 1510 skips to step 1526 to determine whether there are instructions to exceed the water usage budget. Alternatively, step 1522 is entered to determine whether a higher tier or secondary budget is available allowing the use of additional water in excess of the current water budget being evaluated. When no further tiers are available, the process 1510 returns to step 1516 to prevent further irrigation.

In step 1524, a notification is generated to notify the user(s) that the current tier budget is exceeded. Again, this notification can be through the irrigation controller 130, the remote display device 324, or other communications. Similarly, a water authority and/or other third party may additionally or alternatively be notified in some instances, which may allow the water authority to take action (e.g., shutting off further water usage, such as by using the shut off valve 424). In step 1526, it is determined whether instructions were previously received to exceed a current tier budget. In some instances a user may predefine or specify authorization to exceed a first water budget tier, for example, because the user is willing to pay costs associated with exceeding the first water budget tier.

When instructions or other authorization were previously received, the process 1510 skips to step 1546. Alternatively, the process continues to step 1530 where a request for instructions is issued regarding further irrigation and/or exceeded a current budget and/or tier. In some instances, this notification may additionally specify an estimated additional cost to exceed the current budget. For example, the irrigation controller 130 may have information about or may be able to acquire information about penalties for exceeding a current water budget tier and/or increased costs per unit volume of additional water usage in excess of the budget tier. Similarly, the irrigation controller 130 may be able to estimate the total cost for the remainder of the budget period to continue to irrigate at current levels and/or at adjusted levels. For example, the irrigation controller 130 may be able to predict an amount of water to be used for irrigation through the remainder of the budget period and provide an estimated cost, where the estimate can be based on current irrigation levels, adjusted levels as described below, or both provided.

In step 1532 it is determined whether instructions have been received to avoid exceeding the budget and/or prevent further irrigation. In those instances where instructions are received to prevent further irrigation the process returns to step 1516 to prevent further irrigation. Alternatively, in step 1534 it is determined whether instructions are received to exceed the current water budget. In those instances where instructions are received the process 1510 terminates and allows further irrigation, for example, returning to step 1336 to implement irrigation after steps to adjust further irrigation, or to step 1340 to implement irrigation without further adjustments in accordance with the process 1310 of FIG. 13. In some implementations, when authorization to implement irrigation is received in step 1534, the instruction may designate adjustments to be implemented, where the adjustments may request that adjustments be made relative to certain parameters (e.g., scale runtimes, adjust evapotranspiration (ET) values or other such adjustments as introduced above and further described below), specify an amount of reduction, specify a further budget, define zone priorities, or other such factors.

In those instances where instructions are not received in step 1534 the process continues to step 1536 to determine whether a threshold time period has exceeded in waiting for instructions in accordance with step 1534. In those instances where the threshold time period has not elapsed the process returns to step 1532 to determine whether instructions are received. Alternatively, step 1540 is entered where it is determined whether predefined minimum irrigation is defined for one or more zones 140. This can be defined in attempts to ensure that some zones receive some irrigation regardless of whether the budget is exceeded. For example, a zone delivering water to a vegetable garden may be given a minimum irrigation so that the vegetables do not die or die at a slower rate than other plant life. This minimum irrigation may define that certain zones are irrigated and at specific minimum amounts of water; minimum irrigation may be activated when a specific ET (which often might be an extreme ET) is exceeded to irrigate certain zones and at specific minimum amounts of water, at a reduced ET value or a percentage of the specific ET; minimum irrigation may be activated when an extreme soil moisture level is exceeded to irrigate certain zones and at specific minimum amounts of water; and/or other such minimum irrigations. When there is no minimum irrigation defined, the process 1510 returns to step 1516 to prevent irrigation. In some instances, the process may additionally or alternatively return to step 1534 to continue to request instructions. When there is a minimum irrigation defined step 1542 is entered to set irrigation runtimes for the one or more zones defined and at the defined minimums.

In step 1546, the process determines whether there is an irrigation water budget that does not include other water use at the site or property being evaluated. In those instances where there is not a specific irrigation water budget the process 1510 terminates, which may include returning to step 1516. In some instances, a separate predictive process may be activated to predict whether continued water use during the budget period may exceed the water budget. In those instances where there is an irrigation water budget the process continues to step 1548 to determine whether water usage has been evaluated relative to the irrigation water budget, e.g., determining whether the evaluation in steps 1514-1542 have been evaluating water usage relative to the specific irrigation water usage.

When the water usage has been evaluated relative to the irrigation budget the process may terminate and in some instances activate a subsequent process to evaluate predicted use over the budget period. Alternatively, when the water usage has not been evaluated relative to the irrigation budget step 1550 can be entered to determine whether the determined water usage is based solely on irrigation usage. Again, in some instances the water usage information may be based on usage at a give property, including non-irrigation usage. When the water usage is obtained based solely on irrigation usage the process terminates to allow irrigation and/or in some instances activates a subsequent process to predict whether water use might exceed the water budget over the specified budget period. Step 1552 is entered when the water usage is not based solely on irrigation usage where the water usage information is adjusted to eliminate non-irrigation water usage. The process 1510 then returns to step 1512 to evaluate the irrigation water usage relative to an irrigation water budget when appropriate.

Again, in some instances multiple budgets may simultaneously apply to water usages. As such, the process 1510 may be repeated or relevant portions of the process may be repeated for each of the multiple water budgets applicable, such that in some embodiments water usage and/or predicted water usage can again be determined and/or re-predicted, and irrigation can be further adjusted or readjusted relative to further budgets. For example, there may be a billing period water budget and a daily or irrigation event water budget. As such, the process 1510 may initially evaluate water usage relative to the billing period water budget then repeat at least relevant portions of the process in evaluating water usage relative the daily water budget and/or irrigation event water budget.

Figure 16:
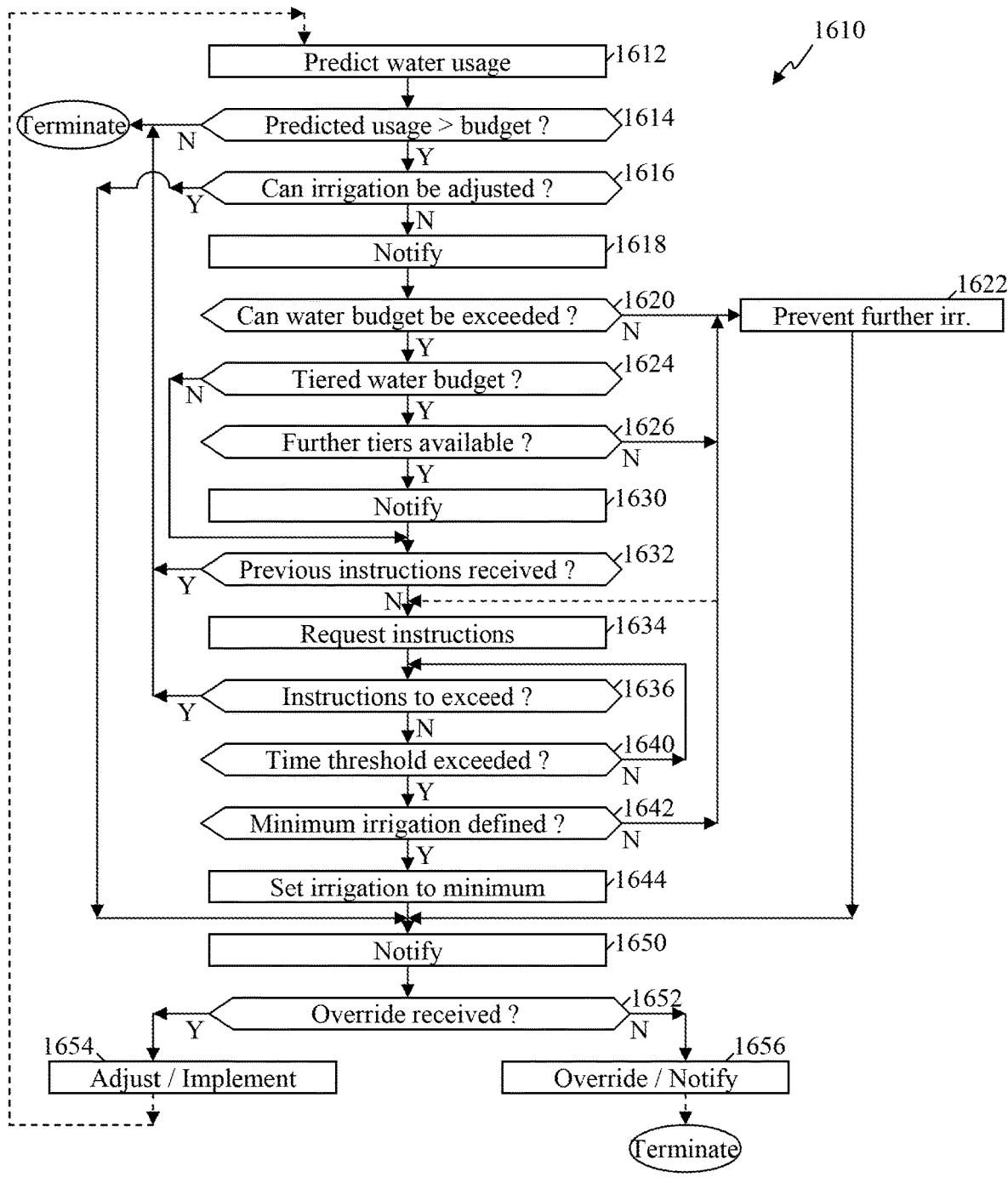
FIG. 16 depicts a simplified flow diagram of a process, according to some embodiments, for use in predicting whether continued water use may exceed one or more specified water budgets over relevant budget periods.

FIG. 16 depicts a simplified flow diagram of a process 1610, according to some embodiments, for use in predicting whether continued water use may exceed a specified water budget over the budget period, and/or predicting whether continued water use may exceed one or more specified water budgets over relevant budget periods. In step 1612, a predict water usage is determined and/or calculated for the budget period or remainder of the budget period. This predicted use can be based on one or more factors, such as but not limited to current runtimes, the irrigation schedule, historic information, environmental conditions, weather data, predicted weather data, flow rates and other such parameters as described in more detail below. Additionally, the predicted water usage typically takes into consideration the water usage to date over the budget period, for example, the water usage from a beginning of the current budget period until a current time when evaluating the water usage. Again, the considered water use may be limited to irrigation water use, or may additionally take into consideration some or all of the non-irrigation water use at the property. The water use in some embodiments comprises an accumulation of water usage over multiple irrigation cycles, while the predicted water use over the budget period can include the water use and predicted water use for one or more water use events predicted to occur during the budget period, where the predicted water use can similarly comprise an accumulation of predicted water use for one or more irrigation cycles. In some instance the water usage is a factor of at least water usage during the budget period from a start of the budget period until a current time when irrigation is to be implemented and evaluation of water usage is performed in response to identifying that irrigation is to be implemented, where the water use is typically limited to the property or properties where irrigation is under the control of the irrigation controller or controllers. For example, in some embodiments, the water usage can include an accumulation of water usage over each irrigation cycle occurring from a beginning of the budget period until a current time when the evaluation of the water usage is being performed, and may additionally include non-irrigation water usage when relevant.

Further, in some implementations, the predicted water usage is based on a feedback and/or correlation of water usage to one or more parameters, such as but not limited to, a correlation with one or more of ET data, soil moisture levels and/or differences in moisture levels, weather conditions and other such correlations. Processes 1710, 1810 and 1910 of FIGS. 17-19, respectively, provide some example processes according to some embodiments for use in predicting water usage. In step 1614, the predicted water usage is evaluated with respect to the water budget to determine whether the predicted water use is expected to exceed the water budget for the given budget period. In those instances where it is estimated that the predicted water usage will not exceed the water budget during the budget period the process 1610 terminates and allows irrigation to continue as controlled according to the irrigation schedule, environmental conditions and/or other such factors.

When it is predicted that the water usage may exceed the water budget, step 1616 is entered to determine whether the irrigation can be adjusted to avoid exceeding the budget. In some instances, this determination can take into account non-irrigation water usage when relevant in determining whether adjustments can be made to avoid exceeding the water budget. When adjustments can be made the process advances to step 1650 to notify the user that adjustments are to be made. When adjustments cannot be made to avoid exceeding the budget step 1618 is entered where the user is notified (e.g., alarm, remote display device 324, other communications) that the water budget is predicted to be exceeded. In step 1620, it is determined whether the water budget can be exceeded. Again, in some instances the water budget may be a fixed budget that cannot be exceeded due, for example, to water authority restrictions, user specified restrictions, limited water supply or other such factors. When the water budget cannot be exceeded the process 1610 continues to step 1622 to prevent further watering in those instances where water usage during the budget period does reach the water budget. In some instances, the process may continue to step 1650 to notify the user regarding the status and potentially receive further instructions from a user in step 1652.

When it is determined in step 1620 that the water budget can be exceeded step 1624 is entered to determine whether the water budget is a tiered budget. In some instances where the water budget does not define one tier of a plurality of tiers the process 1610 skips to step 1632 to determine whether there are instructions to exceed the water usage budget. Alternatively, step 1626 is entered to determine whether a higher tier is available allowing the use of additional water in excess of the current water usage budget being evaluated, for example, at an increased cost. In some instances, a water authority, the user or other party may limit the number of tiers that are available. Once water usage equals or exceeds a water budget for a maximum tier further water usage is prevented or otherwise restricted. As such, step 1626 determines whether further tiers are available. When no further tiers are available, the process 1610 can return to step 1622 to prevent further irrigation once the water usage reaches the water budget.

When further tiers are available, step 1630 is entered to provide the user (and/or one or more other entities) with notification that it is predicted that the current tier budget is predicted to be exceeded. In step 1632, it is determined whether instructions were previously received to exceed a current tier budget. When instructions were previously received, the process 1610 terminates to implement irrigation in accordance with the irrigation scheduled and/or an adjusted irrigation schedule as defined in the event that it is predicted that the budget might be exceeded. Alternatively, in step 1634 a request for instructions is issued regarding further irrigation and/or exceeded a current budget and/or tier. As with the notifications, the request can be displayed through the irrigation controller 130, the separate display device 324, communicated to a separate device (e.g., email, text message, telephone call, or the like) or other such communications. In some instances, this request may additionally specify an estimated additional cost to exceed the current budget. For example, the irrigation controller 130 may have information about or may be able to acquire information about penalties for exceeding a current tier, increased costs per unit volume of additional water usage and/or other such costs. Similarly, the irrigation controller 130 may be able to estimate the total cost for the remainder of the budget period to continue to irrigate at current levels and/or at adjusted levels. For example, the irrigation controller 130 may be able to predict an amount of water to be used for irrigation (and in some instances potentially non-irrigation uses as described below) through the remainder of the budget period and provide an estimated cost, whether the estimate is based on current irrigation levels or adjusted levels as described below.

In step 1636 it is determined whether instructions have been received to exceed the current water budget. In those instances where instructions are received the process 1610 terminates and allows further irrigation, for example, returning to step 1336 to implement irrigation after steps to adjust further irrigation, or to step 1340 to implement irrigation without further adjustments in accordance with the process 1310 of FIG. 13. In some implementations, when authorization to implement irrigation is received in step 1534, the instruction may designate adjustments to be implemented, where the adjustments may request that adjustments be made relative to certain parameters (e.g., scale runtimes, adjust ET values or other such adjustments as introduced above and further described below), specify an amount of reduction, specify a further budget, define zone priorities, or other such factors.

In those instances where instructions are not received in step 1636 the process continues to step 1640 to determine whether a threshold time period has elapsed waiting for instructions. In those instances where the threshold time period has not elapsed the process returns to step 1636 to determine whether instructions are received. Alternatively, when the threshold time period has elapsed step 1642 is entered to determine whether a predefined minimum irrigation is defined for one or more zones 140. When no minimum irrigation has been defined, the process returns to step 1622 to prevent irrigation. In some instances, the process 1610 may additionally or alternatively return to step 1634 to continue requesting instructions, and the threshold period of step 1640 may be adjusted, for example, until a subsequently scheduled irrigation or evaluation of whether irrigation should be implemented. When there is a minimum irrigation defined for one or more zones 140 step 1644 is entered to set irrigation runtimes for the relevant zones defined and at the defined minimums.

In step 1650, an alarm is generated and/or other notification is issued to the user regarding the predicted water usage relative to the water budget, the intent to adjust irrigation and/or the implementation of the minimum irrigation. In step 1652, it is determined whether an override is received from the user or potentially a third party (e.g., a user has established sufficient credits or other relevant factors to allow further irrigation) to override adjustments and/or the minimum irrigation. When an override is not received the process advances to step 1654 to adjust irrigation and when relevant implement irrigation in accordance with the adjustments and/or the minimum irrigation. In some instances, the process 1610 returns to step 1612 to recalculate the predicted water usage providing an adjusted predicted water usage based on the adjusted irrigation and to confirm in step 1614 that the adjusted irrigation results in an adjusted predicted water use over the budget period that is not predicted to exceed the budget during the budget period. When an override is received step 1656 is entered where the override is implemented, which may include implementing the irrigation without adjustments or implementing irrigation with adjustments that are different than those determined by the irrigation controller 130. Some embodiments may further generate a notification of the override and/or provide information about the predicted cost to exceed the budget.

As described above, some embodiments can predict water usage over the budget period. Based on this prediction adjustments to the irrigation scheduling and/or runtimes may be implemented in attempts to limit water usage and/or prevent exceeding the water budget. Predicting the water usage can be implemented through one or more methods. Further, predicting the water use can take into account one or more factors of numerous potential factors. Some of these potential factors can include, but are not limited to, historic ET data (e.g., last year's ET data for a corresponding billing period, average of the last 10 years ET data for a corresponding month); average ET data from the previous "X" days; historic water delivery (last week, last year, etc.); historic weather data (last weeks weather, last years weather, weather data over the last decade for a corresponding billing period or other such timing); set irrigation run times and known flow rates; soil moisture; water table levels; and other such factors. In some instances the predicted water usage is based, at least in part, on an extrapolation, such as a linear extrapolation, based upon relative weighting of inputs, such as prior water usage, ET data, predicted weather and the like.

Figure 17:
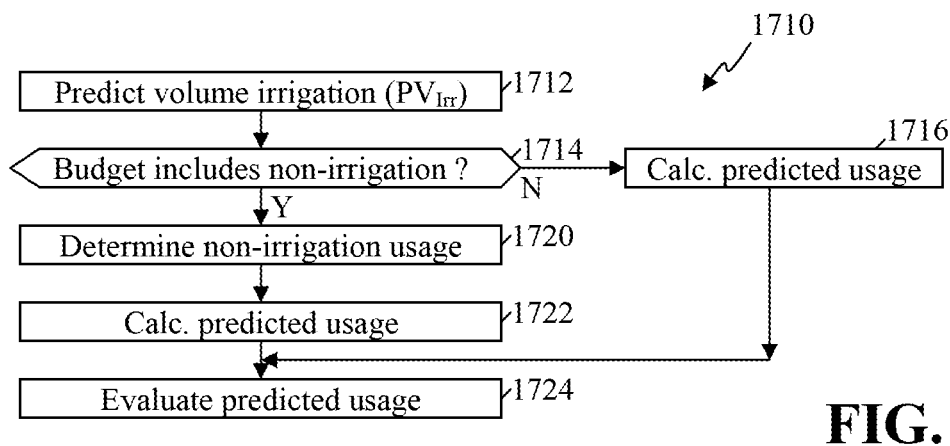
FIG. 17 depicts a simplified flow diagram of a process, according to some embodiments, used in predicting an amount of water use over the budget period or a remainder of a budget period.

FIG. 17 depicts a simplified flow diagram of a process 1710, according to some embodiments, used in predicting an amount of water use over the budget period or a remainder of a budget period. This process 1710 can be used, in some embodiments, to implement some or all of step 1612 of the process 1610 of FIG. 16. In step 1712, a predicted volume or amount of water to be delivered for irrigation ($PV_{Irr}$) is calculated. For example, in some implementations this predicted volume of water may be calculated as the sum of the predicted irrigation water usage for the predicted irrigation events, occurrences or days remaining in the budget period:

$$PV_{Irr} = \sum_{1}^{IrrEvnt}\left(\sum_{1}^{n\ zones}((\text{runtime})*(\text{flow rate}))\right) \quad \text{Eq. 1}$$

where: "IrrEvnt" is the predicted irrigation event of the potential irrigation events over the remainder of the budget period where irrigation is anticipated to be activated; "n zones" is the predicted number of zones to be irrigated for the corresponding irrigation events; "runtime" is the scheduled, calculated or predicted runtime (e.g., based on ET data, weather data, soil moisture and/or other such factors as described above and further below) for the corresponding zones; and "flow rate" is the calculated, learned or determined water flow rate for the corresponding zones. The predicted runtimes may be based on scheduled runtimes, vary from irrigation event to event and/or day to day as a result of predicted conditions (e.g., weather data, ET data, soil conditions and the like), or may be predicted based on other factors.

In step 1714 it is determined whether the defined water budget applies to the sum of the irrigation and non-irrigation water usage. When it is determined in step 1714 that the water budget includes non-irrigation water usage the process 1710 advances to step 1720 to determine non-irrigation water use. Alternatively, when the water budget does not include non-irrigation water usage, step 1716 is entered where a predicted water usage (PWU) is calculated. As one example, the predicted water usage (PWU) over the budget period can be set to equal the sum of the measured irrigation water usage during the current budget and the predicted volume of water to be delivered for irrigation ($PV_{Irr}$) over the remainder of the budget period:

$$PWU=(\text{previously measured usage}+PV_{Irr}) \quad \text{Eq. 2}$$

The measured irrigation water usage can be an actual measure of irrigation water usage, a calculated irrigation water usage (e.g., by subtracting out determined non-irrigation water usage), or estimated water usage (e.g., by estimating, learning and/or knowing flow rates and prior runtimes during the current budget period). The process then advances to step 1724.

When the water budget applies to both irrigation and non-irrigation water use as determined in step 1714, the process continues to step 1720 where non-irrigation water use (NIWU) is predicted for the remainder of the budget period. For example, a predicted daily non-irrigation water use can be calculated as a daily average non-irrigation water use calculated from the non-irrigation water use of a defined number of previous days. In other instances, a more detailed evaluation of days or events can be implemented, for example, by predicting a daily non-irrigation water usage based on knowledge of the day being predicted (e.g., whether the day is a week day or a day during the weekend, whether there is knowledge of a vacation planned, or other such factors).

In step 1722, a predicted water usage (PWU) is calculated. For example, the predicted water usage can be calculated by multiplying the predicted daily non-irrigation water use by the number of days remaining in the budget period (which may include the current day or a portion of the current day (e.g., a percentage based on time), depending on when the predictions are determined), and adding the total to the predicted irrigation water usage for the predicted irrigation events, days or the like over the remainder of the budget period plus the previously measured usage over the current budget period:

$$PWU=((\text{Days remaining}*NIWU)+PV_{Irr}+\text{previously measured usage}), \quad \text{Eq. 3}$$

where the "Days remaining" is the number of days remaining in the current budget period; the NIWU is, in this example, the predicted daily non-irrigation water usage; the $PV_{Irr}$ is the predicted volume or amount of water to be delivered for irrigation over the remaining budget period (e.g., see equation 1 above); and the previously measured water usage is the measured water usage at the property during the budget period, e.g., as provided by the meter 122. As another example, the predicted water usage can be calculated by summing predicted non-irrigation water use as calculated for a remainder of the budget period (which may take into account additional factors when determining predicted usage), and adding the total to the predicted irrigation water usage for the predicted irrigation over the remainder of the budget period plus the previously measured usage over the current budget period.

In step 1724 the predicted water usage is evaluated relative to the current water budget. In some instances, step 1724 is implemented through other processes, such as in process 1310 of FIG. 13, process 1610 of FIG. 16 or other processes. For example, it can be determined in step 1724 whether the predicted water usage is predicted to be greater than the current water budget. The process then terminates with the determination of whether the water budget is expected to be exceeded. In some instances, the process may return to step 1614 of the process 1610 to either allow irrigation or determine whether adjustments can be implemented. The process 1710 can similarly be implemented and/or repeated to predict water usage based on adjusted irrigation and a predicted water usage as a result of the adjusted irrigation.

Figure 18A:
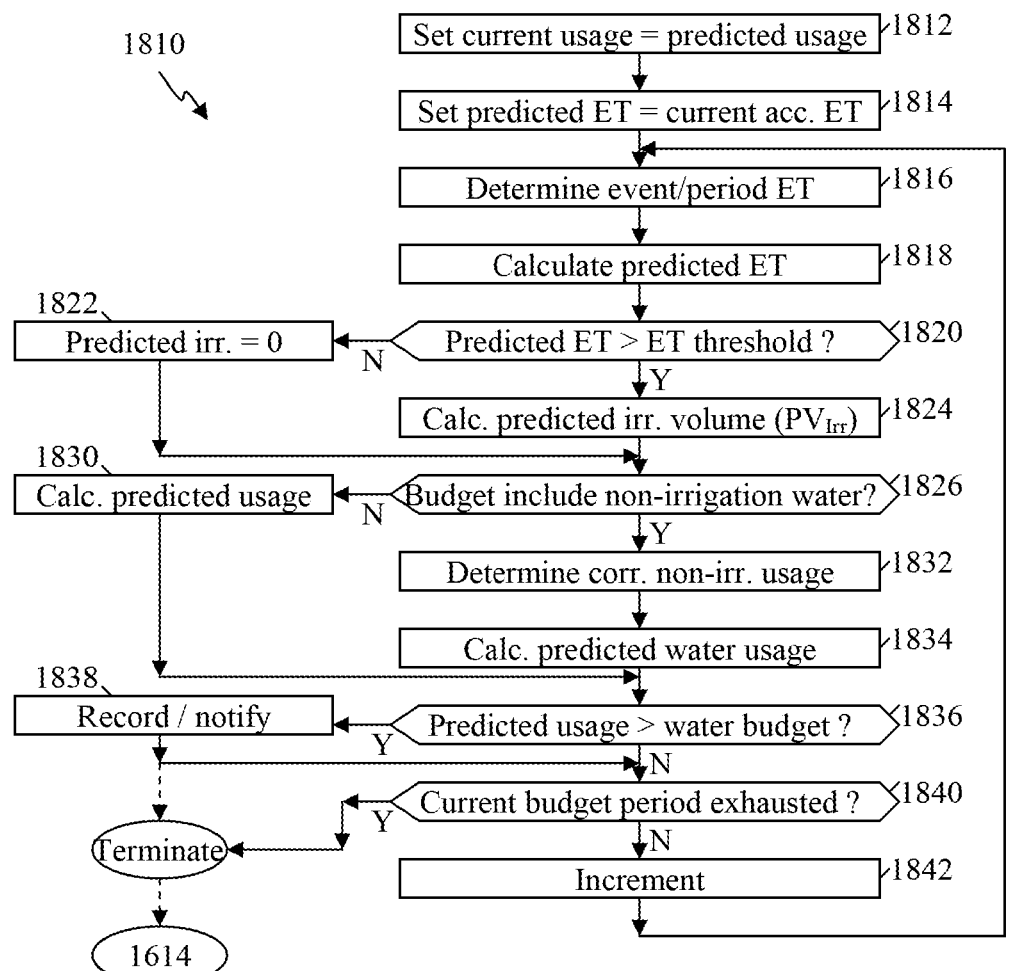
FIG. 18A depicts a simplified flow diagram of an additional or alternative process, according to some embodiments, used in predicting an amount of water use over a budget period or a remainder of a budget period.

FIG. 18A depicts a simplified flow diagram of an additional or alternative process 1810, according to some embodiments, used in predicting an amount of water use over a budget period or a remainder of a budget period. This process 1810 can be used, in some embodiments, to implement some or all of step 1612 of the process 1610 of FIG. 16. In step 1812 a current total water usage is set to a previously predicted water usage. In those instances where a predicted water usage has not been calculated or is reset upon initiation of a new budget period the current water usage may be set to zero. In step 1814 a predicted ET is determined. For example, the predicted ET can be set equal to a currently calculated accumulated ET value. In another example, the predicted ET can be based on a predicted ET for a give period of time, such as a month, a week, a budget period or other such predicted ET. As described above and further below, the predicted ET for the given budget may be based on historic data, such as historic ET, average ET data and other such information.

In step 1816 a predicted ET value for a period or event during the budget period currently being evaluated is predicted. For example, a predicted daily ET can be predicted by determining a daily average ET from a predefined number of previous days is calculated. In other examples, historic ET values, weather data and/or predicted weather data may additionally or alternatively be used in determining a day's ET value. As another example, a predicted daily ET value may be determined by dividing an ET value for a given period by the number days in the period. As a specific example, a predicted budget period ET value for the current budget period can be divided by the number of days within the budget period to obtain a predicted daily ET. In step 1818 a predicted ET value is calculated. In some embodiments, this predicted ET value is calculated as the sum of the day's predicted ET and the previously predicted ET. In other embodiments, the predicted ET may be the sum of predicted daily ET values over the given budget period up to a current day being evaluated. In step 1820, it is determined whether the predicted ET has a predefined relationship with an ET threshold to decide whether irrigation should be activated for a given irrigation event, on the day or other such period or event being evaluated, and as such identifying the event being evaluated, of the potential events of the budget period, is a predicted irrigation event. In those instances where irrigation should not be activated, step 1822 is entered, and the predicted volume of irrigation water use ($PV_{Irr}$) for the predicted event or period is set to zero ($PV_{Irr}=0$).

Alternatively, when the current event or period being evaluated is determined to be or predicted as an irrigation event or period, the process 1810 continues to step 1824 to determine a predicted volume of water ($PV_{Irr}$) to be delivered through irrigation for the given event or period based on the predicted ET. In some embodiments, this predicted volume of water can be determined as a function of a correlation of measured water usage to ET data as described above and further below. In step 1826, it is determined whether the water budget applies to non-irrigation water usage as well as the irrigation water usage. In those instances where the water budget does not apply to non-irrigation usage and is limited to irrigation budgeting step 1830 is entered where the predicted water usage is defined as equal to the predicted volume of water ($PV_{Irr}$) for the predicted event or period plus the previous predicted water usage, which can include measured water usage. The process 1810 then advances to step 1836 to evaluate the predicted water usage.

When it is determined in step 1826 that the water budget does apply to both irrigation and non-irrigation water usage the process 1810 continues to step 1832 to determine a predicted non-irrigation water use corresponding to the event or budget period being evaluated. Again as described above, the event's or period's predicted non-irrigation water use can be calculated, for example, as an average of determined non-irrigation water usage of a predefined number previous days. Additionally or alternatively, the event's or period's corresponding non-irrigation water usage (e.g., a day's non-irrigation water use) may take into account other factors, such as knowledge of the day of the week, where in the month the event or period being evaluated falls, current weather data, historic weather data, predicted weather data, or other such information or combinations of such information. In step 1834 the predicted water use is calculated as factor of the previous predicted water usage, the predicted volume of irrigation water ($PV_{Irr}$) for the predicted event or period and the predicted non-irrigation water use, such as the sum of the previous predicted water usage plus the predicted volume of irrigation water ($PV_{Irr}$) for the predicted event or period plus the predicted non-irrigation water use corresponding to the predicted event or period (e.g., a day's predicted non-irrigation water usage).

In step 1836 the predicted water usage is evaluated relative to the water budget to determine whether the predicted water usage exceeds the water budget. In those instances where the predicted water usage exceeds the water budget step 1838 is entered to note or otherwise record the prediction, and in some instances may generate a notification. The process 1810 can then continue to step 1840 to determine whether the current budget period is exhausted in those instances where it is desired to evaluate the entire budget period. In other embodiments, the process 1810 may optionally terminate following the prediction that the budget is to be exceeded, and can return, in some instances, to step 1614 with the knowledge that the water budget is predicted to be exceeded. In step 1840, it is determined whether budget period has been fully evaluated, for example determining whether the all of the days of a current budget period have been exhausted, and considered relative to predicted irrigation and that irrigation usage relative to the budget. When the budget period has been fully considered, the process 1810 terminates and, in some instances, may returns to step 1614 with the knowledge that it is predicted that the budget will not be exceeded. In those instances where further consideration of predicted water usage during the budget period is to be performed the process 1810 continues to step 1842 to advance or increment within the period, such as increment a day or a potential irrigation event within the budget period. The process then returns to step 1816 to again determine a predicted ET for an event or period to be evaluated and continue the evaluation of the water usage relative to the budget until the budget period is exhausted.

Figure 18B:
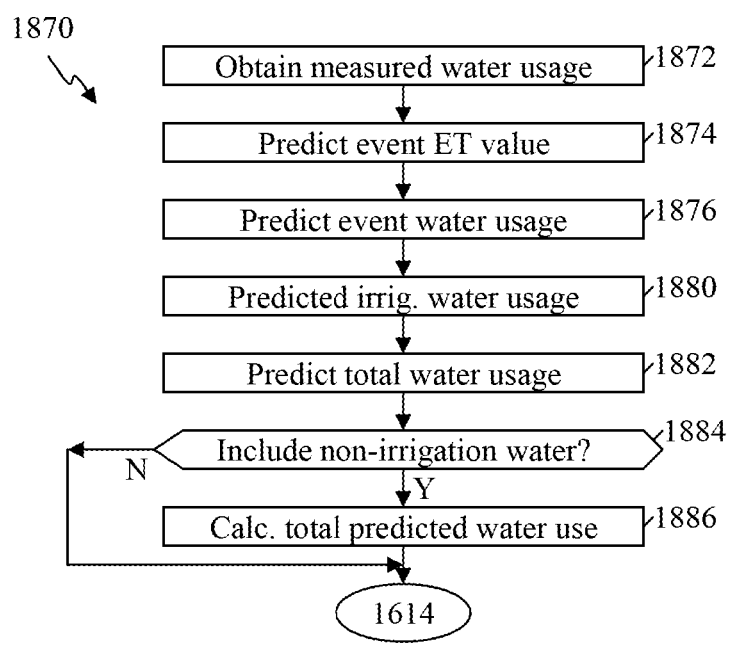
FIG. 18B depicts a simplified flow diagram of an additional or alternative process, according to some embodiments, used in predicting an amount of water use over a budget period or a remainder of a budget period.

FIG. 18B depicts a simplified flow diagram of an additional or alternative process 1870, according to some embodiments, used in predicting an amount of water use over a budget period or a remainder of a budget period. In step 1872, a measured, calculated or estimated water usage up to a current time within the budget period is determined. In step 1874, a predicted event or period ET value is determined as a function of a predicted ET value over the budget period. For example, the predicted event or period ET can be a predicted daily ET where a predicted budget period ET can be divided by the number of days within the budget period to obtain a predicted event ET. In step 1876, a predicted water usage as a result of the event or over the period is calculated as a function of the predicted event ET. For example, a correlation of ET to water usage can be utilized to predict an event water usage as a function of the predicted event ET.

In step 1880 a predicted irrigation water usage over the remainder of the budget period is calculated as a function of the predicted ET for the remainder of the budget period. For example, when the predicted irrigation water usage calculated for the predicted event ET is a predicted daily water usage, then a predicted irrigation water usage over the remainder of the budget period can be calculated by multiplying the predicted daily water usage by the number of days where watering is anticipated. In step 1882, a total predicted water usage over the budget period is calculated by summing the water use during the period and the predicted water use over the remainder of the period. In step 1884, it is determined whether non-irrigation water use is to be included in the evaluation of water use. In those instances where non-irrigation use is to be included the process continues to step 1886 to predict non-irrigation water use over the remainder of the budget and update the total predicted water use over the remainder of the budget period by including the predicted non-irrigation water use. The process then terminates and returns to step 1614.

Figure 19:
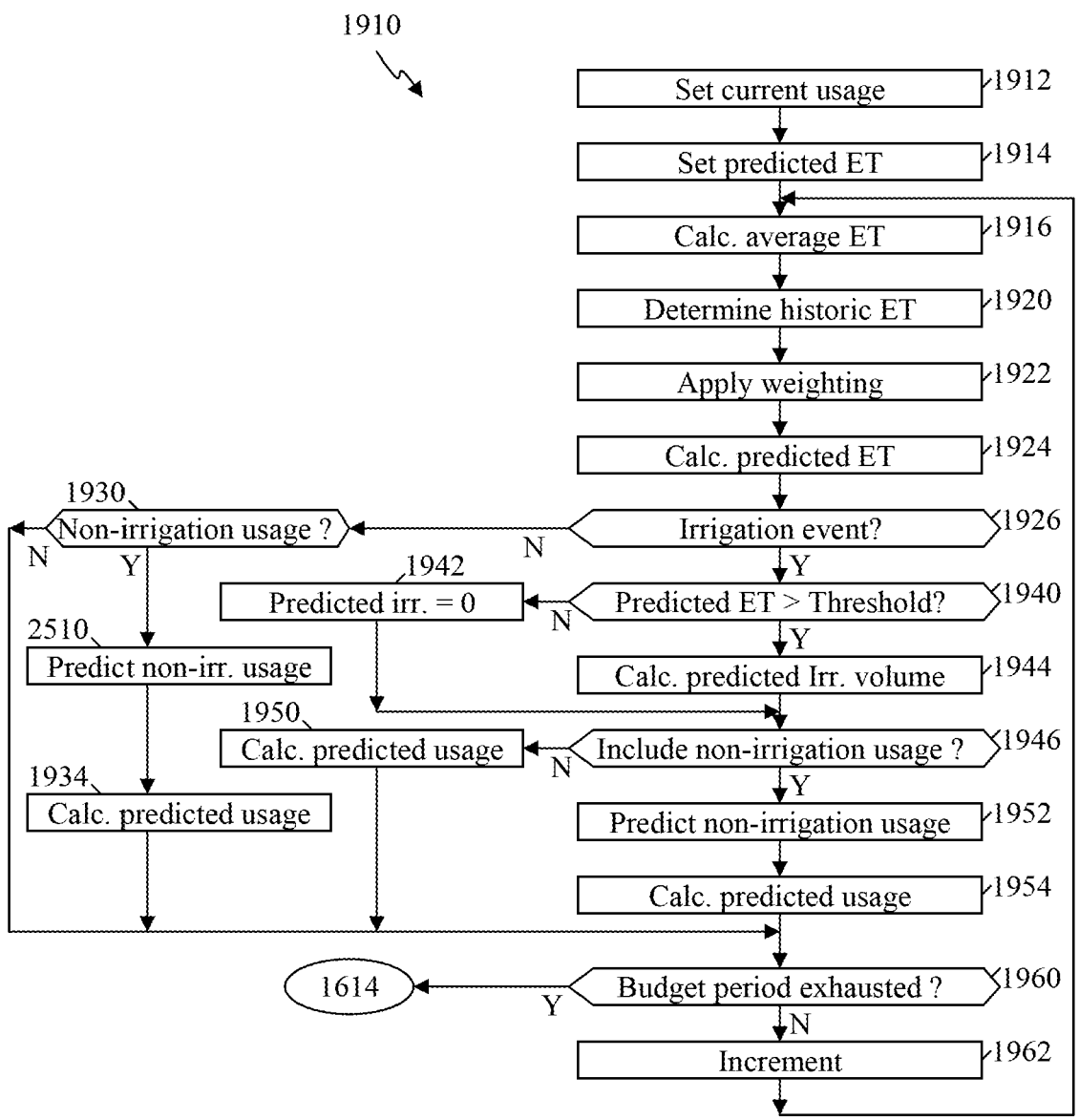
FIG. 19 depicts a simplified flow diagram of an additional or alternative process, according to some embodiments, used in predicting an amount of water consumption over a budget period or a remainder of a budget period as a function of ET data.

FIG. 19 depicts a simplified flow diagram of an additional or alternative process 1910, according to some embodiments, used in predicting an amount of water consumption over a budget period or a remainder of a budget period as a function of ET data. This process 1910 can be used, in some embodiments, to implement some or all of step 1612 of the process 1610 of FIG. 16. Similarly, the process 1910 can be used in place of or in cooperation with one or both of processes 1710 and 1810, or in place of or in cooperation with other such processes. In step 1912 a current water usage parameter is set equal to a predicted water usage. In those instances where a predicted water usage has not been calculated or is reset upon initiation of a new budget period the current water usage may be set to zero. In step 1914, a predicted ET value is set equal to a current accumulated ET. Further in some instances, an ET parameter other than an accumulated ET can be applied. For example, an averaged ET value may be calculated from a plurality of ET values obtained over one or more days, a weighted ET value may be obtained by weighting different ET values differently to obtain a resulting ET value, or other such ET calculations and/or determinations.

In step 1916, an average ET is calculated, for example, by averaging a predefined number of days or other relevant periods for which ET data is defined (e.g., week, month or other such periods). In some instances where there is only a single ET value available the average ET can be set to that single value, and similarly when there are less than the predefined number of days of ET values the average ET can be set to the average of those limited number of ET values, or other data may be utilized in addition to the previous ET data or in place of the previous ET data to predict the average ET.

Some embodiments optionally include step 1920, where a historic ET value is determined. The historic ET data can be obtained from a remote source (e.g., remote service 730), pre-stored in the irrigation controller 130, based on prior received and/or calculated ET or average ET data, and/or other such sources. Further, the historic ET data can be historic ET data for a specific month, day or other period, a given average for a given period (e.g., average ET for a month in the prior year), or other such data. Optional step 1922 may also be included where a weighting is applied to one or both of the average ET and historic ET, and a predicted irrigation ET value is calculated based on the average ET, historic ET, weighted average ET, weighted historic ET and/or a combination thereof.

In step 1924, a predicted ET is calculated as a function of the average ET and/or the historic ET. As one example, the predicted ET can be calculated as the sum of the average ET times a first weighting factor plus the historic ET times a second weighting factor (e.g., (average ET*0.7)+(historic ET*0.3)). The weighting can be substantially any weighting and can depend on one or more factors. For example, in those instances where there are insufficient numbers of previous days to calculate a daily average ET, or where one or more of the previous days ET values is a drastic change in ET data the weighting of a daily average ET can be reduced and/or set to zero, while the weighting of the historic ET can be increased. Other examples that can be used to determine the predicted ET might include one or more of: predicted ET=((3*average ET)+(2*historic ET))/5; predicted daily ET=((average ET)+(historic ET))/2; predicted daily ET=(average ET adjusted relative to predicted weather); predicted daily ET=(historic ET adjusted relative to predicted weather); predicted daily ET=((average ET adjusted relative to predicted weather*weighting)+(historic ET adjusted relative to predicted weather*weighting)); or other relevant determinations. As yet another example, a predicted ET can be calculated as the sum of a previous accumulated ET and a predicted average ET, a previously predicted ET (e.g., a previously predicted ET for a preceding day) or a measured or actual previous ET.

In step 1926, it is determined whether irrigation is allowed for a current irrigation event being evaluated (such as a current irrigation cycle being evaluated), on a current day being evaluated, over a current period being evaluated or the like. In some instances, an irrigation schedule may define one or more irrigation cycles, days or other periods as non-irrigation cycles, days or periods, respectively, where irrigation is prevented. For example, a water authority may restrict irrigation to occur at a give property on only certain days (e.g., only on Monday, Wednesday and Saturday) and/or only at certain times (e.g., between 8:00 PM and 6:00 AM); an irrigation schedule may dictate that irrigation is not to be activated over certain times (e.g., between sunrise and sunset), on a specific day of the month or a day of the week or other such scheduled restrictions, for example to perform certain maintenance; or other such factors that may dictate that a current event, day, date or period being evaluated is a non-irrigation event, day or period. When it is determined in step 1926 that irrigation is to be prevented the process 1910 advances to step 1940.

When it is determined in step 1926 that irrigation is to be prevented relative to the event, day or the like currently being evaluated the process continues to step 1930 to determine whether the water budget applies to both irrigation and non-irrigation water usage. In those instances where the water budget does not apply to both and instead is limited to irrigation water usage the process advances to step 1960 to determine whether the budget period has been fully evaluated. Alternatively, when the water budget does apply to both irrigation and non-irrigation water usage the predicted water usage takes into account the non-irrigation water usage even when the event, day or other factor being evaluated is a non-irrigation event, day, period or the like. As such, step 1932 is entered when the budget includes the non-irrigation water usage to determine a predicted non-irrigation water usage relative to the event, day, period of the like. As introduced above, for example, a day's non-irrigation water usage can be determined based on one or more factors, and in some instances, is an average of the measured non-irrigation water usage for a predefined number of previous days (e.g., most recent seven (7) days), while in other instances, other factors may be taken into account. In step 1934, the predicted water use is set to equal the previous predicted water usage plus the predicted non-irrigation water use (no irrigation water usage is incorporated when irrigation is predicted to be prevented with respect to the event, day, period or the like currently being evaluated). Following step 1934 the process 1910 advances to step 1960 to determine whether the budget period has been fully considered.

When it is determined in step 1926 that irrigation may be implemented the process continues to step 1940 to determine whether the predicted ET has a predefined relationship with an ET threshold indicating that it is predicted that irrigation should be activated for the event, day, period or the like being evaluated. In those instances where the predicted ET is insufficient to activate irrigation, step 1942 is entered where no irrigation is scheduled or predicted for the event, day, period or the like being evaluated and the predicted volume or amount of water to be delivered for irrigation ($PV_{Irr}$) corresponding to the given event, day, period or the like is set equal to zero. The process then skips to step 1946 to evaluate non-irrigation water usage. Step 1944 is entered in those instances where the predicted ET data would justify activating irrigation, where the predicted volume of water to be delivered for irrigation ($PV_{Irr}$) of one or more zones is determined and/or calculated based on predicted ET and the amount of water needed to be supplied in irrigation to compensate for the ET losses (or relative weighting of the ET losses for example when adjustments have previously been applied).

In step 1946 it is determined whether the water budget applies to non-irrigation water usage plus the irrigation water usage. When the water budget does not consider non-irrigation usage, step 1950 is entered where the predicted usage is set equal to the sum of the predicted volume of water to be delivered in irrigation ($PV_{Irr}$) plus the previously predicted usage. Alternatively, when the water budget takes into account irrigation and non-irrigation water usage the process 1910 continues to step 1952 to determine a predicted non-irrigation water use relative to the event, day, period or the like being evaluated. Again as described above, the non-irrigation usage can be determined from one of several different methods. In step 1954 the predicted water usage is then set equal to the previously predicted water usage plus the predicted volume for irrigation ($PV_{Irr}$) plus the corresponding non-irrigation water use (e.g., predicted water use=previously predicted usage+predicted volume for irrigation ($PV_{Irr}$)+daily average non-irrigation water use).

In step 1960, it is determined whether the current budget period has been fully evaluated (e.g., each event, day, period, irrigation cycle and the like has been evaluated relative to the budget period). In those instances where the budget period has been fully evaluated the process 1910 terminates and returns to step 1614 with the indication that the water budget is not predicted to be exceeded. When the budget period has not been fully considered the process continues to step 1962 to increment an event, a day, a cycle, a period or the like, and the process then returns to step 1916 to determine a subsequent average ET and evaluate the predicted water usage relative to a subsequent day (or cycle) and the remainder of the budget period.

Figure 20:
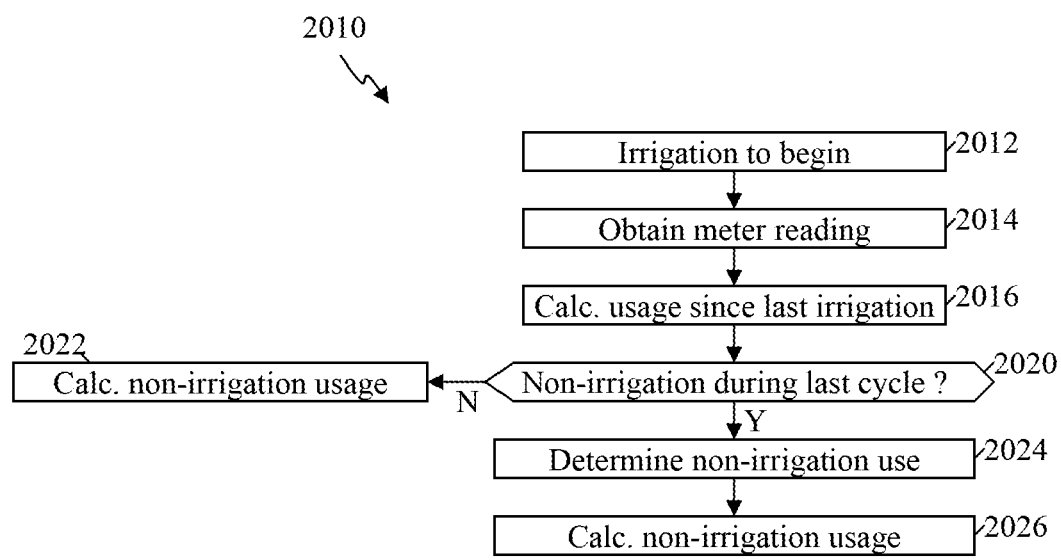
FIG. 20 depicts a simplified flow diagram of an example process that can be employed to determine non-irrigation water usage.

FIG. 20 depicts a simplified flow diagram of an example process 2010 that can be employed to determine non-irrigation water usage. In step 2012, it is identified that irrigation is to be initiated. In step 2014, water usage information is obtained. This water usage information can be a meter reading that is retrieved and/or received, such as from the local meter 122 or a separate irrigation water meter 422. Furthermore, the water usage information may be specifically obtained in response to a request from the irrigation controller 130 to the meter 122 for the meter reading, based on a most recently received reading for example when the meter 122 periodically provides meter readings, or other similar readings.

In step 2016, a water usage since a preceding irrigation is determined. In some instances, this water usage since a preceding irrigation is a function of the received meter reading and a previous meter reading. For example, when the meter 122 is a rolling meter that continues to accumulate measured usage (including reaching a maximum value and looping or returning to a zero state to continue to accumulate usage) the current usage can be the current usage since a previous reading, which can be determined by subtracting a previous meter reading from the current meter reading. In some instances, the previous reading can be a reading obtained immediately following a completion of a preceding irrigation.

In step 2020, it is determined whether there was non-irrigation water usage while a preceding irrigation was active. For example, it can be determined whether there was water use inside a home 320 while irrigation was actively being performed on plant life outside the home. This determination can be based on an amount of water used during an irrigation cycle, evaluations of water flow profiles, a difference between a reading at a local property meter (e.g., meter 122) and an irrigation meter (e.g., meter 422), and other such determinations. In those instances where there was no detected non-irrigation water usage during a preceding irrigation, step 2022 is entered where the determined non-irrigation water usage is set equal to the water usage since a preceding irrigation as determined in step 2016 plus a previously determined non-irrigation usage, providing an accumulation of non-irrigation water usage during the budget period. As described above, at the beginning of a budget period the determined non-irrigation water usage can be set to zero.

When it is determined in step 2020 that there was non-irrigation water usage during the preceding irrigation step 2024 is entered where the amount of non-irrigation water use during the preceding irrigation is determined. This determination can be based on one or more factors, such as evaluating water flow and/or a water flow profile during irrigation, taking into account variations in water pressure (e.g., by measuring water pressure over time, during events or each event, receiving water pressure information from remote source or pressure meter, or the like or a combination thereof) and/or other variable factors, comparing meter readings prior to and following irrigation, comparing meter readings prior to and following irrigation of a zone or a plurality of zones, comparing water usage relative to water usage during prior irrigations, a difference between a reading at a local property meter (e.g., meter 122) and an irrigation meter (e.g., meter 422), or other such factors or combinations of such factors. In step 2026, the non-irrigation water usage is set equal to the determined water usage since the preceding irrigation plus the non-irrigation usage during the preceding irrigation plus a previously determined non-irrigation usage.

Figure 21:
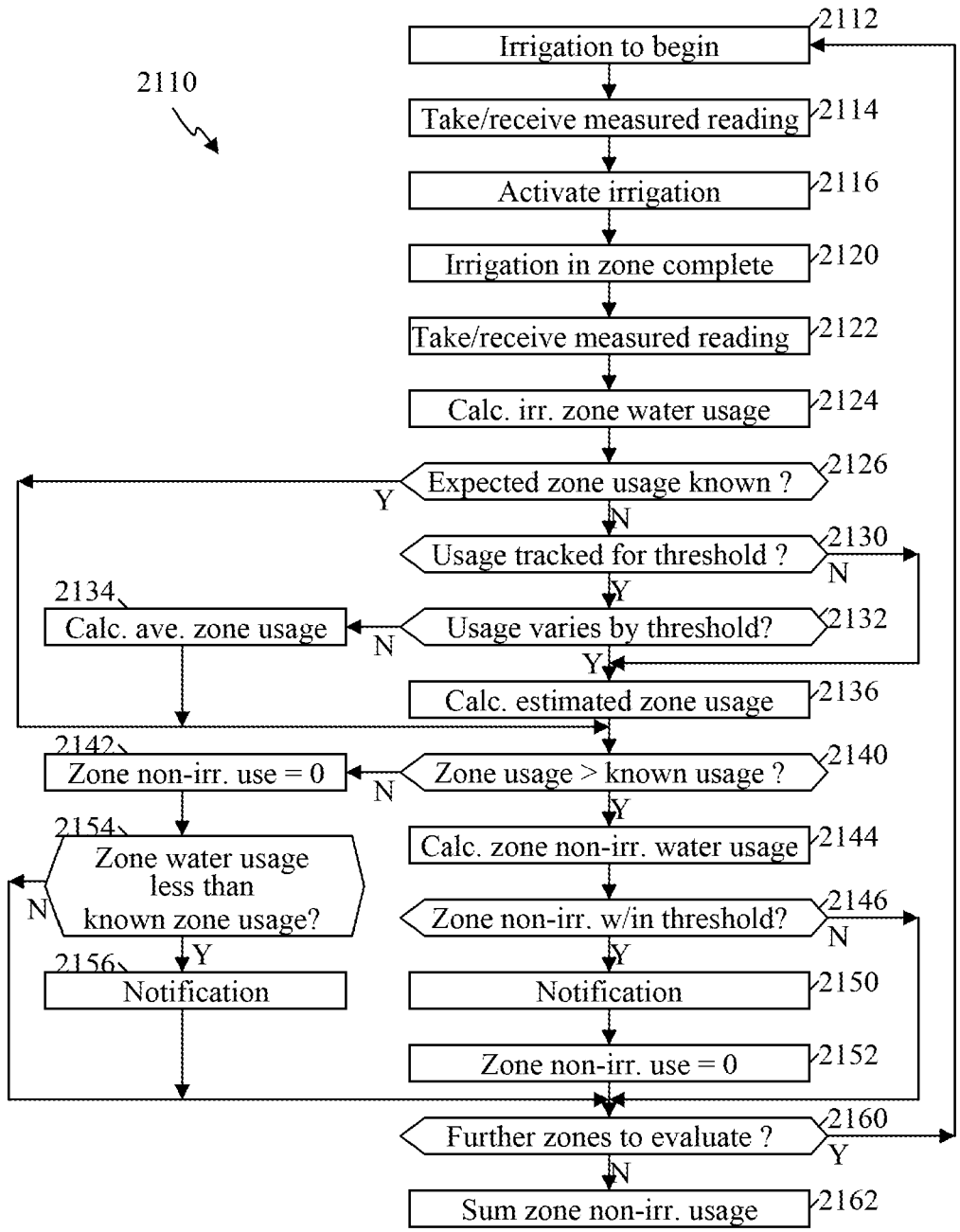
FIG. 21 depicts a simplified flow diagram of an exemplary process that can be implemented, in accordance with some embodiments, to determine non-irrigation water usage while irrigation is active during an irrigation cycle or period.

FIG. 21 depicts a simplified flow diagram of an exemplary process 2110 that can be implemented, in accordance with some embodiments, to determine non-irrigation water usage while irrigation is active during an irrigation cycle or period. In step 2112, it is identified that irrigation is to begin on a given zone. In step 2114, an initial meter reading is obtained prior to activating irrigation for the given zone. In step 2116, the irrigation is activated for the given zone. In step 2120, it is detected that irrigation on the given zone has completed. In step 2122, a subsequent meter reading is obtained following the conclusion of irrigation for the given zone, and prior to activating a subsequent zone if further zones are to be activated.

In step 2124, a current zone water usage is calculated as a function of the two meter readings, for example, by setting the current zone water usage equal to the subsequent meter reading obtained in step 2122 minus the initial meter reading obtained in step 2114. In step 2126, it is determined whether an expected water usage for the given zone is known. This expected water usage can be based on prior measurements; calculated based on water flow; calculated based on parameters such as, but not limited to, water pressure, pipe size, runtime; type (or types) of water delivery devices; or other such factors or combinations of such factors. For example, the expected water usage for the given zone can be based on several prior days' or irrigation events' water usage for the given zone, and typically where there was or appeared to be no non-irrigation water usage or where compensations were made for non-irrigation water use. When an expected water usage for the given zone is known the process 2110 advances to step 2140.

Alternatively, when an expected water usage for the given zone is not known the process can continue, in some embodiments, to attempt to determine or calculate an expected water usage for the given zone. In step 2130, it is determined whether the water usage for the given zone has been tracked for a defined number of cycles, events, days or other such periods. When the water usage has not been tracked for the defined number of cycles, events or days the process advances to step 2136. In those instances where water usage for the given zone has been tracked for the defined number of events, cycles, days or other period step 2132 is entered to determine whether is current zone water usage differs by a threshold amount from one or more previous irrigation periods or cycles for the given zone. This evaluation allows a determination of whether there is a deviation from typical or predicted use, and whether the current usage should be considered in determining a known water usage for the given zone. The threshold deviation allows for some deviation that may result, for example due to minor changes in water pressure or other factors, but limits the variations to within a boundary to obtain consistency. The process advances to step 2136 when there is a deviation greater than a threshold. When the current water usage for the given zone does not vary from previous usage by the threshold deviation the process 2110 continues to step 2134 to calculate a known water usage for the given zone, such as calculating an average zone water usage using the water usage over the defined number of cycles, events, days or other such period, apply a weighting to one or more of the previous determined zone water usages or other such calculations. The process then advances to step 2140.

Step 2136 is entered when it is determined in step 2130 that there are less than the predefined number of cycles, events, days and/or periods of water usage or when the determined zone water usage varies from other previous zone water usages for the given zone by the threshold amount. In step 2136 an estimated zone water usage is calculated. The calculated estimate can be determined based on one or more factors, such as but not limited to water flow, estimated water pressure, pipe size(es), types and number of water deliver devices (e.g., type of sprinkler, drip, etc.), irrigation runtime, and other such factors.

In step 2140 it is determined whether the zone water usage is greater by a threshold amount than the known water usage for the give zone or greater by a threshold amount than the estimated water usage for the give zone in deciding whether there was some non-irrigation water usage, a leak or other issue that should be taken into account. The threshold may vary depending on whether there is a known water usage or an estimated water usage to provide greater variance and margins of error. Similarly, different thresholds may be applied depending on how the estimated water usage is calculated, the amount and/or type of data available to calculate the estimated water usage, and other such factors.

The process 2110 continues to step 2144 when it is determined in step 2140 that the zone water usage is greater than the known water usage by more than the threshold amount where the zone non-irrigation water usage is set equal to the zone water usage minus the known or estimated water use. In some implementations a margin of error may be included in setting the zone non-irrigation water usage, where the margin of error may be based on one or more factors such as the reliability of the data used in calculating the estimated zone water usage, the amount of data available, or other such factors or combinations of factors.

In some embodiments, optional step 2146 is included where it is determined whether the zone non-irrigation water usage relatively consistent, such as determining whether the zone non-irrigation water usage is within a threshold amount of the determined zone non-irrigation water usage for one or more preceding irrigation periods or cycles. This allows for the potential detection of a problem with the irrigation system, such as the detection of a leak, a broken water deliver device or other such problem, based on a consistency of water usage in excess of the expected water usage for the given zone. Consistent non-irrigation water usage occurs while the same zone is irrigated can be a strong indicator of a potential problem.

In those instances where the excess water usage is relatively consistent the process continues to step 2150 where a notification is generated, such as an audio alarm, a visual alarm, a notification on a display 882 of the irrigation controller 130, a notification can be communicated to the separate display device 324, a notification can be forwarded to a separate user device (e.g., a wireless phone, a email, a text message, and the like), or other such notifications or combinations of notifications. In some instances, the amount of excess water and/or the increased water flow can be further evaluated in attempts to potentially identify the problem, and the notification can include an indication of one or more potential problems, such as a potential broken sprinkler, broken pipe, leak, separated drip line or other such potential problems and/or combinations of problems. Similarly a profile of the water flow may additionally or alternatively be evaluated to aid in identifying the potential problem. The notification can additionally identify the zone where the potential problem is being detected. Some embodiments can potentially stop irrigation for that zone until instructions are received to proceed once the problem has been addressed or instructions are received to override the error. Because the excess water usage is anticipated to be related to irrigation (e.g., an irrigation leak) the excess water usage, at least in some implementations, should be applied as irrigation water usage and not non-irrigation water usage. As such, in some embodiments, the process 2110 continues to step 2152 to further reset to zero the zone non-irrigation water usage for the given zone and the given irrigation period or cycle (or the plurality of give irrigation periods or cycles where the consistent water use exceeded the known water use for the given zone), and instead maintain the measured zone water usage as irrigation water usage as a leak within the irrigation system can still be defined as irrigation water usage. The process then advances to step 2160 to determine whether further irrigation zones are to be evaluated. Similarly, when it is determined in step 2146 that the zone non-irrigation water usage is within a threshold amount of previous zone non-irrigation water usage for one or more preceding irrigation periods or cycles, the process advances to step 2160.

When it is determined in step 2140 that the zone water usage is not greater than the known or estimated water usage the process 2110 advances to step 2142 where a zone non-irrigation water usage is set to zero. In step 2154 it is determined whether the given zone water usage is less than the known or estimated zone water usage for the zone by a threshold amount. Again, this evaluation can potentially detect alternative problems with the irrigation system, such as, but not limited to blocked or clogged water delivery device, a faulty valve, communication and/or power problems, or other such problems or combinations of problems. When there is a potential problem the process continues to step 2156 to generate a notification. Again, the notification can be through one or more different types of notification, can include different types of information and/or can be provided through the irrigation controller 130 and/or distributed to other devices as described above and further below.

In step 2160, it is determined whether there are further zones to evaluate. In those instances where further zones are to be evaluated the process returns to step 2112 to again take a meter reading prior to activating an irrigation for a subsequent zone or to step 2120 to initiate a meter reading upon the completion of irrigation for the subsequent zone when the prior meter reading at the termination of the previous zone can effectively be used as the start meter reading for the subsequent zone. Alternatively, when the zones have been evaluated step 2162 is entered where a total non-irrigation water usage during irrigation is calculated as the sum of the zone non-irrigation water usage for each of the zones. As described above and further below, the non-irrigation water usage can be used in predicting water usage relative to the water budget.

It is noted that the process 2110 is described with reference to given zones; however, the process 2110 can similarly be employed based on a given irrigation instead of a given zone (e.g., by determining whether irrigation water usage is different than an expected water usage during the given irrigation).

Figure 22:
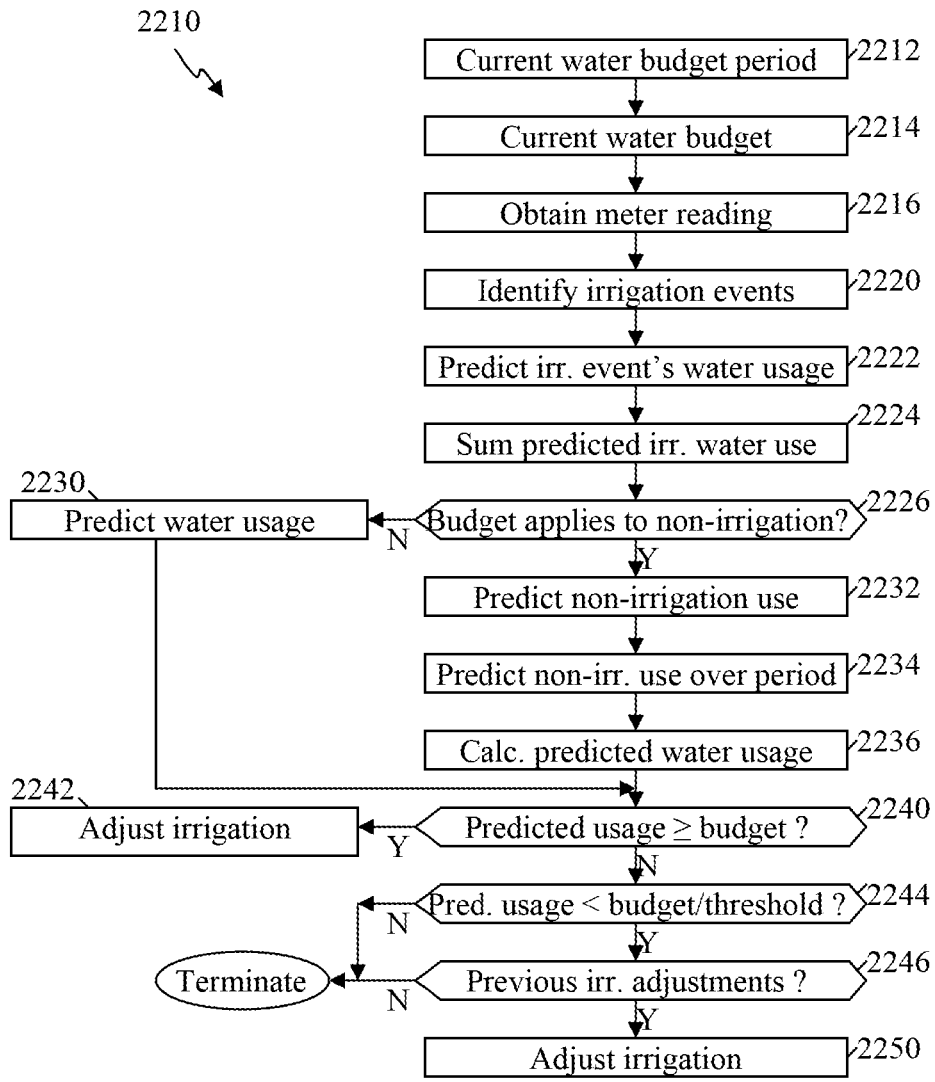
FIG. 22 shows a simplified flow diagram of a process, according to some embodiments, for use in determining whether irrigation should be adjusted based on a prediction of whether the water budget may be exceeded.

FIG. 22 shows a simplified flow diagram of a process 2210, according to some embodiments, for use in determining whether irrigation should be adjusted based on a prediction of whether the water budget may be exceeded and/or whether adjustments can be made to increase irrigation water usage because prior predictions were inaccurate. As introduced above, some embodiments adjust the irrigation in attempts to keep water usage below the specified water budget. By predicting water usage over the budget period some embodiments can alter irrigation during the budget period and prior to exceeding the water budget in attempts to avoid having to terminate irrigation and/or drastically scale back irrigation over a period of time resulting in potentially greater damage to plant life being irrigate. Some embodiments, however, additionally can readjust irrigation runtimes when it is determined that prior predictions were inaccurate (e.g., because precipitation was received).

In step 2212, a current water budget period is identified. Again, the budget period can be substantially any relevant period, such as a day, a week, a month, a rolling period or other such relevant periods, a bill cycle set by a water authority for the property of interest, or other such period. Still further, some embodiments may apply a plurality of budgets, such as a monthly budget while also applying an irrigation event and/or a daily budget within that monthly budget. The process 2110 may be applied whether there is a single water budget or multiple water budgets over different budget periods. In step 2214, a water budget for the current water budget period is determined. The water budget can be set by a user, set by a water authority, set by a community (e.g., a condominium community), or other such source. Similarly, the water budget can be entered into the irrigation controller 130 through a user manually entering the water budget through the user interface 832, received from the water authority (e.g., via a portable storage medium, such as a memory stick, flash drive, magnetic strip device or other such medium; communicated over a wired and/or wireless connection, over local or distributed network; received via radio communication or other such methods), received from another authority (e.g., a home owners association or other authority); received from the remote display device 324 that is in wired, wireless, network and/or distributed network communication with the irrigation controller 130, and/or received from other sources.

In step 2216, a current water usage is received and/or calculated. For example, the current water usage could be received from a local meter at a property where irrigation is being controlled, such as the meter 122, a separate meter 422, or other such device or combination of devices. In step 2220, one or more irrigation events, cycles, periods, days or the like during a remainder of the budget period are identified, where an irrigation event can be an activation of irrigation, an irrigation cycle, the irrigation over one or more zones, a period of time, an irrigation day, and other such irrigation events. Further, an irrigation day is a day identified in which irrigation is to be activated and/or predicted to be activated. As described above and further below, the irrigation may be based on a specified schedule, may be controlled in accordance with environmental conditions, may be controlled based on sensor data, may be determined based on ET data, other such information or one or more combinations of such information. As such, the identification of whether an event is a predicted irrigation event can depend on the given event, cycle, day or the like, the irrigation schedule, the predicted environmental conditions, historic information, and/or other such parameters. For example, when irrigation is schedule based, the schedule can be accessed to identify whether a given day (e.g., a Monday) is scheduled as an irrigation day. As another example, when irrigation is activated based on ET data, a predicted ET can be determined and once that predicted ET exceeds an ET threshold the event corresponding to when it is predicted that the ET data will exceed the ET threshold would be considered an irrigation event. As yet another example, when irrigation is based on a schedule with a rain or precipitation override, it can be predicted whether a threshold amount of precipitation is expected that could designate one or more events as non-irrigation events because of the override even though one or more of those events may be scheduled as irrigation event.

In step 2222, a predicted irrigation water usage is calculated for each of the identified one or more irrigation events during the remainder of the budget period. The process 2210 then continues to step 2224 where a summation of the predicted irrigation water usage of the identified one or more irrigation events is calculated. In step 2226, it is determined whether the water budget is limited to irrigation water usage or whether the budget applies to irrigation as well as non-irrigation water usage for the property of interest (e.g., irrigation usage and in-home water usage). When it is determined that the water budget is limited to irrigation, a predicted water usage for the budget period is determined as a function of a measured, calculated or received current water usage over the budget period and the sum of the predicted irrigation water usage. In some embodiments, the predicted water usage for the budget may be calculated, such as the addition of the current water usage during the budget period and the sum of the predicted irrigation water usage. In some instances, the predicted water usage may be weighted and/or discounted depending, for example, on factors such as predicted accuracy of weather conditions, ET data and/or other such parameters used in predicting water usage. The process 2210 then advances to step 2240 to evaluate the predicted water usage relative to the water budget.

In those instances where the water budget is not limited to irrigation, step 2232 is entered where a predicted non-irrigation water usage corresponding to the event is determined for the r remainder of the budget period. This predicted day's non-irrigation water usage can be based on historic data, one or more previous days' non-irrigation water usage, average usage and/or other such information. Additionally in some embodiments, a predicted non-irrigation water use is predicted for periods of time, for example each day, remaining in the budget period because of varying factors over different period of time. For example, water use during the week may be less than on weekends because a homeowner is at work most of the day during the week, a known holiday may fall within the budget period where it is anticipated that water use will be greater on the holiday than other days, that a vacation is scheduled and that a home owner will not be at the property, and other such relevant factors. In some instances, the process 2110 can be employed at least in part to determine non-irrigation water usage.

In step 2234, a predicted non-irrigation water usage is calculated as a function of the predicted non-irrigation water usage for a remainder of the budget period. For example, a predicted average daily non-irrigation water usage can be determined and multiplied by the number of days remaining in the budget period. In other instances, a predicted average daily non-irrigation water usage may be weighted based on a specific day (e.g., less water usage on weekdays when home owners are typically at work; a known holiday; a known vacation or designation that the expected water use may be reduce; and the like), when applied in calculating the non-irrigation water usage. In yet other instances, historic data and/or prior non-irrigation water usage may be utilized in predicting individual day's non-irrigation water usage.

In step 2236, a predicted water usage for the budget period is calculated as a function of the measured and/or calculated current water usage, the sum of the predicted irrigation water usage and the predicted non-irrigation water usage. In some instances, the predicted water usage for the budget period is calculated as a sum of the current water usage, the sum of the predicted irrigation water usage and the predicted non-irrigation water usage. In other instances, however, weighting may be applied for similar reasons as introduced above.

In step 2240, it is determined whether the predicted water usage is predicted to exceed the water budget by a threshold amount the water budget for the current budget period. When it is predicted that the water budget might be exceeded, step 2242 is entered to adjust irrigation to be implemented relative to one or more of the one or more irrigation events when the predicted water usage is predicted to exceed the water budget for the current budget period. In those instances where it is not predicted to exceed the water budget step 2244 is entered to determine whether the predicted water usage is less than the water budget, for example, less than the water budget by a threshold amount. By employing a threshold difference the process can avoid attempting to make minimal adjustments that would not have much if any affect and further can limit erratic adjustments. In those instances where predicted water usage is not less than the water budget the process 2210 terminates. Alternatively, the process advances to step 2246 to determine whether prior adjustments and/or limitations were applied to the irrigation schedule (e.g., because of prior predictions that the water budget was going to be exceeded). When prior adjustments to reduce or limit irrigation were not implemented the irrigation schedule should still be consistent with the schedule defined by the user and/or being implemented in accordance with environmental conditions (e.g., ET data), and as a result further increases are not needed. As such, when prior adjustments to limit irrigation were not implemented the process terminates. In those instances where prior adjustments were implemented step 2250 is entered to implement adjustments to increase irrigation relative to the identification that the predicted water usage is not expected to exceed the water budget. In some embodiments, the predicted adjustments are used to recalculate the adjusted predicted water usage prior to implementing adjustments to confirm that the adjusted predicted water usage is predicted not to exceed the water budget should the adjustments be implemented.

Again, by predicting water usage, the water usage can be adjusted in attempts to stay within the budget and/or limit by how much the budget is exceeded. Similarly, the irrigation can be adjusted to increase irrigation in those instance where prior predictions were inaccurate or the actual usage was less than predicted (e.g., the temperature was milder than expected, rain was received or rain in excess of that predicted was received, a family was on vacation resulting in less in-house water usage, or other such factors or combinations of factors). Similarly, the water usage and/or budget may be increased, for example, when additional water credits are acquired or a user is willing to pay additional costs associated with exceeding a budget. As such, adjustments to increase irrigation described above and below may similarly be implemented when budgets are increased or the limits imposed by the budget are eliminated. In some embodiments, the process 2210 or some of the steps of the process 2210 may be implemented to increase irrigation when the budget is increased (e.g., through the acquisition of one or more water credits or the authorization to exceed a budget or tier) or the budget is eliminated.

As described above, some embodiments take actions and/or implement adjustments to try and keep the water usage within the water budget. There are numerous different actions that can be taken individually or in cooperation to try and adjust irrigation water usage in attempts to keep the water usage within the water budget during the budget period. Some of these actions can include, but are not limited to: stopping irrigation for the remainder of the budget period; stopping irrigation on one or more zones during the remainder of the budget period; stopping irrigating on one or more zones (e.g., based on zone priority) for a determined number of irrigation events, days or cycles (or one cycle of multiple cycles for an irrigation day), or other periods; reduce runtimes on one or more zones; stopping irrigation on one or more zones and reducing runtimes on one or more other zones during one or more selected irrigation events over the remainder of the budget period; applying a scaling factor; scaling sensor data; scaling ET data and/or values, scaling runtimes; and other such adjustments and/or combinations of adjustments.

In implementing these adjustments one or more factors can be taken into account and how the adjustments are implemented can vary depending on one or more factors. For example, in stopping irrigation on one or more zones during the remainder of the budget period, the zone selection can be based, for example, on sensor information regarding conditions at the zones (e.g., soil moisture conditions); on zone priority; staggering the selected zones; round-robin selection; zone priority and round-robin selection; selecting based on zone priority and sensor data; and other such selections. Further, the zone priority might be determined, for example, from specifically specified priority (e.g., user specified); based on specified plant life being irrigated through the zone; soil type; ground slope; type or types of water delivery devices 134 delivering water to the zone; sensor data (e.g., soil moisture, leaks, etc.); or other such factors or combinations of factors. Similarly, when reducing runtimes on one or more zones for a selected number of identified irrigation events, the amount of reduction can be based on one or more factors such as, but not limited to, an estimated amount of reduction over the remainder of the budget period, estimated amount of reduction for the given irrigation event, predicted weather, and other such factors or combinations of factors. Additionally or alternatively, scaling factors can be applied, for example, to determined ET values (e.g., a percentage reduction) for a selected one or more identified irrigation events (e.g., reduce ET values by 30%); scaling soil moisture level reading when determining runtime relative to soil moisture level(s); scaling runtimes; and other such adjustments.

Further, as described above the adjustments can be reevaluated over the budget period to determine whether further adjustments can or should be made, such as further reducing irrigation or allowing increases in irrigation over prior reductions. These reevaluations can be preformed substantially any number of times, such as, but not limited to, each day, prior to an irrigation event, prior to activating irrigation on an irrigation day, prior to each irrigation cycle, once a week, or other such times. Similarly, the reevaluation can take into account changes in water usage, such as due to changes in water usage for other parts of the property such as household water usage increase or decrease (e.g., family gone on vacation resulting is significant reduction in household water usage), weather changes resulting in adjustments in water usage, and other such changes. Additionally, the predicted water use and historic water use can be taken into account in determining adjustments to irrigation.

Figure 23:
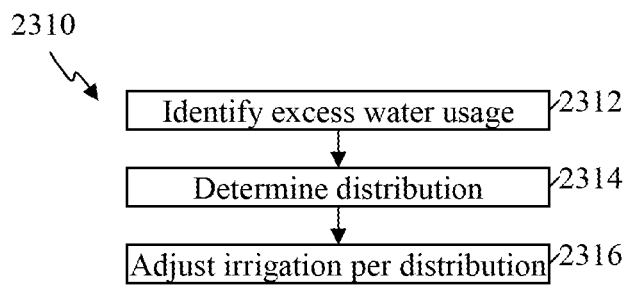
FIG. 23 depicts a simplified flow diagram of a process, according to some embodiments, of adjusting irrigation, for example, in response to predicting that a water budget may be exceeded during a corresponding budget period.

FIG. 23 depicts a simplified flow diagram of a process 2310, according to some embodiments, of adjusting irrigation, for example, in response to predicting that a water budget may be exceeded during a corresponding budget period. In some instances, the process 2310 may be utilized to implement, for example, some or all of step 1336 of the process 1310 of FIG. 13, some or all of step 2242 of the process 2210 of FIG. 22 and/or some or all of other processes. In step 2312, an excess water usage is identified as a function of the water budget and the predicted water usage, where the excess water usage is an amount of water predicted to be used in excess of the water budget. In some embodiments, the excess water usage is set equal to the water budget minus the predicted water usage (excess water usage=water budget−water usage). In other embodiments weighting may be applied and/or other factors may be taken into account. In some instances this predicted excess water usage is determined with a margin of error in attempts to limit later adjustments. For example, the predicted water under usage may be calculated by subtracting the water budget from the predicted water usage and subtracting a threshold or margin amount (e.g., excess water usage=water budget−predicted water usage−margin).

In step 2314, a distribution of the excess water is determined. For example, a reduced water usage distribution is identified for distributing reductions in irrigation corresponding to the excess water usage across one or more zones and/or over identified one or more predicted irrigation events or days. The reduced water usage distribution over the identified predicted irrigation events or days results in a decrease in the predicted water usage such that the predicted water usage, after adjustments, will fall within the water budget for the current budget period. There are numerous ways in which the reductions in irrigation relative to excess water usage can be distributed and one or more factors can be taken into account in selecting how the distribution is to be implemented. In some embodiments, the excess water usage can be divided by the number of remaining identified irrigation events to calculate an amount of water that is to be reduced during each identified irrigation event. In other embodiments, the distribution may be weighted based on weather conditions, expected or predicted weather, historic information, the amount of time remaining in the budget period, the types of plant life being irrigated, area and/or zone priorities, and other such factors and combinations of factors.

As one example, the distribution of reductions in irrigation may be weighted such that the reductions are greater toward the end of the budget period with the knowledge that the beginning of the subsequent budget period may allow for increases in the water usage for irrigation (e.g., identifying that there are only three days remaining in the budget period, therefore, continue normal irrigation until the last day of the current budget period and stop irrigation on one or more zones on the last day of the current budget period). As another example, the distribution of reductions in irrigation may be weighted or delayed to later in the budget period when there is a forecast for precipitation in the near future that may allow irrigation for some of the identified irrigation events to be suspended and compensating for the excess water usage.

In step 2316, adjustments for predicted irrigation runtimes for one or more irrigation zones are determined for one or more predicted irrigation events during the remainder of the current budget period based on the identified distribution of reductions in irrigation corresponding to the excess water usage. Again, how the exact adjustments are implemented on an irrigation event can be based on numerous factors as described above and further below. In some instances, the zones may be prioritized. For example, there may be one or more zones designated as lowest priority, where reductions in runtime are initially directed to these zones. In calculating a reduction in runtime based on an identified excess water usage over the budget, in one example, the distribution of the reductions can be equally distributed over the identified number of irrigation events remaining in the budget period, with the runtimes for the one or more lowest priority zones being reduced to compensate for the distributed reductions. For example, the lowest priority zones can be identified, the distributed reduction for the given irrigation event can be divided by the number of lowest priority zones to determine a runtime reduction to apply to each of the lowest priority zones.

As a further example, according to some embodiments, adjustments to runtimes can be calculated by dividing the excess water usage (EWU) by the number of irrigation events, which in this example can be irrigation days, remaining in the period providing an irrigation day reduction, where the irrigation day reduction can further be divided by a number of lowest priority zones providing a zone reduction value. The adjustment in runtimes for each zone can then be calculated by dividing the zone reduction value by a known or estimated flow rate for the respective zone.

$$\text{Zone Runtime Adjustment} = \frac{\left(\left(\frac{EWU}{IrrDays}\right)/\text{zones}\right)}{\text{Flow Rate}}, \quad \text{Eq. 4}$$

where "EWU" is the excess water usage; "IrrDays" is the number of identified irrigation days remaining in the budget period; the "zones" is the number of lowest priority of zones; and the "Flow Rate" is the water flow rate of the zone for which the adjustment is being determined. In those instances where the zone runtime adjustments are greater than a scheduled or predicted runtime for the given zone, then runtimes for additional zones could further be reduced by the volume of water incapable of being compensated for in the previously selected zone or zones (e.g., reductions in runtime for one or more of the next lowest priority zones).

As a specific example, if the water budget for the given budget period is set at 10,000 gallons (gal.) and the predicted water usage over the budget is predicted to be 10,250 gal., then the predicted excess water usage is equal to 250 gal. If there are ten (10) remaining identified irrigation days during the budget period, and if the distribution of reductions in irrigation is distributed equally over those 10 days, then the distributed reduction for each irrigation day is 25 gal. (i.e., 250 gal./10 days). If there are two zones that are identified as lowest priority zones and each has the same flow rate of 5 gal./min., then the zone runtime adjustment can be calculated by:

$$\text{Zone Runtime Adjustment} = \frac{25 \text{ gal.}/2 \text{ zones}}{5 \text{ gal.}/min.} = 2.5 \text{ min. per zone.}$$

Table 1 shows an example of the adjustments to the irrigation schedule for a given zone of a property being irrigated in accordance with the 2.5 minute runtime adjustments in the above example:

| Irrig. Day | 7/17 | 7/18 | 7/20 | 7/21 | 7/22 | 7/25 | 7/26 | 7/27 | 7/30 | 7/31 |
|---|---|---|---|---|---|---|---|---|---|---|
| Predicted Runtime | 5 min. | 5 min. | 6 min. | 7 min. | 7 min. | 7 min. | 5 min. | 4 min. | 7 min. | 7 min. |
| Adjustment | −2.5 min. | −2.5 min. | −2.5 min. | −2.5 min. | −2.5 min. | −2.5 min. | −2.5 min. | −2.5 min. | −2.5 min. | −2.5 min. |
| Adjusted Runtime | 2.5 min. | 2.5 min. | 3.5 min. | 4.5 min. | 4.5 min. | 4.5 min. | 2.5 min. | 1.5 min. | 4.5 min. | 4.5 min. |

As another example, if the distribution of reductions in irrigation is weighted such that 30% of the total reductions are distributed over a first 5 days of a remaining 10 identified irrigation days, and 70% of the total reductions are distributed over the second 5 days, with a predicted excess water usage of 250 gal. and two designated lowest priority zones each having flow rates of 5 gal./min, then the zone runtime adjustments for the two sets of days (the first 5 days, and the second 5 days) can be calculated, according to some embodiments, as follows:

$$\text{Zone Runtime Adjustment}_{1st\ 5days} = \frac{(((250 \text{ gal.} * 0.3)/5 \text{ days})/2 \text{ zones})}{5 \text{ gal.}/min.} = 1.5 \text{ minutes; and}$$

$$\text{Zone Runtime Adjustment}_{2nd\ 5days} = \frac{(((250 \text{ gal.} * 0.7)/5 \text{ days})/2 \text{ zones})}{5 \text{ gal.}/min.} = 3.5 \text{ minutes.}$$

Table 2 shows an example of the adjustments to the irrigation schedule for a given zone of a property being irrigated in accordance with the adjustments in the above example:

| Irrig. Day | 7/17 | 7/18 | 7/20 | 7/21 | 7/22 | 7/25 | 7/26 | 7/27 | 7/30 | 7/31 |
|---|---|---|---|---|---|---|---|---|---|---|
| Predicted Runtime | 5 min. | 5 min. | 6 min. | 7 min. | 7 min. | 7 min. | 5 min. | 4 min. | 7 min. | 7 min. |
| Adjustment | −1.5 min. | −1.5 min. | −1.5 min. | −1.5 min. | −1.5 min. | −3.5 min. | −3.5 min. | −3.5 min. | −3.5 min. | −3.5 min. |
| Adjusted Runtime | 3.5 min. | 3.5 min. | 4.5 min. | 5.5 min. | 5.5 min. | 3.5 min. | 1.5 min. | 0.5 min. | 3.5 min. | 3.5 min. |

As indicated above, one or more parameters and/or factors can be taken into account in determine the distribution of the reductions in runtimes and/or how the adjustments are applied to implement the distributed reductions.

Figure 24:
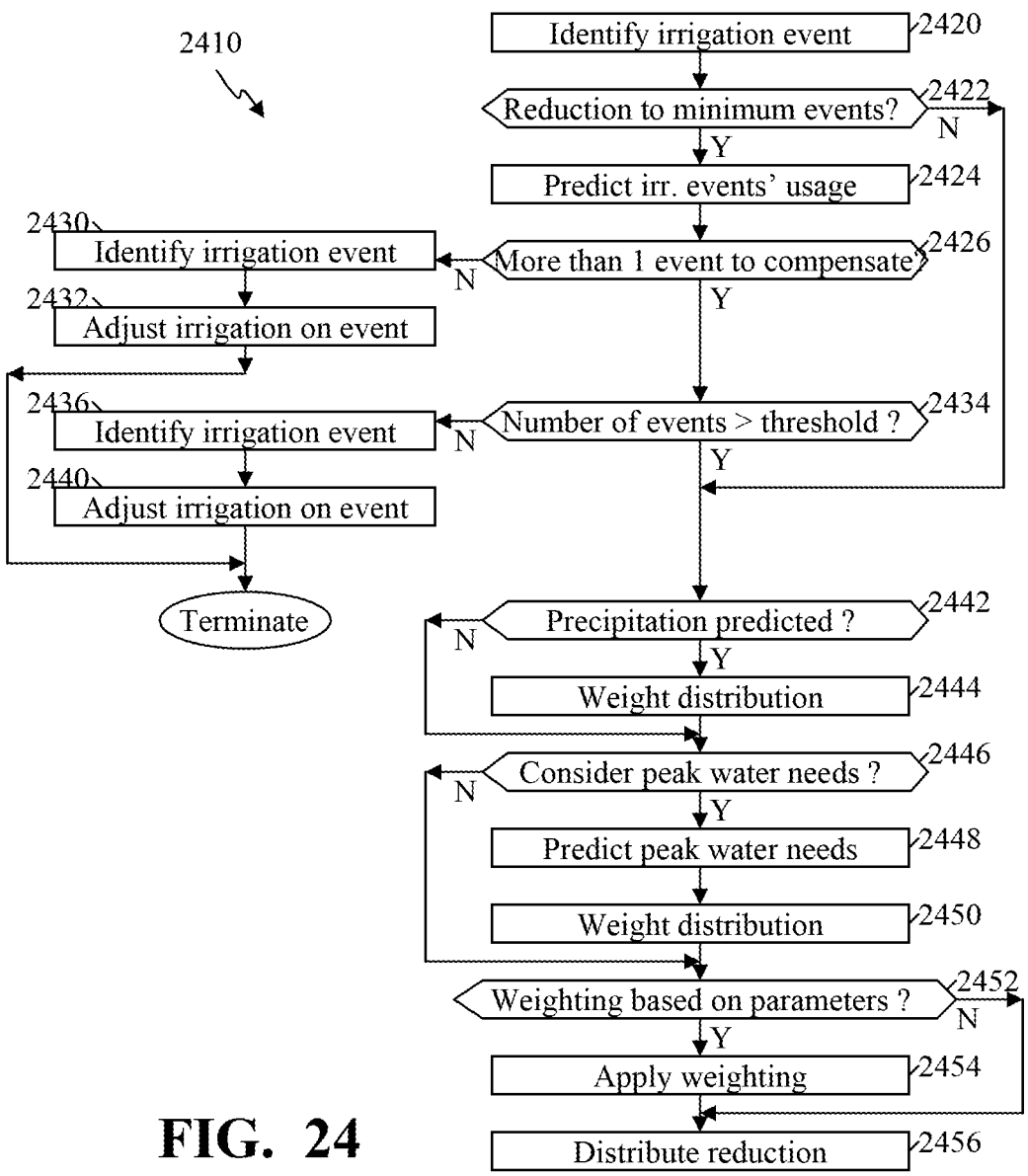
FIG. 24 depicts a simplified flow diagram of one exemplary process, according to some embodiments, of determining how to distribute the reductions in water usage to compensate for the predicted excess water usage.

FIG. 24 depicts a simplified flow diagram of one exemplary process 2410, according to some embodiments, of determining how to distribute the reductions in water usage to compensate for the predicted water usage in excess of the water budget. In some implementations, the process 2410 may be utilized to implement some or all of step 2314 of the process 2310 of FIG. 23. In step 2420, one or more irrigation events are identified during the remainder of the budget period. This identification, as described above, can take into account predicted weather, predicted ET data, historic data, other such information or combinations of such information.

In step 2422 it is determined whether there is a priority to apply reductions to a minimum number of events (e.g., is there a priority to simply skip a full day to compensate for predicted excess water usage instead of trying to distribute reductions over time). When there is no priority to apply reductions to a minimum number of irrigation events the process advances to step 2442. In those instances where there is a priority to minimize the number of events affected step 2424 is entered where a predicted water usage for each of the predicted irrigation events is identified. In step 2426, it is determined whether the predicted water usage of more than one predicted irrigation events is required to compensate for the predicted excess water usage. When it is determined that more than a single irrigation events is needed the process advances to step 2434.

Alternatively, step 2430 is entered when a single irrigation event can compensate for the predicted excess water usage, where first predicted irrigation water event in time that has a predicted irrigation water usage for the single predicted irrigation event that is equal to or greater than the predicted excess water usage is selected. In some embodiments, other criteria may be applied such that the next in time irrigation water event capable of compensating for the predicted excess usage is not selected (e.g., a last identified irrigation day of the budget period may be selected, or some selection based on a predicted irrigation need or other factors may be utilized). In step 2432 predicted irrigation water usage is reduced by the predicted excess water usage and the resulting reduced irrigation water usage for the selected irrigation event is used to determine irrigation runtimes for one or more zones or the selected irrigation event is identified as a non-irrigation event (e.g., when the difference between the predicted irrigation water usage and the predicted excess water usage is less than a threshold value). The process then terminates.

When it is determined in step 2426 that more than a single irrigation event is needed the process advances to step 2434 to determine whether the number of predicted irrigation event needed to compensate for the predicted excess water usage is greater than a threshold number of events, where the threshold number of events can vary depending on the number of events remaining in the budget period. The threshold number of events can be based on one or more factors such as, but not limited to, a percentage of events remaining in the budget period needed to compensate for the predicted excess water usage, predicted number of consecutive irrigation events that would need to be changed to non-irrigation events, and other such factors. When the number of predicted irrigation events needed to compensate for the predicted excess water usage is greater than a threshold number of events the process 2410 skips to step 2442.

In step 2436, a plurality of predicted irrigation events are identified where the sum of the predicted water usage for the predicted irrigation events is equal to or greater than the predicted excess water usage. In step 2440, reductions are applied to the identified events (e.g., the selected events are designate as non-irrigation events and/or reduce one or more zones to compensate for excess water usage). The process then terminates.

In step 2442, it is determine whether precipitation or a threshold amount of precipitation is predicted. When precipitation is predicted step 2444 is entered where the distribution of the reductions in irrigation water usage applied during the irrigation event is weighted such that largest reductions are implemented when or near the time the precipitation is predicted. For example, the process 2410 could identify a percentage of the number of predicted irrigation events before the predicted precipitation and the percentage of the number of predicted irrigation events after predicted precipitation; define a first reduction distribution for predicted events before the predicted precipitation and a second reduction distribution for predicted events after the predicted precipitation; then weight the distribution for the period before predicted precipitation with increasing reductions near the time of the predicted precipitation and weight the distribution for the period after predicted precipitation with increasing reductions near the time of the predicted precipitation. The weighting can depend on one or more factors, including the amount of expected perception, the expected duration of the precipitation and other such factors.

In step 2446, it is determined whether the distribution should take into account peak irrigation water needs. When peak irrigation water needs are not taken into account the process advances to step 2452 to determine whether other weighting should be applied. Alternatively, when peak irrigation needs are to be take into account, step 2448 is entered where peak irrigation water needs over the identified one or more irrigation events is predicted. This peak irrigation water need can be determined, for example, based on predicted and/or historic ET data, weather data, and the like to calculate desired irrigation runtimes when assuming no restrictions on water usage, where the peak irrigation events can be identified as a function of the predicted irrigation runtimes. In step 2450, the distributions of reductions in water usage are weighted such that smallest reductions occur proximate to and/or during those predicted peak irrigation water needs.

In step 2452, it is determined whether one or more other weightings are defined or should be applied relative to other parameters (e.g., weight distribution of reductions in water usage such that larger reductions occur toward an end of budget period). When further weighting is to be applied step 2454 is entered to apply the defined and/or determined additional weighting. In those instances where further weighting is not to be applied, or after further weighting is applied, the process advances to step 2456 to distribute reductions in water usage equally across predicted irrigation days or in accordance with the applied weightings.

Similar processes can be implemented when the predicted water usage is anticipated to be less than the water budget after adjustments were previously implemented to reduce irrigation based on a previous prediction that water usage was predicted to exceed the water budget. This allows for increasing in irrigation should water usage be less than predicted.

Figure 25:
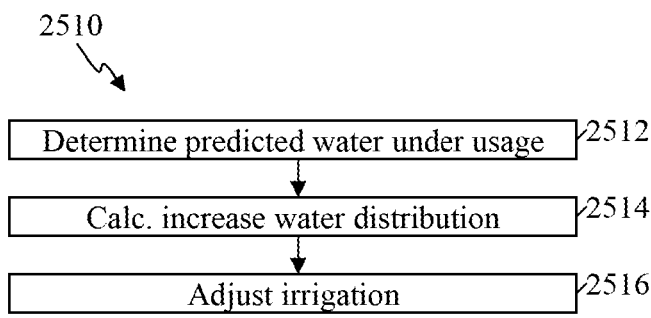
FIG. 25 depicts a simplified flow diagram of an exemplary process, according to some embodiments, of adjusting irrigation in response to determining that predicted water usage is not expected to exceed the water budget during the corresponding budget period.

FIG. 25 depicts a simplified flow diagram of an exemplary process 2510, according to some embodiments, of adjusting irrigation in response to determining that predicted water usage is not expected to exceed the water budget during the corresponding budget period. In some instances, the process 2510 may be utilized to implement part of step 2250 of the process 2210 of FIG. 22. In step 2512, an amount of predicted water under usage is determined as a function of the water budget and the predicted water usage. In some instances this predicted water under usage is determined with a margin of error in attempts to limit later adjustments due to excess water usage. For example, the predicted water under usage may be calculated by subtracting the predicted water usage from the water budget and subtracting from the results a threshold or margin amount (e.g., predicted water under usage=water budget—predicted water usage—margin).

In step 2514, an increased water usage distribution is identified that can be applied to increase irrigation and distribute the predicted under used water over the identified one or more predicted irrigation events. There are numerous ways in which the predicted under used water can be distributed and one or more factors can be taken into account in selecting how the distribution is to be implemented. Again, in some embodiments, the under used water can be divided by the number of remaining identified irrigation events to calculate an amount of water that is to be additionally delivered during each identified irrigation event. In other embodiments, the distribution may be weighted based on weather conditions, expected or predicted weather, historic information, the amount of time remaining in the budget period, the types of plant life being irrigated, zone priorities, and other such factors and combinations of factors. As one example, the increased water usage distribution may be weighted such that the increases are greater toward the end of the budget period with historic knowledge that a subsequent budget period tends to be hot and thus may want to end the current budget period with higher levels of irrigation if possible.

In step 2516, adjustments for predicted irrigation runtimes for one or more irrigation zones are determined for one or more predicted irrigation events during the remainder of the current budget period based on the identified water under usage distribution to increase irrigations. Again, how the exact adjustments are implemented can be based on numerous factors as described above and further below. In some instances, the zones may be prioritized. For example, there may be one or more zones designated as higher or highest priority, where increases in runtime are initially directed to these higher priority zones. In calculating increases in runtime based on an identified under used water over the budget period, in one example, the distribution can be equally distributed over the identified number of irrigation events remaining in the budget period, with the runtimes for the one or more highest priority zones being increased in accordance with the increased water usage distribution. For example, the highest priority zones can be identified, the distributed increases for the given irrigation event can be divided by the number of highest priority zones to determine an increased runtime applied to the highest priority zones. Similarly, weighting can be applied in determining adjustments in distribution of the water under usage.

Some embodiments further take advantage of the water budget to identify water usage that falls below the water budget. This under used water can, in some instances, be rolled over into subsequent budget periods. In other implementations, the under used water relative to the budget may result in a credit to a user or may be utilized by the user as a commodity that the user can trade, share, sell or otherwise capitalized upon. For example, if a user had a 10,000 gallon water budget available over a one month budget period and the water use at the property was only 8,000 gallons over the budget period, the property owner could potentially roll the additional 2,000 under used gallons to a subsequent budget period (e.g., the next month). As another example, the additional 2,000 under used gallons may result in discounts or credits on the property owner's water bill, or may be purchased back by the water supplier. In yet other examples, the property owner may give, sell and/or trade the additional 2,000 unused gallons, such as to a neighbor, a business entity or other party. For example, the property owner may obtain water credits for each under used volume of water and these water credits can be given away, sold or otherwise traded to one or more third parties. As such, property owners may have incentives to reduce water usage, and/or may recuperate some or all of their investments to reduce water usage, such as purchasing artificial grass, adding or upgrading an irrigation system, changing water deliver devices 134, investing in equipment to capture excess precipitation and reuse that captured precipitation, investing in equipment to reuse water, incorporating low flow products into the property and/or other investments.

Similarly, users may be able to purchase, be granted, trade for and/or otherwise acquire under used water or water credits. The acquired under used and/or credits, in some instances, can be used to increase a water budget at the user's property. For example, a property may have a 10,000 gallon water budget over a one month budget period. If the user acquires 2,000 gallons worth of water credits, the water budget for the given budget period can be increased to 12,000

Figure 26A:
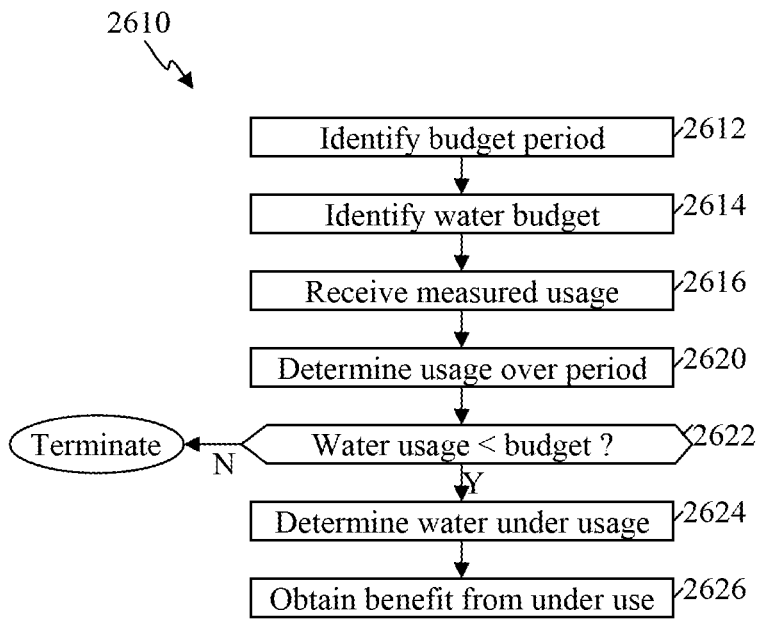
FIG. 26A depicts a simplified flow diagram of a process according to some embodiments to capitalize on under used water, reducing water usage below the water budget and/or control costs relative to water usage.

FIG. 26A depicts a simplified flow diagram of a process 2610 according to some embodiments to capitalize on under used water, reduced water usage below the water budget and/or control costs relative to water usage. In step 2612, it is identified that the budget period of time has expired. In step 2614, a water budget is identified for the expired budget period. In step 2616, a measured water usage of water used at the property is received. In step 2620, the water usage over the budget period is determined as a function of the received measured water usage. As described above, this may depend on one or more factors and can take into account irrigation and/or non-irrigation water usage. In some instances, the water usage is accumulated over the budget period and the received measured water usage is utilized to determine an accumulated water usage over the budget period by, for example, subtracting an initial measured usage taken at the beginning of the budget period from the measured usage.

In step 2622, it is determined whether the water usage during the budget period is less than the water budget. In those instances where the water usage is equal to or greater than the water budget the process 2610 terminates. Alternatively, when water usage is less than the water budget step 2624 is entered to determine an amount of unused water as a function of the water budget and the water usage. In some instances the unused water is determined by subtracting the water usage from the water budget. In other instances a buffer factor may further be applied. This buffer factor may compensate for inaccuracies or the like.

In step 2626, the determined unused water is utilized to obtain a monetary benefit proportional to the determined unused water. The monetary benefit, as described above, may result in a reduction in a water bill, some or all of the unused water may be sold to a third party, the unused water may be rolled over to a subsequent budget period allowing a property to actually utilize water in excess of a water budget for that subsequent budget period without being subject to penalties for exceeding the budget and/or other such monetary benefits.

Figure 26B:
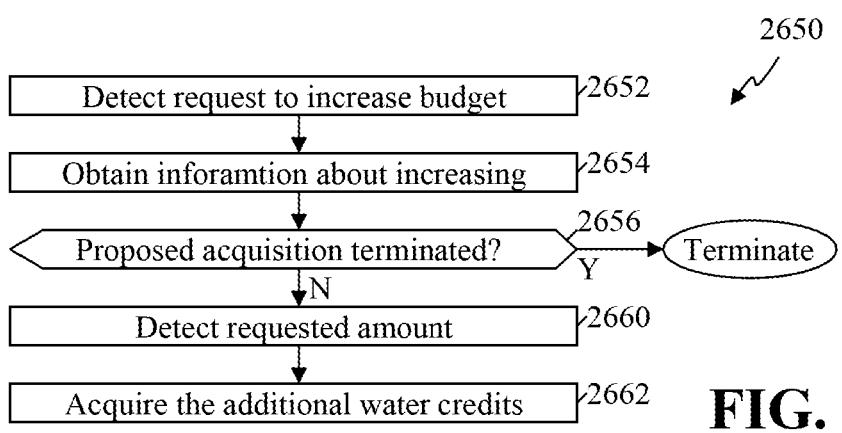
FIG. 26B depicts a simplified flow diagram of a process according to some embodiments to increase a water budget.

FIG. 26B depicts a simplified flow diagram of a process 2650 according to some embodiments to increase a water budget. In step 2652 it is identified that a user has requested to increase a water budget. In step 2654 information about acquiring water credits is obtained. This information can be locally stored, can be acquired from a secondary device (e.g., the display device 324), can be acquired from a remote source 630 via a communication link and/or a distributed network, or other such source or combinations of sources. In some instances, limits relative to water credits may apply, for example, based on a user, a property, a geographic location of the property and/or other such factors. Further, limits might additionally or alternatively include the types of water credits, the amounts of water credits, the source from which water credits can be acquired and other such limits or combinations of such limits. Further, the information may include one or more of: amounts of water credits that are available; pricing; source of the water credits; whether trades are available; options; limits on use; and other such information.

In step 2656 it is determined whether the potential acquisition is terminated. This can be based on a user's instruction to terminate (e.g., detecting a selection of a "cancel" option), based on an elapse of a time period to receive a user's selection, or other such event. When the acquisition is terminated the process 2650 is terminated. Alternatively, step 2660 is entered where an indication of an amount of or water credits is received. In some instances, this can be detected based on a user's selection of an option provided to the user, an entry by a user (e.g., a user typing in an amount of additional water desired), or other such indication. In step 2662 the additional water usage or water credits are acquired. This may include the user entering in payment (e.g., through a credit card, on-line payment service or other such payment), receiving an authentication (e.g., receiving from the user an account number (such as a user's water authority account number), a password to a user's account (such as with the water authority); an irrigation controller identification; or other such authentication or combinations of such authentications), receiving one or more bids entered by the user when the source for the water credits is an auction, and/or other such actions.

In some embodiments, some or all of the steps of the processes 2610 and/or 2650 are performed at the irrigation controller 130. In other embodiments, some or all of the steps of the processes 2610 and/or 2650 are performed by other devices or combinations of devices. For example, in some implementations a water authority may perform some or all of the steps of the processes 2610 and/or 2650. As another example, the separate display device 122b or a user's computer or other such device can perform some of the steps of the processes 2610 and/or 2650.

The irrigation controller 130, in some embodiments, not only monitors irrigation water usage but also can monitor and/or provide information about irrigation water usage and/or non-irrigation water usage. By tracking water usage the irrigation controller 130 can provide the user with beneficial information that not only may help with regard to irrigation but may further provide beneficial information about non-irrigation water usage. An irrigation controller 130 can distinguish between irrigation water usage and non-irrigation water usage, such as by utilizing the irrigation timing. For example, water use occurring while irrigation is not active can be designated as non-irrigation water usage. In other instances where one or more meters are dedicated to monitor irrigation water usage the irrigation controller can identify non-irrigation water usage by subtracting the measured irrigation water usage as provided by the dedicated irrigation meters.

Further in some embodiments, an irrigation controller may be provided with and/or can store water flow profiles relative to common water usage, such as profiles corresponding to a toilet flushing, a washing machine, a dishwasher, a shower, a bathtub, facet, irrigation and/or other water usage and/or delivery devices. Water flow profiles can generally be considered as a set of data defining water flow and/or pressure characteristics at one or more locations in a water delivery system over time. In some implementations, a water flow profile is defined graphically. Additionally or alternatively, the irrigation controller 130 may generate water flow profiles relative to water usage at the property, which can include irrigation and in some instances non-irrigation water usage, and utilize these generated water flow profiles in evaluating water usage. The water flow profiles can be generated based on information received from the one or more flow meters, water pressure, water use for a give event or events, and other such factors or combinations of such factors. Similarly, profiles of combinations of water flows and/or variations of water flow profiles (e.g., based on changes in water pressure, other water usage, and the like) can be stored and/or generated at the irrigation controller. By receiving or taking flow measurements, the measured flows can be compared to and/or and match against stored profiles. The irrigation controller can utilize these profiles to identify non-irrigation water usage and estimate, calculate and/or identify an amount of non-irrigation water use relative to a profile of the detected water flow. Similarly, the irrigation controller may utilize the water flow profiles to identify irrigation water usage and/or estimate, calculate and/or identify an amount of irrigation water used relative to one or more water flow profiles and/or variations of profiles (e.g., based on changes in water pressure). Further, in instances where it appears water is substantially always flowing, then the irrigation controller 130 can identify that a leak is present and can notify the user or property owner. Similarly, water flow profiles may be used to aid in identifying the device leaking, a type of leak and/or provide tips on correcting the leak or directing a user to a source to obtain relevant information to correct the leak. For example, a water profile for a given irrigation zone may be used to identify a leak or broken pipe, a leaking or broken water delivery device 134 or other such leak or breaks.

As a result, the irrigation controller 130 can be configured to provide a user or property owner with information about non-irrigation water usage, irrigation water usage, amounts of irrigation water usage, amounts of non-irrigation water usage, habits relative to water usage and other relevant information. Similarly, as described above, the irrigation controller 130 can provide information to the user regarding irrigation scheduling, water budget, water usage, predicted water usage, adjustments to irrigation, costs associated with water usage and other such information. This information can be displayed through the display 882 of the irrigation controller 130 or communicated to one or more devices to be viewed and/or accessed by the user. For example, the irrigation controller 130 can communicate information to the separate display device 324 to be accessed and/or viewed by a user.

Figure 27:
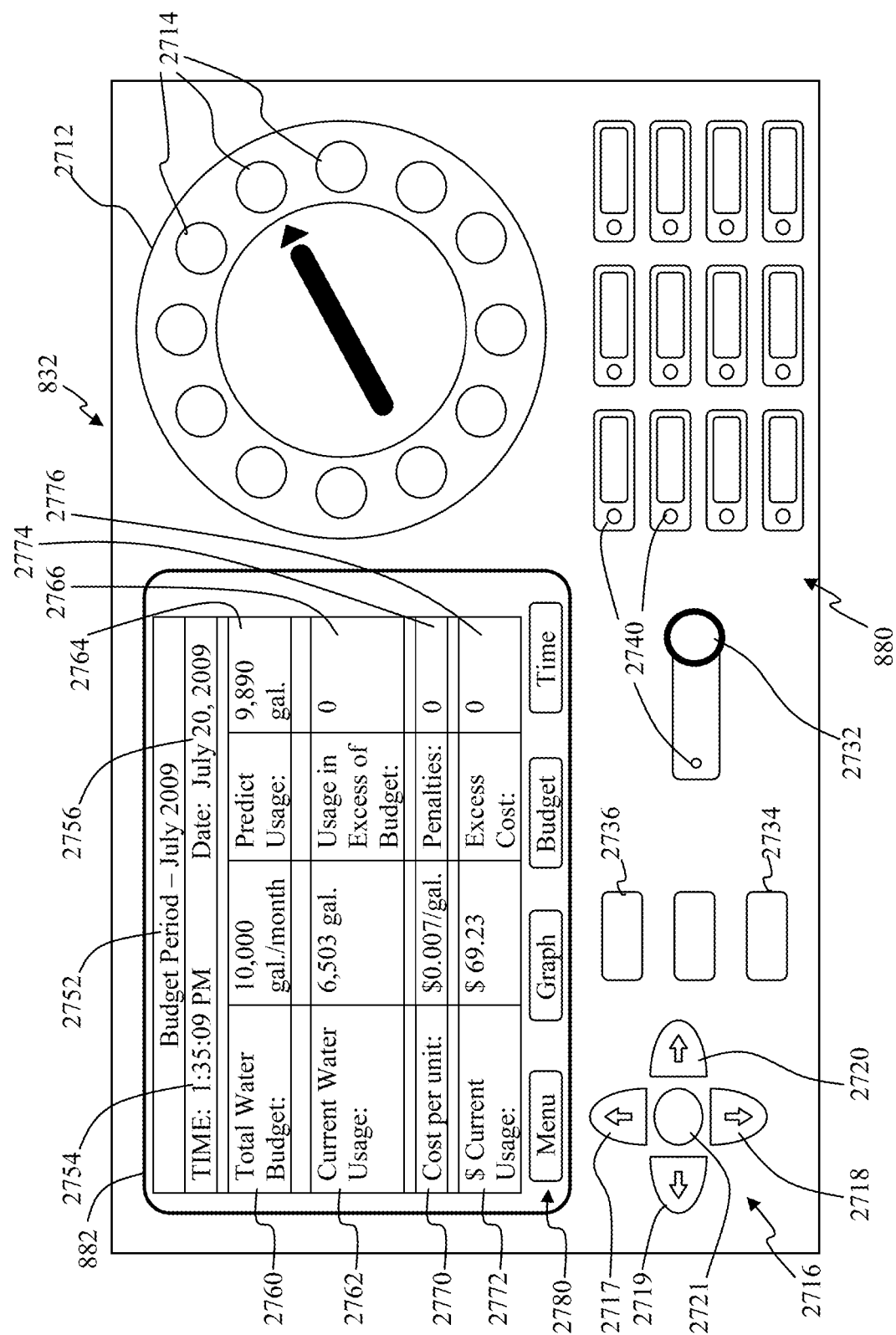
FIG. 27 depicts a simplified diagram of an exemplary user interface of an irrigation controller according to some embodiments.

FIG. 27 depicts a simplified diagram of an exemplary user interface 832 of an irrigation controller 130 according to some embodiments. The user interface 832 includes user inputs 880 and a display 882. The inputs 880 can include, for example, a rotary dial 2712, a plurality of functionality labels 2714 marking a plurality of selectable positions of the rotary dial 2712, multi-function adjustment button group 2716 (which can contain, for example, up, down, left and right multi-function buttons 2717-2720 and a select button 2721), and other relevant buttons that initiate different functions, such as a manual start button 2732, language button 2734, display on/off 2736. Some buttons may include a LED indicator 2740 indicating activation of the corresponding button.

The display 882 can display irrigation information, water usage information, irrigation scheduling, weather data, historic data and other relevant information. Additionally in some instances, the display 882 may be able to display graphics and other information, such as Web pages and other information. As an example, the display 882 may display water budget information such as a water budget information table or listing 2750. In this example, the budget information is displayed in a table, however, in other instances the information may be displayed as a list or in columns. Similarly, the table and/or listing may be scrolled in instances where the entire table, list or information is not displayed (e.g., scrolled up, down, left, right using the multifunction buttons 2716). The budget information table 2750 can be displayed to provide a variety of information about the water budget and current statistics and parameters. For example, the budget table 2750 can identify a current budget period 2752 and/or duration of the current budget; a current time 2754 and/or date 2756; a water budget 2760; a current water usage 2762 during the current budget period; an estimated or predicted water usage over the budget period 2764; predicted water usage in excess of the water budget 2766 if any; a cost per unit 2770 for water usage (e.g., cost per gallon); a cost for the water used during the budget period 2772; penalties 2774 that might be incurred should the water use exceed the water budget; total estimated cost to exceed the water budget 2776; and other such information. As described above, the water budget information is depicted in a table form in the example of FIG. 27; however, the information can be provided in a variety of different ways, such as a simply listing through which the user can scroll. Similarly, in some instances, the user can designate the font size, the amount of information that is displayed, whether displayed in table, listing or other format, and/or other such control. In yet other embodiments, the user can specify what information is displayed in a given table or cooperatively displayed. In some instances the display 882 may additionally display user selectable options 2780 that can be selected, for example, using the multi-function adjustment buttons 2717-2721. In some instances the multi-function adjustment buttons 2717-2721 can cause transitions on the display, such as moving a cursor or highlighting feature, changing display screens, selecting displayed options 2780 and the like.

The user interface 832 further allows the user to define parameters, set irrigation schedules, set priorities, specify budgets when relevant (e.g., by volume of water, dollar amount, runtimes, event budgets, daily budgets, zone budgets, and the like), define irrigation conditions and other such information. Different displayed buttons 880, the rotary dial 2712 and/or the multifunction buttons 2716 allow a user to access menus, entry fields and/or displayed interfaces that can be provided to allow the user to enter information and/or adjust information and/or parameters. As examples, some of the parameters and/or information that may be specified by a user may include, but is not limited to, one or more water budgets; irrigation scheduling, priorities whether area, zone or other such priority (e.g., top priority, middle priority, low priority; specifying a level (such as define each zone with a level between 1-10); prioritizing each zone highest priority to lowest priority; or other such priorities); specifying actions, which may be based on a relative priority; specifying adjustments to be implemented in the event adjustments are needed; one or more cost budgets (which may be for an entire water use during the budget period; a cost per zone as a priority, and/or other such costs); types of irrigation and/or types of water delivery devices, plant material type being irrigated (e.g., hearty zone, medium hearty zone, non-hearty zone; vegetables, garden, grass, flowers, trees, shrubs, and the like; or other such types); flow rates and/or anticipated flow rates; water pipe sizes; water pressure; slopes; terrain; soil types; precipitation rates; override instructions; tiers; requests for notifications; and other such parameters and information.

As indicated above, the irrigation controller 130 may be in communication with the display device 324, which in some instances is located separate from the irrigation controller. For example, the display device 324 may be located within a house to receive information from the irrigation controller that can be displayed to a user.

Figure 28:
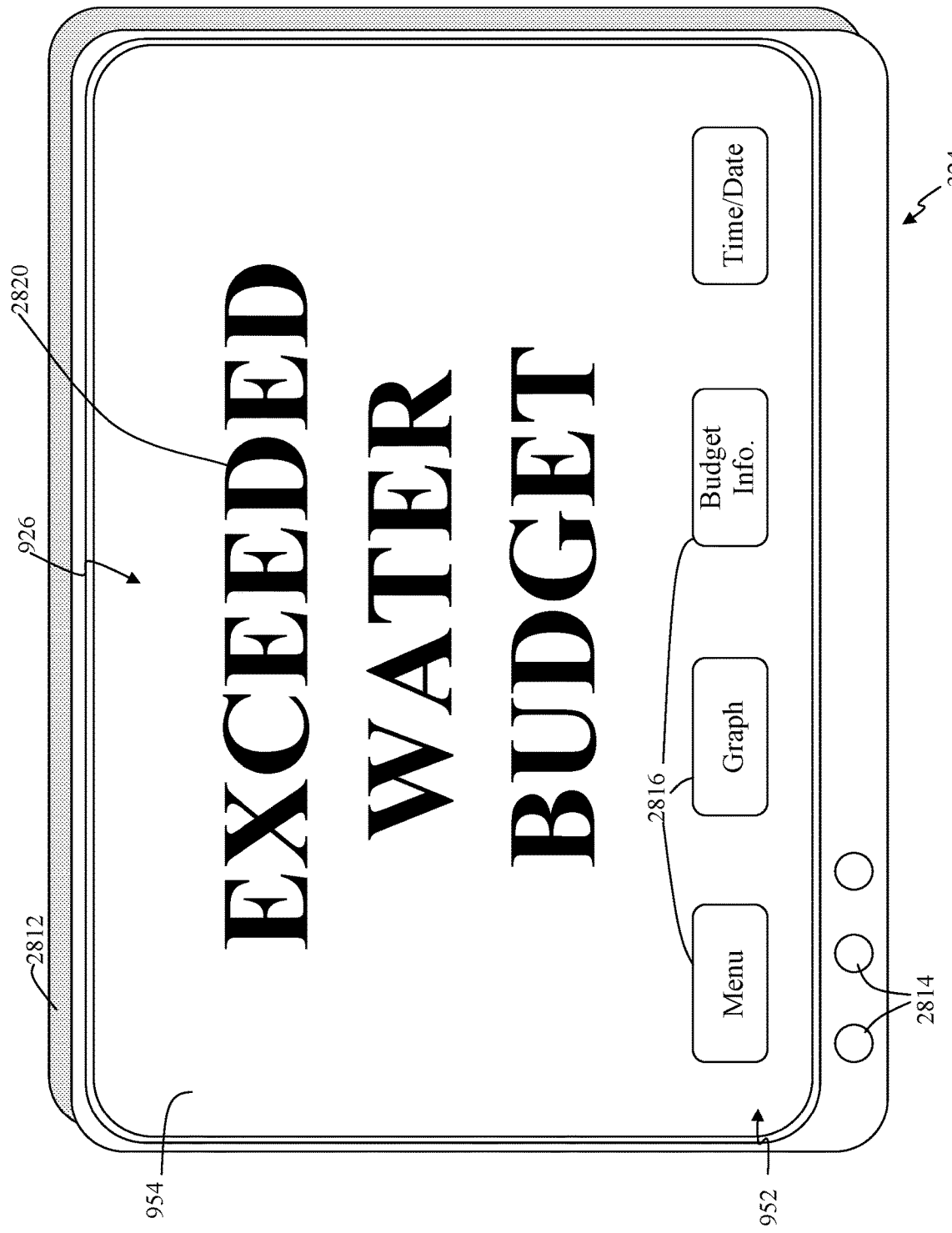
FIG. 28 depicts a simplified diagram of a representative display device according to some embodiments.

FIG. 28 depicts a simplified diagram of a representative display device 324 according to some embodiments. The embodiment of the display device 324 depicted in FIG. 28 shows a casing or housing 2812, and a user interface 926 that includes a display 954 and user inputs 952. As described above, the display 954 can be an LCD display, plasma display, touch screen or other such display. The display device 324 can receive and display information from the meter 122, a separate meter 422, the irrigation controller 130, a remote source accessed over a network 624 (e.g., intranet, power line communication network, Internet, etc.), user entered or other such source or sources. Further, in some instances, the display device 324 can have the capabilities to perform evaluations of the information received and present the information and/or results from the evaluation through at least the display 954.

In some instances, the display device 324 can include user inputs 952, which in the embodiment shown in FIG. 28 include buttons 2814 and/or options 2816 displayed on the display 954 that is a touch screen. Substantially any number of buttons 2814 and/or options 2816 can be provided allowing the user to obtain different types of information, conform the display device 324 and/or communicate from the display device. As representative examples, the options 2816 may include: a menu option that, for example, allows access to a top or main menu providing the user with additional options about sources of information, types of information, options in controlling the display device 324 and other such options; a graph or graphics option can allow a user to obtain graphical data, such as for the water usage; a budget information option providing the user with budget information such as a total budget, a current water usage, costs associated with water usage and/or exceeding the budget and other such budget information; and a time and date option that allows the user to set and/or adjust a current date and/or time, access a calendar, and other relevant information. As depicted in FIG. 28, in some instances, the display device 324 can receiving information from the irrigation controller 130 identifying that the water budget has been exceeded. In response to receiving this information the display device 324 can generate a notification 2820 to the user that the water budget has been exceeded. The display device 324 may, in some instances, additionally produce an audible notification or alarm. As described above, the irrigation controller 130 can display similar information and/or may produce a similar audible notification.

Figure 29:
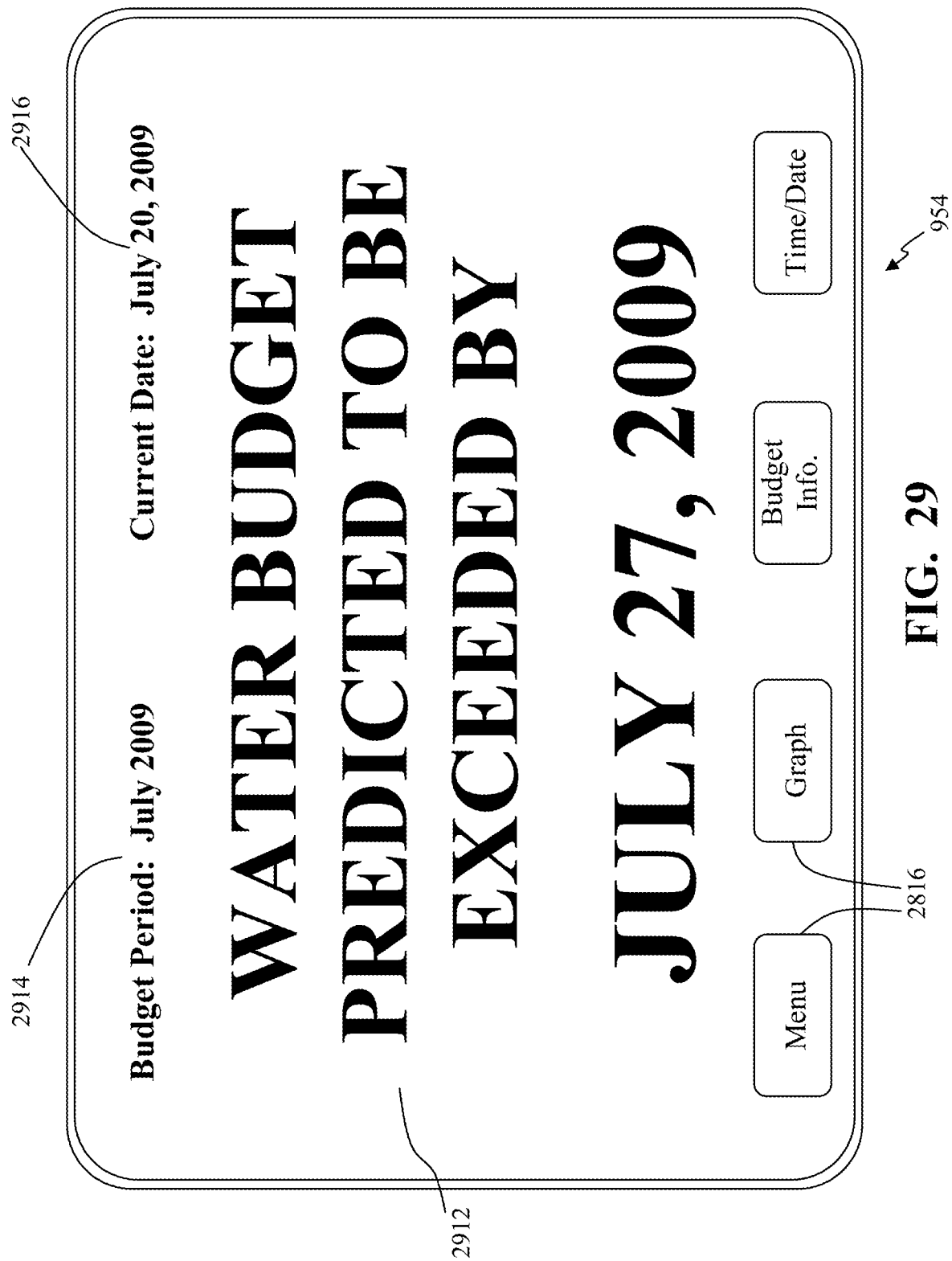
FIG. 29 depicts a simplified display screen displaying the user options and a notification.

FIG. 29 depicts a simplified diagram of the display screen 954, according to some embodiments, displaying the user options 2816 and a notification 2912 that the water budget is predicted to be exceeded, including a date when it is predicted the water budget is going to be exceeded. In some instances, the display device 324 can additionally display the budget period 2914, and a current date 2916, day within the budget period or days (or other time frame) remaining in the budget period.

Figure 30:
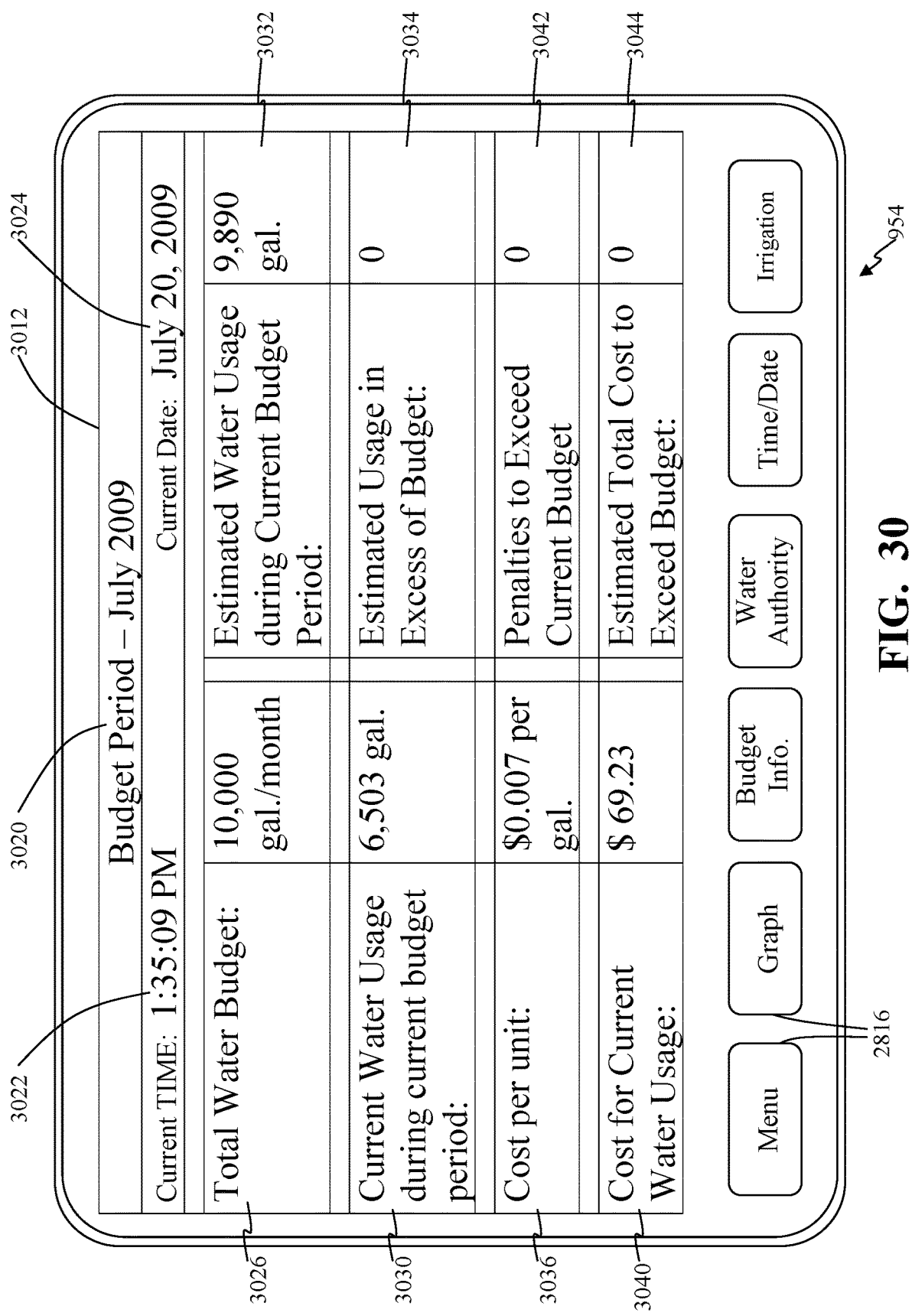
FIG. 30 depicts a display screen, according to some embodiments, displaying additional water usage and budget information.

FIG. 30 depicts the display screen 954, according to some embodiments, displaying additional water usage and budget information. In some instances a budget information table or listing 3012 can be displayed providing a variety of information about the water budget and current statistics and parameters. For example, the budget table 3012 can identify a current budget period 3020 and/or duration of the current budget; a current time 3022 and/or date 3024; a water budget 3026; a current water usage 3030 during the current budget period; an estimated or predicted water usage over the budget period 3032; predicted water usage in excess of the water budget 3034 if any; a cost per unit 3036 for water usage (e.g., cost per gallon); a cost for the water used during the budget period 3040; penalties 3042 that might be incurred should the water use exceed the water budget; total estimated cost to exceed the water budget 3044; and other such information. This information is depicted in a table form in FIG. 30; however, the information can be provided in a variety of different ways, such as a listing through which the user can scroll. Similarly, in some instances, the user can designate the font size and/or amount of information that is displayed. In yet other embodiments, the user can specify what information is displayed in a give table 3012 or cooperatively displayed.

The display device 324 can further display one or more user options 2816, such as those described above. Other options that might be displayed with the budget information table 3012 might include a water authority option that allows a user to get information from the water authority (e.g., the current budget, bill rates, etc.), communicate with the water authority and the like. There may also be an irrigation option that allows a user to get information from the irrigation controller 130, such as irrigation schedule, irrigation adjustments, runtimes, water usage, and other such information; communicate with the irrigation controller 130, such as adjust irrigation scheduling, override adjustments, halt irrigation on one or more zones and other such communications; communicate with a remote source associated with the irrigation controller, for example, to obtain updates, suggestions on optimizing irrigation and other such information; and obtain other information about the irrigation controller 130, the valves 132, the irrigation delivery devices 134 or other such information.

FIG. 31 depicts a simplified diagram of the display screen 954, according to some embodiments, displaying an example of a budget information table 3012. In this example, the budget table displays a notification 3112 that the water budget has been exceeded during the specified budget period, which in this example identifies a start date 3114 and end date 3116 of the budget period. The budget table additionally identifies an estimate water usage in excess of the budget 3120, a penalty 3122 for exceeding the budget, which could be a flat fee, an increased cost per unit 3036 of water or other such fee, the estimated cost to exceed the budget 3124; and a total estimated cost 3126.

FIG. 32 depicts a simplified diagram of the display screen 954, according to some embodiments, displaying an example of a budget information table 3210. In this example, the budget information table displays a notification 3212 that the current water usage has exceeded a first water budget tier and the current water budget applies to a second tier, which in some instances is associated with higher rates or cost per unit 3236 (e.g., an increase in cost per unit of water, such as a jump from $0.007 per gallon to a cost of $0.014 per gallon), and/or additional penalties 3242.

Figure 33:
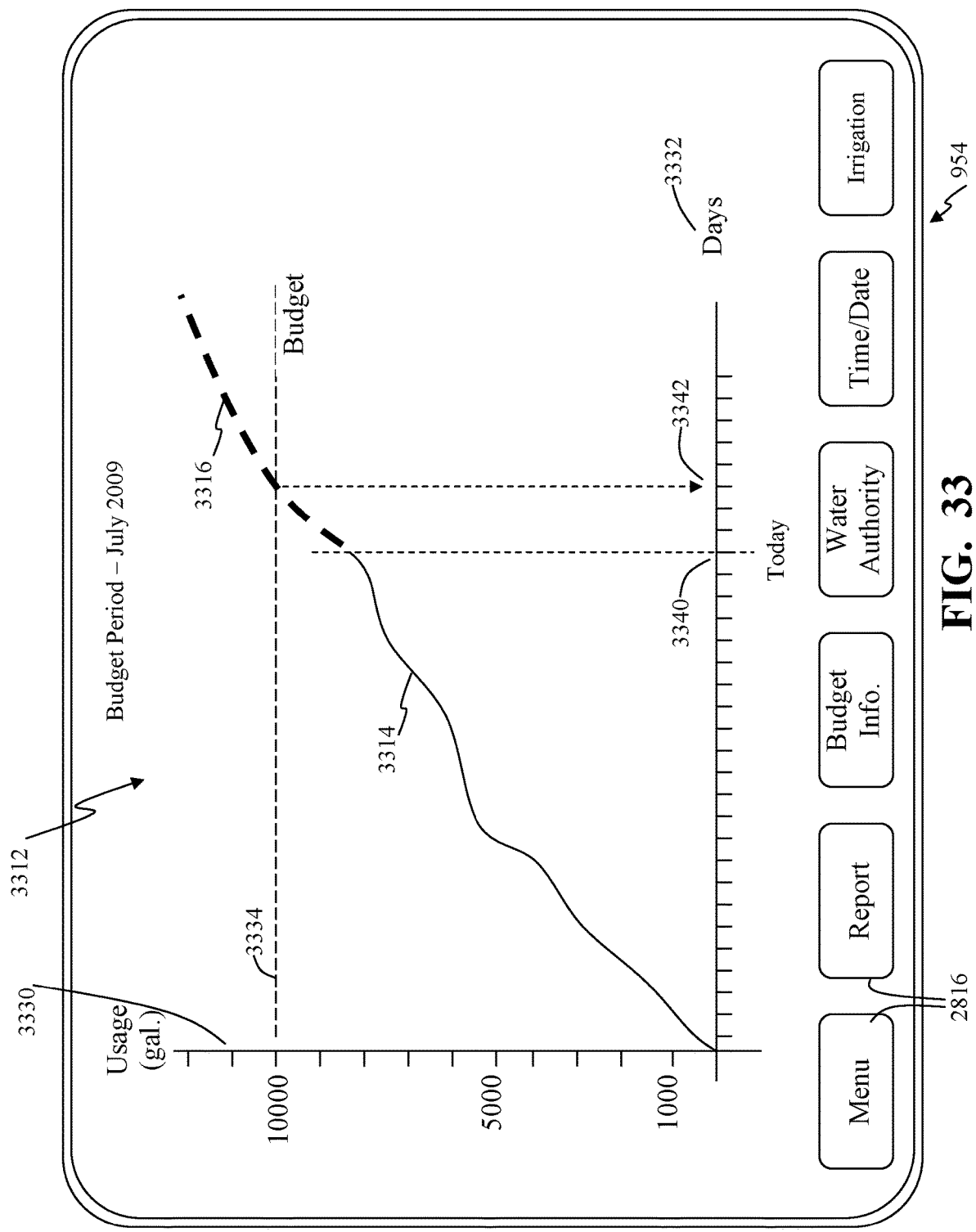
FIG. 33 depicts a simplified display screen, according to some embodiments, displaying an example of a graphical representation of water usage and/or predicted water usage.

FIG. 33 depicts a simplified diagram of the display screen 954, according to some embodiments, displaying an example of a graphical representation 3312 of water usage 3314 during the budget period and/or predicted water usage 3316 over the remainder of the budget period. In the representative example shown in FIG. 33 the graphical representation shows water usage 3330 on a vertical axis and events, days or the like 3332 during the budget period along the horizontal axis. The budget is graphically identified by the dashed line 3334 (e.g., at 10,000 gal.). This example also identifies a current day or event 3340 (e.g., Today) on the event or day axis 3332 along the budget period, as well as a day or event 3342 when it is predicted that the continued water usage is expected to exceed the budget. Again, one or more user options 2816 may be provided.

Figure 34:
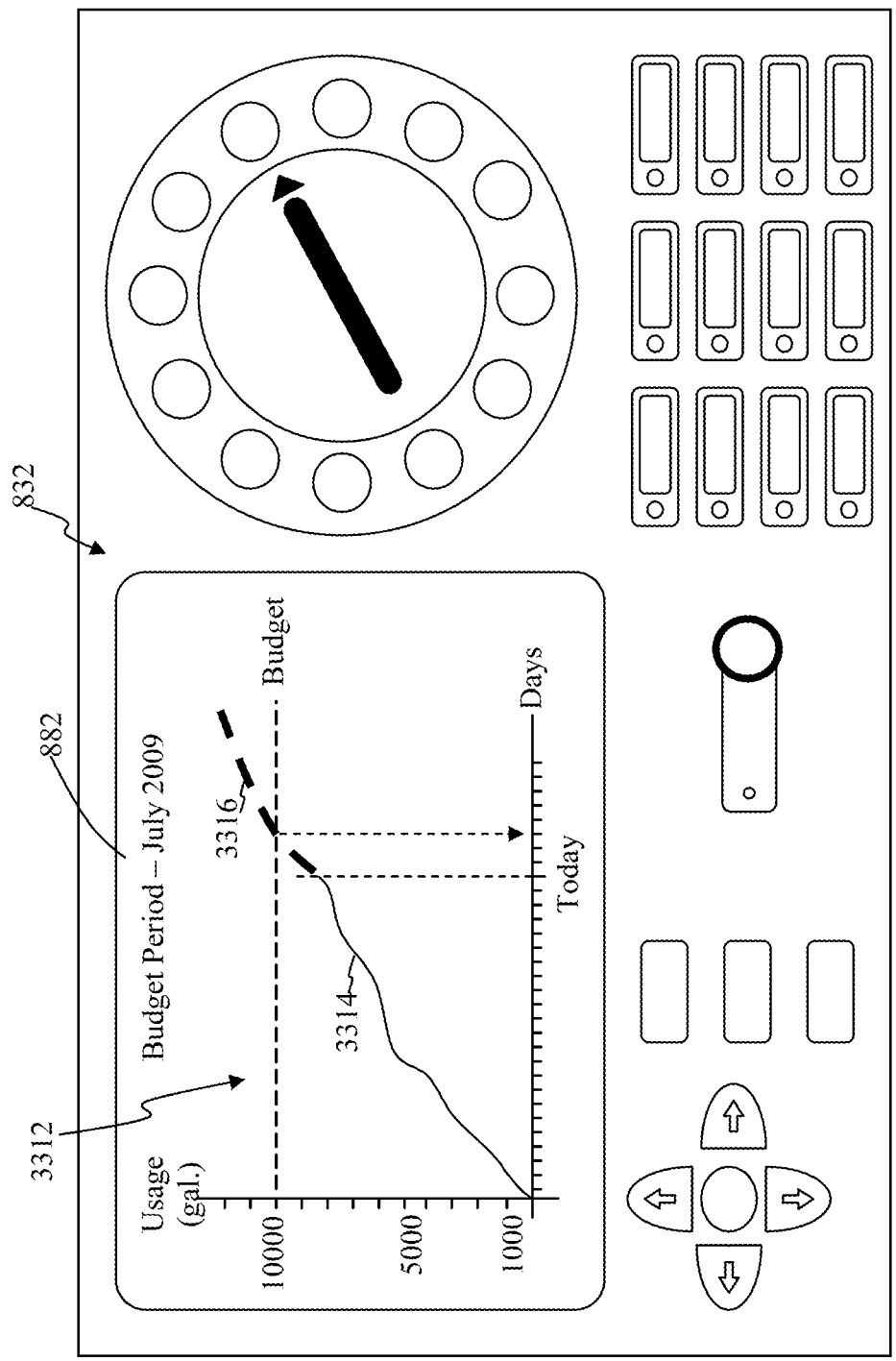
FIG. 34 depicts a simplified representation of a user interface of an irrigation controller, according to some embodiments, displaying an exemplary graphical representation of water usage and/or predicted water usage.

FIG. 34 depicts a simplified representation of a user interface 832 of the irrigation controller 130, according to some embodiments. As introduced above, the irrigation controller 130 in some embodiments can display information about the water usage. In this exemplary representation the display 882 of the irrigation controller 130 is displaying the graphical representation 3312 of water usage displayed in FIG. 33, again showing water usage 3314 during the budget period and the predicted water usage 3316.

Figure 35:
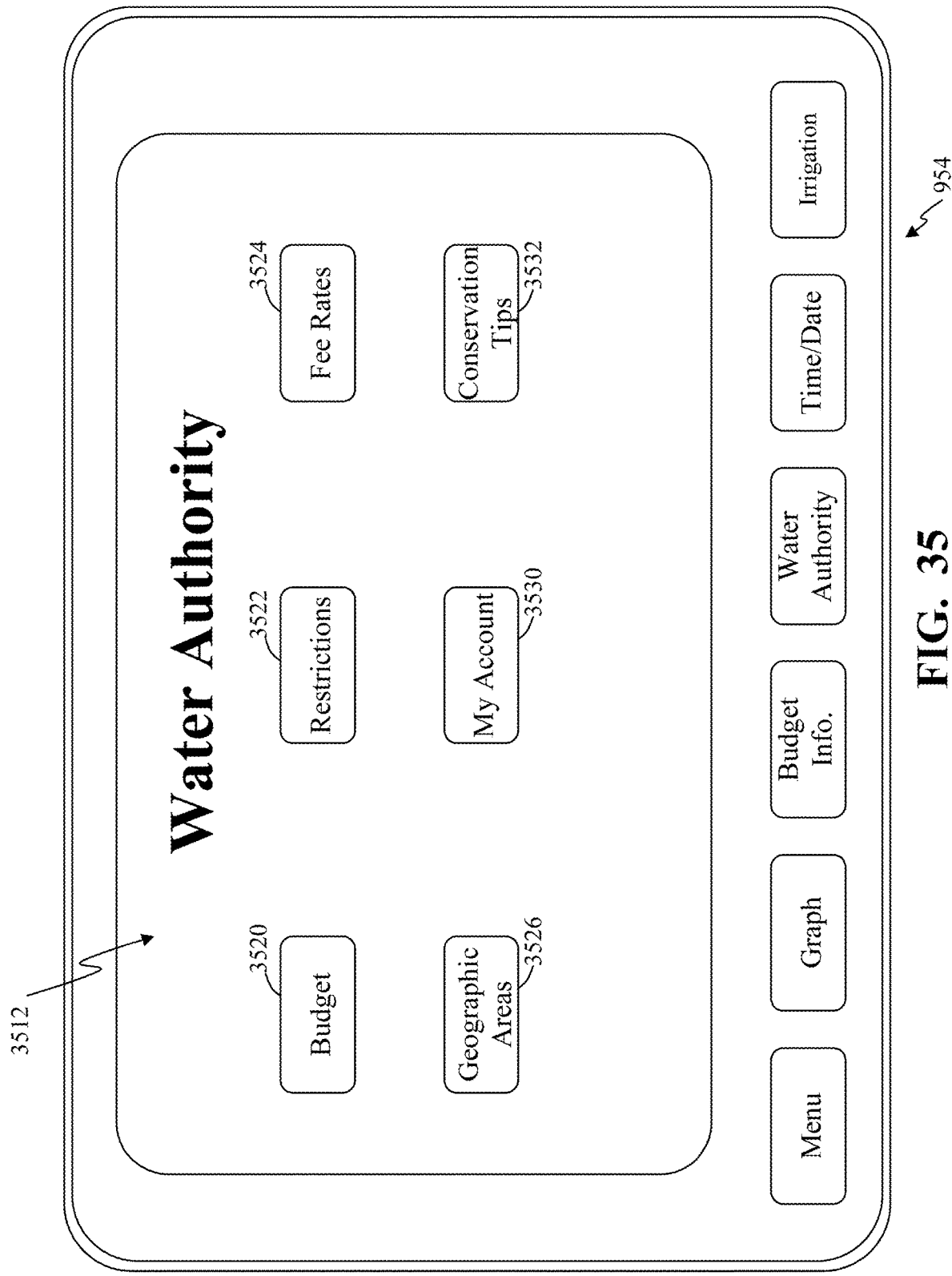
FIG. 35 depicts a simplified diagram of the display device, according to some embodiments, displaying an example of a water authority interface.

FIG. 35 depicts a simplified diagram of the display screen 954, according to some embodiments, displaying an example of a water authority interface 3512. This water authority interface is a simplified example of an interface activated in some instances upon selecting the water authority option from the user options 2816. In this example, additional options are presented to the user to obtain additional information and communicate with the water authority. For example, the additional user options might include a budget option 3520 to retrieve and/or verify a water budget of a budget information table 3012. A restrictions option 3522 can be included that allows a user to retrieve and/or view potential other restrictions that the water authority has issued and might apply to the user and/or the property being irrigated. A fee rate option 3524 may be available that provides information relative to the cost of water usage, potential fees associated with exceeding a budget, additional costs, potential reduction in costs (e.g., for implementing water saving techniques) and other such information. A geographic area option 3526 can be included that allows the user to identify budgets and/or restrictions based on geographic areas, including the area where the property is located. An account option 3530 can be included in some embodiments that allows a user to get information about his/her account, such as past bills, current bills pending, current rates, information about reduction in costs (e.g., for implementing water saving techniques) and other such information. A conservation tip option 3532 might be included that provides the user with information supplied by the water authority or other source for ways to reduce water usage. Other options can be included that allows the user to obtain information and/or communicate with the water authority.

Figure 36:
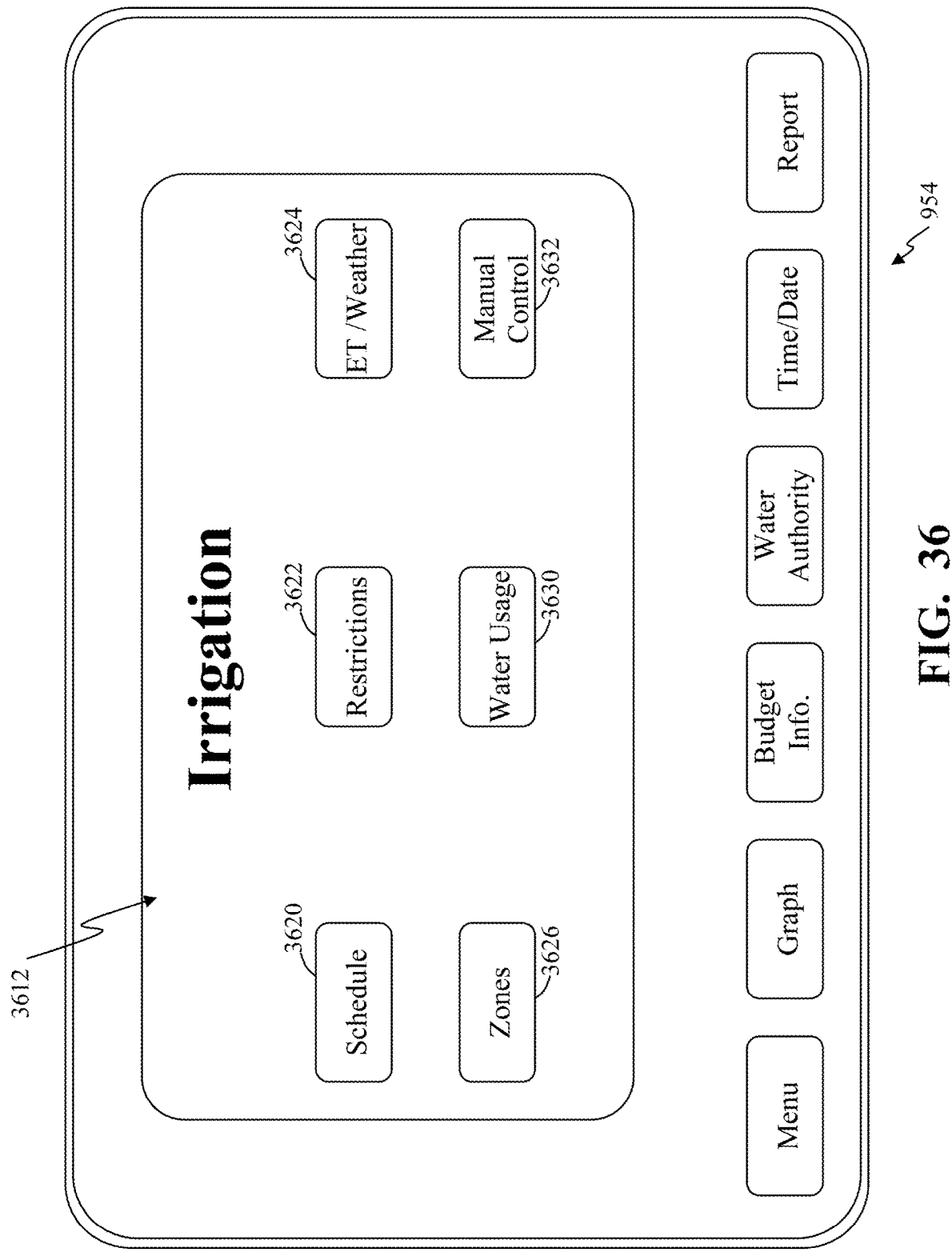
FIG. 36 depicts a simplified diagram of the display device, according to some embodiments, displaying an example of an irrigation interface.

FIG. 36 depicts a simplified diagram of the display screen 954, according to some embodiments, displaying an example of an irrigation interface 3612. As introduced above, a user option 2816 might include an irrigation option. Upon activation of this option the user may be provided with the irrigation interface 3612 that provides information about irrigation, information about an irrigation schedule, options associated with irrigation, initiating communication with an irrigation controller 130 and/or other such options. In some instances, the irrigation interface 3612 might include a plurality of options that allows the user to obtain information and/or interact with the irrigation controller. For example, the irrigation interface can include a schedule option 3620 that may allow the user to retrieve and view a current irrigation schedule, a previous irrigation schedule (e.g., a schedule before being changed by the irrigation controller in attempts to maintain the water budget) or other such schedule information. In some instances, the schedule option 3620 may allow the user to alter the irrigation schedule and/or override a schedule. A restrictions option 3622 may provide the user with information about irrigation restrictions, such as those specified by the irrigation controller, a user, a water authority or other such restrictions. An ET and/or weather option 3624 may be provided to supply the user with access to ET data and/or weather data. A zones option 3626 may be provided that allows the user to identify a zone as known by the irrigation controller and potential implement actions relative to one or more of the zones. A water usage option 3630 may provide the user with information about current, past and/or predicted water usage. A manual irrigation control option 3632 may allow the user to take manual action at the irrigation control, for example, to manually activate one or more zones, to halt active or future irrigation for one or more zones and/or other such actions. Other options may similarly be provided.

The display device 324 provides a user or property owner with information about water use. Further, the display device can receive information from the irrigation controller 130 relative to water usage, irrigation scheduling and other information and make this information available to the user. In some embodiments, the display device may further include the functionality to make some calculations and/or predictions relative to water usage based on information provided by the irrigation controller 130 and provide notification relative to the results from the calculations and/or predictions.

Figure 37:
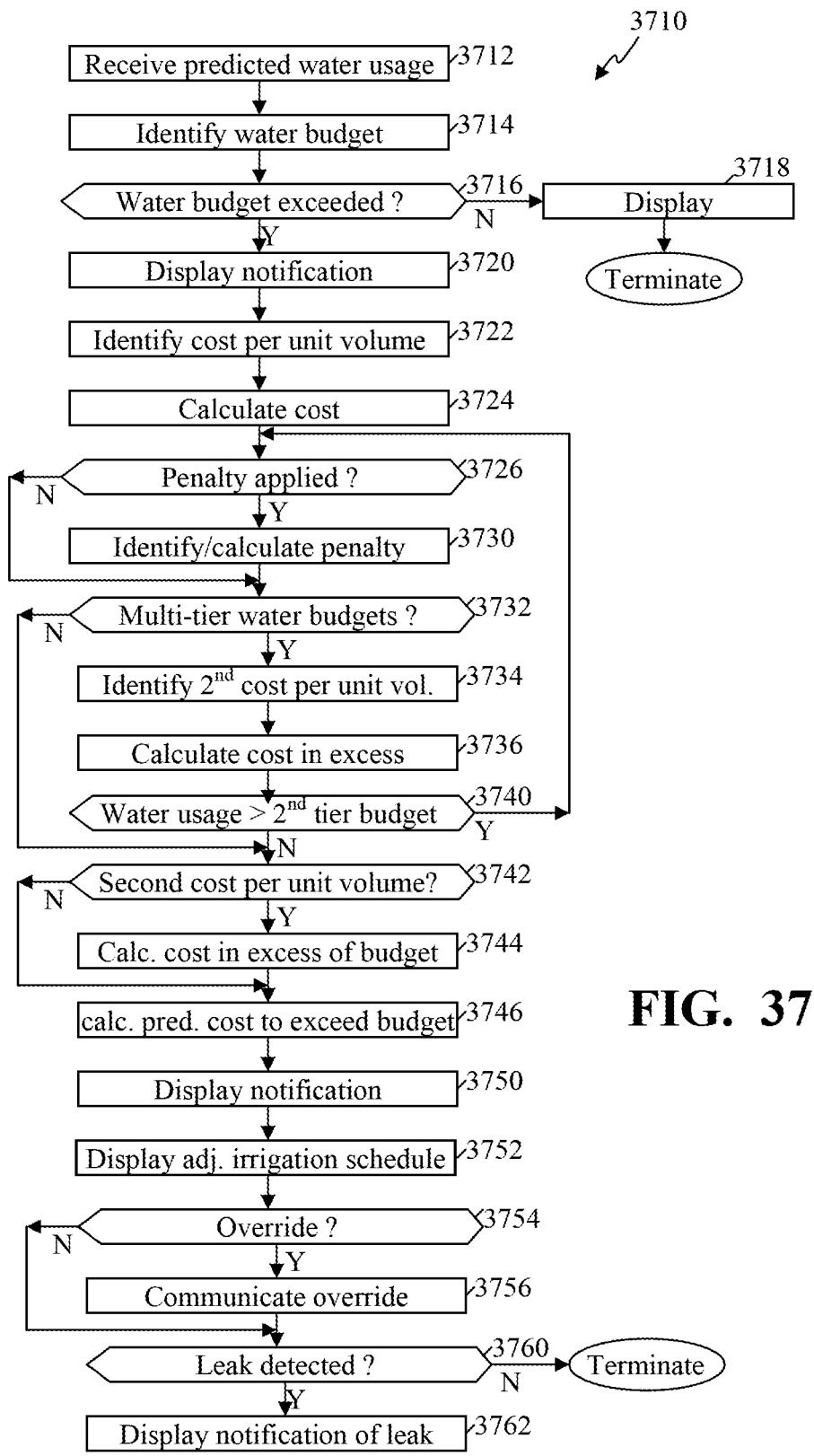
FIG. 37 depicts a simplified flow diagram of a process implemented by the display device in displaying information to a user according to some embodiments.

FIG. 37 depicts a simplified flow diagram of a process 3710 implemented by the display device in displaying information to a user according to some embodiments. In step 3712 the display device 324 receives, directly from an irrigation controller controlling irrigation at a property where water use is being determined, a predicted water usage for the given property over a current fixed budget period. In step 3714, the display device identifies a water budget specific to the property and dictating a fixed volume of water usable at the property during the fixed budget period of time. In step 3716, it is determined whether the water budget is predicted to be exceeded during the budget period. In those instances where the water budget is not predicted to be exceeded the process terminates or advances to optional step 3718 where the cost for the predicted water usage within the budget is displayed. This notification may further identify that the budget is not exceeded, may identify a predicted amount of water credits that may be obtained by the property owner should water usage continue as predicted, a potential revenue that may be obtained from such water credits (e.g., current price per water credit) and/or other such information. Alternatively, step 3720 is entered, when it has been determined that the predicted water usage is predicted to exceed the water budget, and the display device 324 displays a notification that the water usage is predicted to exceed the water budget during the budget period.

As described above, the irrigation controller 130 can, in some embodiments, provide costs and/or cost predictions relative to the water usage. Similarly, in some implementations the display device 324 may optionally further display costs associated with water usage. In step 3722, a cost per unit volume of water usage is identified. This cost per unit volume can be received from the water authority, provided by the irrigation controller, provided by the user or other such source. In step 3724, a cost to utilize the predicted water usage is calculated as a function of the cost per unit volume of water and the predicted water usage, for example, by multiplying the cost per unit volume of water by the predicted water usage.

In step 3726, it is determined whether a penalty is to be associated with exceeding the water budget. In some instances, the water authority or other entity (e.g., an association) may assess a penalty as a result of exceeding the water budget. In those instances where a penalty is not assessed, the process skips to step 3732. When a penalty is to be applied step 3730 is entered where a penalty is identified and/or calculated. For example, the penalty may be a flat charge for exceeding the budget. In other instances the penalty may be based on an amount by which the water budget is exceeded.

In step 3732, it is determined whether there are multiple tiers of water budgets to be applied. In those instances where there are not multiple tiers the process advances to step 3742. When it is determined that the water budget is one tier of a plurality of budget tiers the process continues step 3734 to identify a second cost per unit volume of water usage in excess of the water budget and less than a subsequent and higher tier water budget. In step 3736 a cost to utilize the predicted water usage in excess of the tier being evaluated and less than (or equal to) the subsequently higher tier is calculated as a function of the second cost per unit volume and the excess water usage greater than the tier budget being evaluated and less than or equal to the subsequently higher tier budget (e.g., multiplying the second cost per unit volume of water by the predicted water usage in excess of the tier water budget being evaluated). In step 3740, it is determined whether the predicted water usage is predicted to excess the subsequently higher tier water budget. In those instances where the predicted water usage is anticipated to exceed the subsequently higher tier budget the process returns to step 3726 to determine whether there is a penalty to be applied resulting from exceeding the subsequently higher budget. When the water usage is not predicted to exceed the subsequently higher tier water budget, the process continues to step 3746 to calculate the total predicted cost to exceed the one or more budgets.

In step 3742, it is determined whether there is a second cost per unit volume to be applied to water usage in excess of the water budget. In those instances where there is not a second cost per unit volume the process 3710 advances to step 3746 to calculate the total predicted cost to exceed the one or more budgets. When a second cost is to be applied step 3744 is entered when the second cost per unit volume is identified and the cost for water usage in excess of the water budget is calculated as a function of the water usage in excess of the water budget and the second cost per unit volume (e.g., multiplying the second cost per unit volume by the predicted water usage in excess of the water budget).

In step 3746, the predicted cost to exceed the water budget is calculated. This predicted cost can depend on the results of prior steps, such as whether there is a penalty, whether there are multiple tiers, whether there is a second cost per unit volume and the like. For example, the predicted cost can be the sum of the calculated cost to utilize the predicted water usage and the penalty when a penalty is applied, and no secondary cost per unit volume is to apply. Similarly, the cost can be calculated by summing the excess cost to utilize the predicted water usage (e.g., secondary cost per unit volume) with the sum of the calculated cost to utilize the predicted water usage and any penalty that may apply. In other instances the cost to utilize the predicted water usage may be calculated by multiplying the cost per unit volume of water by the predicted water usage, adding any penalties and adding the results of multiplying the second cost per unit volume of water by the predicted water usage in excess of the water budget (as well as third cost per unit volume, fourth cost per unit volume etc.).

In step 3750, the display device displays a notification about the water usage. This notification can include the predicted cost to utilize, at the property and over the budget period, the predicted water usage and exceeding the water budget, when it is determined that the predicted water usage is predicted to exceed the water budget. Some embodiments may include optional step 3752 that displays an adjusted irrigation schedule when received from the local irrigation controller that controls irrigation relative to the property where the water use is being determined. The adjusted irrigation schedule can identify adjustments that can be implemented to reduce irrigation water usage such that the predicted water usage when the adjusted irrigation schedule is implemented is not predicted to exceed the water budget. Additionally, in some embodiments, the displayed adjusted irrigation schedule can show what changes were made and/or a different between irrigation schedules.

Still further in some embodiments, the notification can further provide an override option that would instruct that the adjusted irrigation not be implemented and that instead the predicted water use in excess of the water budget should be implemented or other schedule adjustments may be defined. As such, the process 3710 may include optional step 3754 to determine whether an override has been received (e.g., based on a detection of a selection of the override option displayed). In those instances where an override is received step 3756 is entered where the display device communicates a notification to the irrigation controller regarding the override.

In step 3760 it is determined whether notification is received from the irrigation controller, that a leak is detected. In those instances where a leak has been detected step 3762 is entered where the display device further displays a notification that the leak is detected. In some implementations the displayed notification of the leak may additionally provide a predicted cost resulting due to the leak and/or a predicted water usage resulting from the leak. For example, a flow rate of the leak can be received from the irrigation controller and the cost per unit volume of water usage can be utilized to calculate a predicted cost of water usage resulting from the leak as a function of the flow rate of the leak and the cost per unit volume of water usage. Similarly, the flow rate of the leak can be used to calculate a predicted water usage over the budget period resulting from the leak as a function of the flow rate of the leak and a remainder of the budget period.

As described above, in some embodiments the irrigation controller 130 can communicate with one or more other devices to provide water usage information, irrigation schedule information, irrigation adjustment information and/or other such information. The other devices can be the separate display device 324, a separate computer, a wireless device such as a smart phone, personal digital assistant (PDA) or other such wireless device, and/or other such separate devices.

Figure 38:
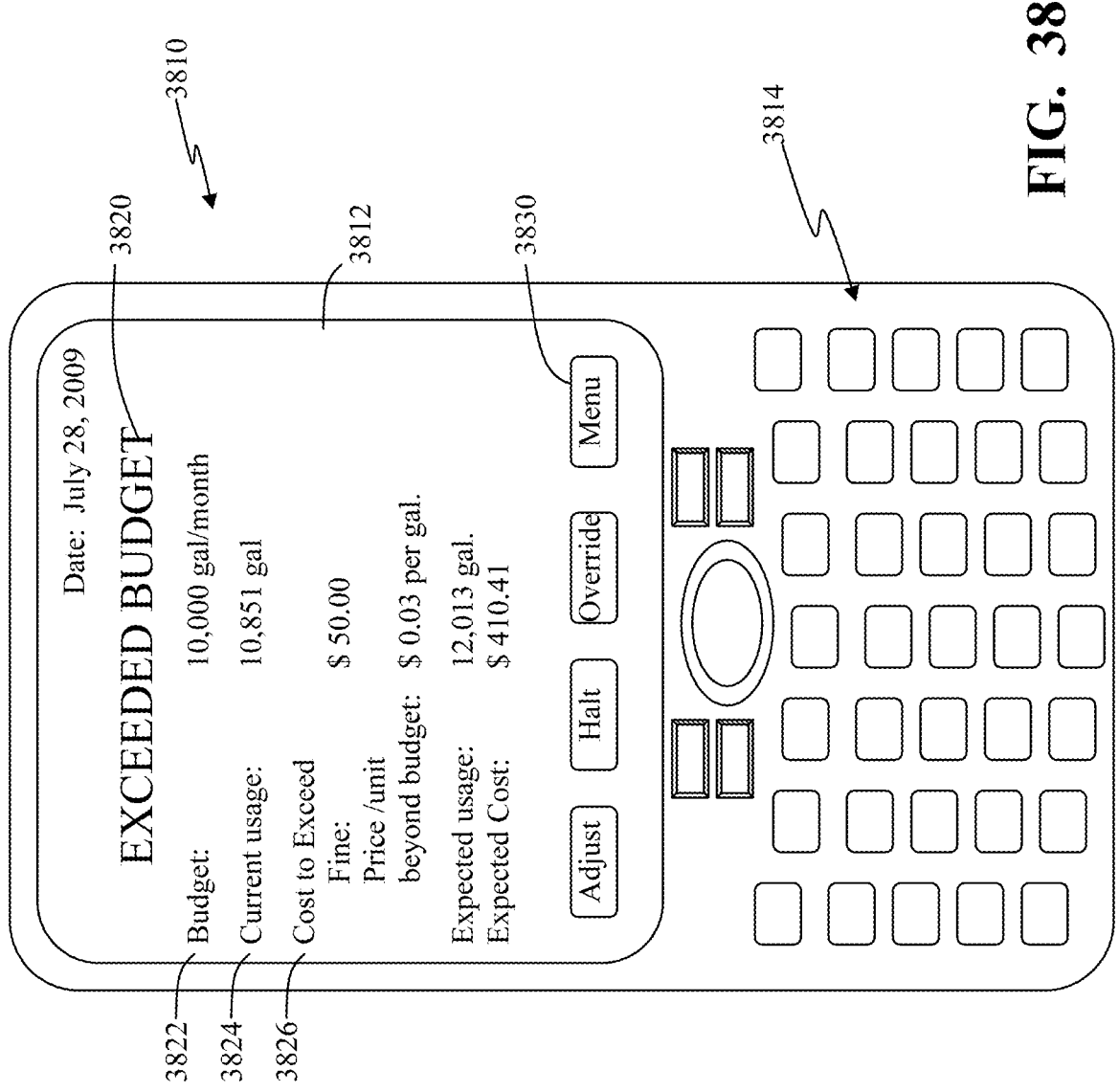
FIG. 38 depicts a simplified diagram of a smart phone displaying water usage and/or irrigation information.

FIG. 38 depicts a simplified diagram of a smart phone 3810. The smart phone includes a display 3812 and a plurality of entry buttons or options 3814. In this example, the water usage information is being displayed on the display 3812 and includes a notification 3820 that the water budget has been exceeded, along with water budget information 3822, current water usage 3824, cost information 3826 and other relevant information. Some embodiments further display additional options 3830 that can be activated by the user, similar to options 2816, such as an option to initiate and/or define adjustments to irrigation, halting irrigation, overriding the irrigation controller in adjusting and/or halting irrigation, menu option and/or other such options.

Some embodiments provide control and/or adjustments to irrigation to better utilize water delivered to plant life. Further, the control of irrigation reduces water use and better optimizes when and/or an amount of water delivered to plant life. Furthermore, the present embodiments can provide this control over irrigation in accordance with water budgets. This control can be implemented, in some embodiments, through the correlation of water usage to water runtimes. By correlating water usage to runtimes accurate runtimes can be determined to deliver a desired amount of water. Additionally or alternatively, feedback can be employed to correlate the water usage with ET data and/or sensor data to further control irrigation, and in some instances better enhance when and how much water is delivered over the budget period.

Figure 39:
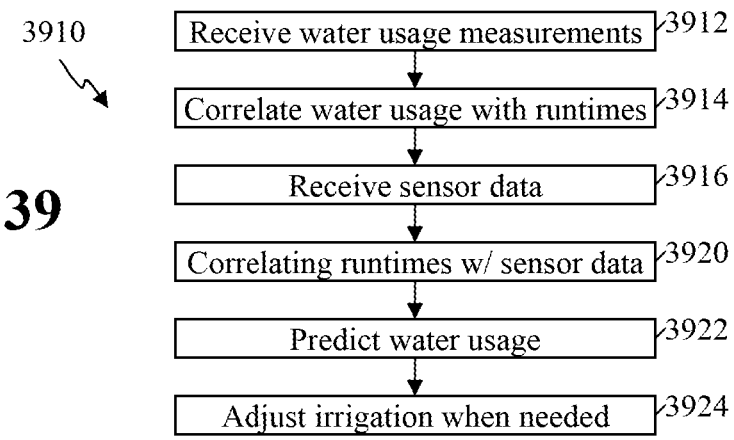
FIG. 39 depicts a simplified flow diagram of an example process of controlling irrigation through an association of water usage to irrigation timing according to some embodiments.

FIG. 39 depicts a simplified flow diagram of an example process 3910 of controlling irrigation through an association of water usage to irrigation timing according to some embodiments. The process 3910 can be utilized in cooperation with, as part of or in place of some or all of one or more of the processes of FIGS. 1-26. In part, the process 3910 provides a correlation between measured and/or calculated water use and one or more parameters used in determining whether irrigation should be implemented, irrigation runtimes, adjustments that might be implemented to irrigation and/or irrigation runtimes, or combinations thereof. In some embodiments the process 3910 is implemented by the irrigation controller 130, 622, 752, 782, or implemented by a separate device in communication with the irrigation controller.

In step 3912 water usage measurements or other relevant information are received from one or more sources, such as the meter 122, a separate meter 422, other such measurement devices or combinations of such devices. In step 3914, the measured water usage is correlated with irrigation runtimes. This correlation can include the correlation of one or more parameters used by the irrigation controller 130 in determining irrigation runtimes and/or whether adjustments to irrigation should be implemented. As one example, the measured water usage can be correlated with an irrigation time to achieve a desired water delivery, where the irrigation time is a duration when active irrigation is implemented to achieve the desired water delivery. As another example, the correlation can include correlating the measured water usage with ET data corresponding to the measured water usage.

In some implementations, the process 3910 includes optional step 3916 where sensor data is received. For example, the sensor data can be from one or more sensors 326, such as one or more soil moisture sensors, rain sensors, temperature sensors, wind sensors, humidity sensors and other such relevant sensors. In step 3920, one or more irrigation times or runtimes are determined to achieve a desired water delivery, which in some instances can include determining a time over the active irrigation until a water level within the soil is obtained, and the determined runtimes are correlated with sensor data. As another example, the determination of the irrigation time to achieve the desired water delivery can include identifying a soil moisture level prior to initiating the active irrigation, where the difference in soil moisture levels or ranges of soil moisture levels can be correlated with irrigation times.

In step 3922, predicted water usage is determined. This predicted water usage can be based on predicted weather conditions, predicted ET data, historic weather data, historic ET data and/or other such information or combinations of such information, and the correlation of water usage to ET data and/or sensor data. In step 3924, it is determined whether irrigation is to be adjusted based on the predicted water usage based, at least in part, on the correlations and the known water budget. This evaluation can be similar to those described above, where the correlation is used to determine an amount of predicted runtime and water use irrigation is adjusted as a function of the correlated measured water usage and the irrigation runtimes. For example, the adjusting the irrigation can include, when water measurement information is correlated with ET data, adjusting the irrigation as a function of predicted ET and the correlation of water usage to the ET data.

Figure 40:
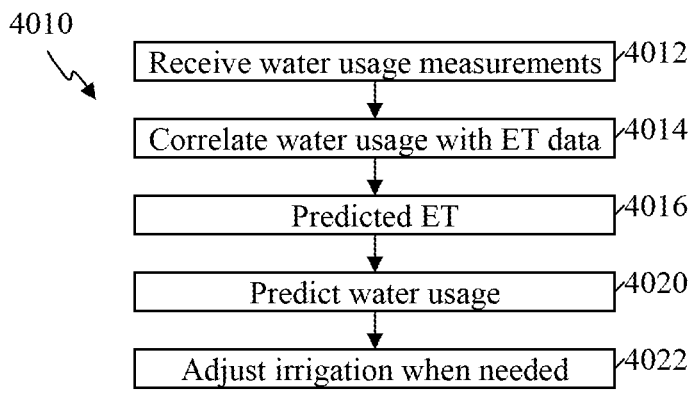
FIG. 40 depicts a simplified flow diagram of a process of controlling irrigation according to some embodiments.

FIG. 40 depicts a simplified flow diagram of a process 4010 of controlling irrigation according to some embodiments. The process 4010 can be used in cooperation with the process 3910 of FIG. 39 and/or with one or more of the process of FIGS. 12-16. In step 4012 water usage measurements are received and/or calculated. In step 4014, measured water usage is correlated with ET data that corresponds to the measured water usage. In step 4016, a predicted ET is determined. In some embodiments, the predicted ET can be predicted as a function of an ET value for a budget period. For example, the budget period can be a month, a week, a billing cycle, or other relevant periods. As a further, example, the determination of the predicted ET, in some embodiments, can include determining predicted event or daily ET values by dividing the ET value for the budget period by a number of events or days in the budget period, and the correlation of the measured water usage with the ET can include identifying a measured amount of water delivered for a previous given period, determining an ET for the given period and correlating a unit of ET to a unit of measured water.

In step 4020, predicted water usage is determined as a function of the predicted ET and the correlation between the measured water usage and the ET data. In step 4022, it is determined whether adjustments to irrigation are to be implemented based on the water budget and as a function of predicted ET and the correlation of the water usage to the ET data. For example, the adjustment to the irrigation can include predicting an amount of water use as a function of predicted event or daily ET values (e.g., when predicted by dividing the ET value for the budget by the number of events or days in the period).

As described above, some embodiments provide systems and/or methods of automatically adjusting the scheduling of an irrigation controller to adhere to a volumetric water budget. The determination of whether a volumetric budget is being adhered to and/or what adjustments might be incorporated can be implemented at an irrigation controller 130, a central irrigation controller 752, a distributed irrigation controller 782 and/or other devices or systems, including third party devices and/or systems, in communication with an irrigation controller 130 (e.g., a remote computer, a water authority 626, a remote server 630 or the like).

Figure 41:
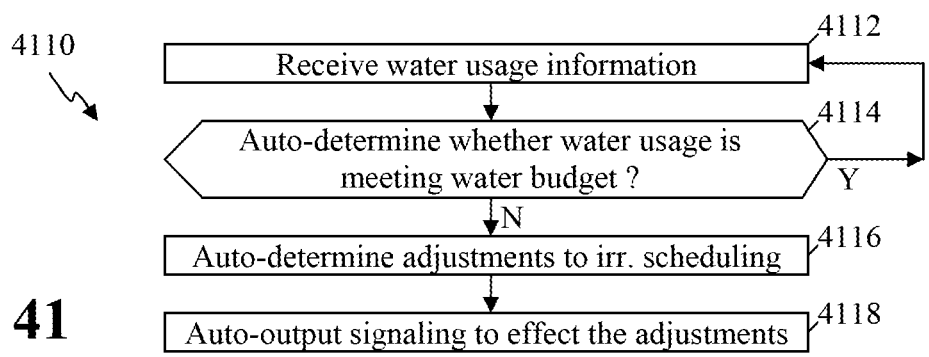
FIG. 41 depicts a simplified flow diagram of a process according to some embodiments to automatically implement irrigation as a function of a volumetric water budget.

FIG. 41 depicts a simplified flow diagram of a process 4110 according to some embodiments to automatically implement irrigation as a function of a volumetric water budget. This process 4110 may be performed by or incorporated as part of one or more of the devices, processes and/or systems described herein and/or other devices, processes or systems not specifically described herein. As such, in some embodiments adjustments to irrigation may be implemented without user interaction as a result of water usage relative to a volumetric water budget. In some cases, it is noted that user interaction may be involved in defining one or more of priorities, scheduling, budgets, budget scheduling, rates, zones, irrigation cycles, irrigation days, ET levels, limits, restrictions, flow rates, water distribution rates, precipitation levels, and other such parameters and factors, but in some embodiments adjustments are determined and implemented without user interaction. Further, the water budget typically covers water usage over multiple irrigation cycles. As understood in the art, an irrigation cycle may be series of watering events occurring sequentially in time or overlapped in time over one or more irrigation stations during a current watering period (e.g., a current day).

In step 4112 information is received corresponding to volumetric water usage at a site location having the irrigation controller. In some embodiments, the volumetric water usage corresponds to volumetric water usage from a beginning of the budget period of time to a time within the budget period of time. The water usage information, in some instances, may be information limited to water usage by an irrigation controller at the site location. In other embodiments, the water usage information may include information regarding non-irrigation water usage relative to the site location. This information may be based on measured water usage taken from one or more water meters at the site location, which may be received directly from the meter 122, from the irrigation controller 130 at the site, or received via a distributed network of water meters (e.g., through an Advanced Metering Infrastructure (AMI) network). In some instances, the water usage information may be, or may be based on, calculated or estimated usage information, such as measured flow rates and irrigation runtimes, based on irrigation runtimes and predicted flow rates for water delivery devices 134, may be based on user inputted information, and/or may be based on other such factors. In some embodiments, the information comprises or is related to volumetric water use. In some embodiments, the site location is the physical region or property location where the irrigation controller is located. In some embodiments, the term volumetric corresponds to water in terms of units of volume, e.g., gallons, liters, etc. In some embodiments, the term volumetric further corresponds to water in terms of units of volume per unit of time.

In step 4114, the received water usage information is evaluated to automatically determine whether volumetric water usage during the budget period of time will not meet or is predicted that continued volumetric water usage will not meet a volumetric water budget within a budget period of time. The evaluation can implement one or more of the processes 1310, 1410, 1510, 1610, 1710, 1810, 1870, 1910, 2010, 2110, 2210, 2610, 2650, 3910 and 4010 or other processes. Further, in some instances, the evaluation of the water usage relative to the volumetric budget period can include a determination of whether the volumetric water budget can be increased and/or altered (e.g., jumping to another tier, overriding a budget and the like). When it is determined that volumetric water usage is predicted to meet the volumetric water budget, the process returns to step 4112 to continue evaluating whether adjustments can be implemented (e.g., increase runtimes or make other adjustments since additional water budget may be available), or in some instances may optionally advance (not shown) to step 4118 where instructions or a signal are issued to continue irrigating in accordance with a current irrigation schedule (and then may return to step 4112). In other embodiments, additional evaluations may be performed to determine whether water usage can be increased, for example when water usage was previously reduced and/or a previous irrigation schedule was previously adjusted to reduce irrigation. In some instances, the process may utilize or advance to one of processes 2510, 2610 and/or 2650.

In those instances where it is predicted that the volumetric water budget is not going to be met, the process advances to step 4116 to automatically determine adjustments to irrigation scheduling in an attempt to have predicted volumetric water use adhere to the volumetric water budget. As described above, these adjustments can take on one or more of a variety of forms, which typically include something other than simply shutting down further irrigation. For example, the adjustments can include determining a budget factor that results in an across the board adjustment based on the budget factor (e.g., a percentage reduction); a budget factor for a specific zone or a plurality of specific zones; a time factor, which again may be an across the board adjustment in runtime or a time factor for one or more specific zones; a replacement irrigation schedule; adjustments to specific zones, where the adjustments may be different for each zone and not all zones may be adjusted (e.g., based on zone priorities, options and the like); and other such adjustments as described above. In some instances, the adjustments can be determined by implementing some or all of one or more of the processes 1310, 1510, 1610, 1710, 1810, 1870, 1910, 2010, 2110, 2210, 2610, 2650, 3910 and 4010 or other processes. Additionally, in some implementations, the adjustments are used to calculate an adjusted predicted volumetric water usage over the budget period of time, and the adjusted predicted volumetric water usage is evaluated relative to the volumetric water budget to confirm that adjustments are predicted to result in a volumetric water usage within the volumetric water budget. With one or more adjustments determined, the process 4110 advances to step 4118 to automatically output signaling to effect the one or more adjustments. The signaling can depend on the form of adjustment, may be direct or indirect signaling, may be internal or external signaling, communicated within an irrigation controller 130, communicated to an irrigation controller 130, communicated over a network, outputted internally to a scheduling or other relevant functional part of the irrigation controller, and/or other such signaling.

The process 4110 can be implemented at the local site or site location, such as through an irrigation controller 130, a display device 324, central irrigation controller 752, a computer or other relevant device. Alternatively or additionally, some or all of the process 4110 can be implemented by a remote device or system, such as a remote central irrigation controller 752, a distributed irrigation controller 782, a water authority 626, a third party server 630 or service, or other such devices or systems. For example, a water authority 626 may be coupled with an AMI network of distributed meters to receive water usage information for one or more sites. Based on this information, the water authority may determine whether a volumetric water budget is expected to be met or may forward the information to a third party (e.g., third party server 630) to determine whether a volumetric water budget is expected to be met. Based on the determination, the water authority (or other third party) can determine adjustments or instruct a third party to determine the adjustments. The adjustments can then be forwarded to the irrigation controller 130 at the site of interest. Further, in some instances, a third party (e.g., the water authority) may additionally consider an aggregate volumetric water use in a given geographic location, such as taking into consideration the ability of a water delivery system to simultaneously deliver water to a plurality of houses, apartments, apartment buildings, businesses, factories and/or other such commercial sites, parks, municipalities and/or other such sites, when considering whether adjustments are to be implemented (e.g., delaying activation of irrigation, time shifting the irrigation, spacing activation of different zones, and/or other such actions). Similarly, a third party device, such as a third party server 630, can be in communication with a network of meters 122, receive information from an irrigation controller 130, receive information from a display device 324 or a computer, evaluate volumetric water usage relative to volumetric water budget for a site of interest, determine adjustments to irrigation when relevant, and issue adjustments to an irrigation controller 130, 752, 782 when adjustments are to be implemented. In another example, a computer or server remote from the site of interest can receive information from a meter 122, the irrigation controller 130 at the site, the display device 324 or other relevant device (e.g., a computer at the site and in communication with a meter 122 or irrigation controller 130). The computer or server can then evaluate the use and determine adjustments when relevant, and forward those adjustments directly or indirectly to the irrigation controller 130 at the site. As such, the process 4110 provides for automated adjustments to irrigation scheduling in an attempt to optimize irrigation water usage relative to a volumetric water budget. These adjustments can be implemented without user interaction based on volumetric water usage, predicted volumetric water usage and/or estimated volumetric water usage relative to one or more volumetric water budgets. The adjustments may, in some instances, further take into considerations user defined or entered priorities, restrictions and/or other such factors in determining adjustments. Additionally, when adjustments are determined by a device or system separate from the irrigation controller 130, the system or device can receive information or be in communication with the irrigation controller 130 to receive information that can be used in determining what adjustments to implement. This information can include, but is not limited to, a number of zones being irrigated, types of delivery devices, types of plant life, priorities, water pressure, flow rates, and/or other such information that can be considered in determining adjustments.

Some embodiments, in automatically determining whether the volumetric water usage is meeting the volumetric water budget, evaluate predicted volumetric water usage. For example, a current water usage (e.g., in term of volume of water used) during the budget period of time can be determined as a function of received water usage information. A predicted water usage (e.g., in terms of water volume) during the budget period of time can then be calculated as a function of the determined current water usage as well as intended or predicted irrigation at the property or irrigation site during a remainder of the budget period of time. The predicted water usage for the budget period of time can then automatically be evaluated to determine whether the predicted water usage for the budget period of time is predicted to exceed the volumetric water budget during the budget period of time. In those instances where the predicted water usage is predicted not to exceed the volumetric water budget, adjustments to irrigation are not implemented. Alternatively, a signal is automatically outputted to initiate adjusting (at an irrigation controller that controls irrigation over at least part of the property or irrigation site to be irrigated without user interaction) irrigation and water usage during the budget period of time. As such an adjusted predicted water usage over the budget period of time (e.g., which can be calculated as a function of the determined current water usage and the adjusted irrigation) is predicted not to exceed the volumetric water budget during the budget period of time.

Again, the evaluation of the current volumetric water usage and/or predicted volumetric water usage can be implemented local at the property where irrigation is being controlled, such as through an irrigation controller 130, a display device 324, central irrigation controller 752, a computer or other relevant device or combination of such devices. Alternatively or additionally, predicted volumetric water usage and/or evaluating volumetric water usage or predicted volumetric water usage can be implemented by a remote device or system, such as a remote central irrigation controller 752, a distributed irrigation controller 782, a water authority 626, a third party server 630 or service, or other such devices or systems. Further, the determination of whether a volumetric water usage might exceed a volumetric water budget and/or adjustments relative to maintaining volumetric water usage relative to one or more volumetric water budgets can be implemented without user interaction, and in many instances is based on volumetric water usage, predicted volumetric water usage and/or estimated volumetric water usage relative to one or more volumetric water budgets.

Additionally, some embodiments identify one or more irrigation events, corresponding to the property or irrigation site, during a remainder of the water budget period of time, where an irrigation event is an event identified in which irrigation is predicted to be activated. In some embodiments, the budget period of time extends over multiple irrigation cycles. Based on the predicted irrigation events, an irrigation event predicted irrigation water usage can be calculated for each of the identified one or more irrigation events. A summation of the irrigation event predicted volumetric irrigation water usage of each of the identified one or more irrigation events can be determined or calculated.

A predicted water usage (e.g., in terms of water volume) can then be determined as a function of the received water usage information and the sum of the irrigation event predicted irrigation water usage. With the predicted volumetric water usage, it can be determined whether the predicted volumetric water usage is predicted to exceed the volumetric water budget during the water budget period. In those instances where predicted water usage it is not predicted to exceed the volumetric water budget, no adjustments are needed based on the current evaluation. Alternatively, when it is predicted that the volumetric water budget may be exceeded, a signal is outputted to initiate adjustments, at the irrigation controller, of irrigation for one or more of the irrigation events when the predicted water usage is predicted to exceed the volumetric water budget during the water budget period. Again, some or all of the calculations and/or evaluations can be implemented local at the irrigation site or property where irrigation is being controlled, such as through an irrigation controller 130, a display device 324, central irrigation controller 752, a computer or other relevant device or combination of such devices. Alternatively or additionally, some or all of the calculations and/or evaluations can be implemented by a remote device or system, such as a remote central irrigation controller 752, a distributed irrigation controller 782, a water authority 626, a third party server 630 or service, or other such devices or systems. Further, the determination of whether a water budget might exceed a water budget and/or adjustments relative to maintaining water usage relative to one or more water budgets can be implemented without user interaction, and typically is based on volumetric water usage, predicted volumetric water usage and/or estimated volumetric water usage relative to one or more volumetric water budgets.

The following generally describes one or more embodiments. It is understood that the invention is not limited to only these embodiments. Some embodiments provide methods of controlling irrigation that identify a budget period of time and identify a water budget dictating a fixed volume of water that can be used during the budget period of time. Further, a measured water usage corresponding to water usage on a property where irrigation is to be controlled is receive, for example, received from a water meter. A current water usage is determined during the budget period of time from the measured water usage. A predicted water usage during the budget period of time is calculated, for example at the irrigation controller, as a function of the current water usage and intended irrigation at the property during a remainder of the budget period of time. It is determined, at the irrigation controller, whether the predicted water usage is predicted to exceed the water budget during the budget period of time. Adjustments are implemented, at the irrigation controller without user interaction, to irrigation and water usage during the budget period of time such that the predicted water usage over the budget period of time, calculated as a function of the current water usage and the adjusted irrigation, is predicted not to exceed the water budget during the budget period of time.

In some instances, the measured water usage is received from a local water meter present on the property where irrigation is to be controlled. Further, some embodiments determine, from the measured water usage, non-irrigation water usage, and the calculating of the predicted water usage comprises: predicting non-irrigation water usage; predicting irrigation water usage; and summing the predicted non-irrigation water usage and the predicted irrigation water usage. Additionally or alternatively, the predicting the irrigation water usage can comprises identifying one or more predicted irrigation events where an irrigation event is an event identified in which irrigation is predicted to be activated; and predicting irrigation water usage for each of the one or more identified predicted irrigation events; and summing the predicted irrigation water usage for the one or more identified predicted irrigation events.

Furthermore, in some embodiments the identification of the one or more predicted irrigation events can comprise: predicting evapotranspiration (ET) values that correspond to one or more days potential irrigation events remaining in the budget period of time; and determining, for each of the one or more potential irrigation events remaining in the budget period of time and from the predicted ET values corresponding to the one or more potential irrigation events, whether irrigation is to be activated. Similarly, some embodiments communicate a notification to a display device that the irrigation is to be adjusted, where the display device is separate from an irrigation controller that implements and controls irrigation including the adjusting the irrigation such that the predicted water usage over the budget period of time based on the adjustments does not exceed the water budget during the budget period of time. Further, the communication of the notification can comprise providing a predicted cost to exceed the water budget.

Other embodiments provide methods for use in irrigation control that receive, from a local water meter corresponding to a property where irrigation is to be controlled by an irrigation controller, a volume water use measurement at the property; determine, at the irrigation controller, a predicted volume water use for a remainder of a water budget time period; determine, using at least the volume water use measurement and the predicted volume water use, if actual water use during the water budget time period will exceed an allowable water budget corresponding to the water budget time period; and automatically adjust, in the event the actual water use will exceed the allowable water budget, irrigation during the remainder of the water budget time period to ensure that the actual water use will not exceed the allowable water budget.

Still other embodiments providing methods of controlling irrigation identify a water budget period; identify a water budget for the water budget period; receive, at an irrigation controller controlling irrigation at a property, a water usage; identify one or more irrigation events during a remainder of the water budget period, where an irrigation event is an event identified in which irrigation is predicted to be activated; calculate an irrigation event predicted irrigation water usage for each of the identified one or more irrigation events; sum the irrigation event predicted irrigation water usage of each of the identified one or more irrigation events; determine a predicted water usage as a function of the current water usage and the sum of the irrigation event predicted irrigation water usage; determine, at the irrigation controller, whether the predicted water usage is predicted to exceed the water budget for the water budget period; and adjust, at the irrigation controller, irrigation to be implemented on one or more of the one or more irrigation events when the predicted water usage is predicted to exceed the water budget for the water budget period.

Some embodiments further determine a predicted daily non-irrigation water usage; and calculate a predicted non-irrigation water usage as a function of the predicted daily non-irrigation water usage and a remainder of potential irrigation events during the remainder of the water budget period; wherein the determination of the predicted water usage comprises determining the predicted water usage as a function of the current water usage, the sum of the predicted irrigation water usage and the predicted non-irrigation water usage. Further, in some instances, the adjustments to the irrigation can comprise identifying an excess water usage as a function of the water budget and the predicted water usage, where the excess water usage is an amount of water predicted to be used in excess of the water budget; identifying a distribution of the excess water usage over the identified one or more predicted irrigation events; and adjusting, for each predicted irrigation event where the identified distribution of the excess water dictates adjustments, predicted runtimes for one or more irrigation zones such that the predicted irrigation water usage is reduced by the identified distributed excess water for the given predicted irrigation event. Additionally, the identifying the distribution of the excess water usage over the identified one or more predicted irrigation events can comprise: identifying priorities of irrigation zones; and distributing the excess water usage as a function of the priorities of the irrigation zones.

Additionally or alternatively, some embodiments that provide methods of controlling irrigation identify a budget period of time; identify a water budget dictating a fixed volume of water usable during the budget period of time; receive, from a local water meter present on a property where irrigation is to be controlled, a measured water usage; determine a current water usage during the budget period from the measured water usage; determine whether the current water usage exceeds the water budget for the budget period; and generate a notification that the water budget is exceeded. In some implementations, these methods further calculate, in response to determining that the water usage does not exceed the water budget for the budget period, a predicted water usage during the budget period as a function of the current water usage; determine whether the predicted water usage is greater than the water budget during the budget period; and generate a notification that the water budget is predicted to be exceeded. Further, the generating the notification that the water budget is predicted to be exceeded can comprise providing a predicted cost to exceed the water budget. The identification of the water budget can, in some embodiments, further comprise: identifying a specified cost budget defining a cost for water usage over the budget period; identifying a cost per unit volume of water; and calculating the water budget from the cost budget and the cost per unit volume.

Some embodiments also provide methods for use in irrigation control, where these methods receive, from a local water meter corresponding to a property where irrigation is to be controlled, a volume water use measurement at the property; determine, using at least the volume water use measurement, if actual water use during a water budget time period will exceed an allowable water budget corresponding to the water budget time period; and generate, in the event the actual water use will exceed the allowable water budget, a notification that the allowable water budget will be exceeded.

Other embodiments similarly provide methods of providing water usage information. These methods comprise: receiving, from a local water meter at a given property where water use is being evaluated, a measured water usage; predicting, from a current time to an end of a budget period, irrigation water usage over a remainder of the budget period; predicting, from the current time, a non-irrigation water usage over the remainder of the budget period; and calculating a predicted water usage over the budget period as a function of the measured water usage, the predicted irrigation water usage and the predicted non-irrigation water usage.

Further, the predicting of the irrigation water usage can include: identifying one or more irrigation days during a remainder of the budget period, where an irrigation day is a day identified in which irrigation is predicted to be activated; calculating an irrigation day predicted irrigation water usage for each of the identified one or more irrigation days; and summing the irrigation day predicted irrigation water usage of each of the identified one or more irrigation days. Additionally or alternatively, the predicting the non-irrigation water usage can comprise: determining a predicted daily non-irrigation water usage; and calculating a predicted non-irrigation water usage as a function of the predicted daily non-irrigation water usage and a remainder of days during the remainder of the budget period. In other embodiments the predicting the irrigation water usage comprises: detecting that water usage after irrigating a first zone is greater than a predicted irrigation water usage of the first zone; and subtracting an amount in excess from the predicted irrigation water usage.

Still further, some embodiments include methods of providing water usage information, comprising: receiving, at a display device and directly from an irrigation controller controlling irrigation at a property where water use is being determined, a predicted water usage for the given property over a fixed budget period; identifying a water budget specific to the property and dictating a fixed volume of water usable at the property during the fixed budget period of time; displaying a notification, through the display device and when it is determined that the predicted water usage is predicted to exceed the water budget, that the water usage is predicted to exceed the water budget during the budget period; and displaying a predicted cost in utilizing, at the property and over the budget period, the predicted water usage and exceeding the water budget, when it is determined that the predicted water usage is predicted to exceed the water budget.

The displaying of the predicted cost can comprise: identifying a cost per unit volume of water usage; calculating a cost to utilize the predicted water usage by multiplying the cost per unit volume of water by the predicted water usage; determining a penalty associated with exceeding the water budget; and summing the calculated cost to utilize the predicted water usage and the penalty. Additionally or alternatively, the displaying the predicted cost can comprise: determining whether there is a second cost per unit volume to be applied to water usage in excess of the water budget; calculating an excess cost to utilize the predicted water usage by multiplying the second cost per unit volume by the predicted water usage in excess of the water budget; and summing the excess cost to utilize the predicted water usage with the sum of the calculated cost to utilize the predicted water usage and the penalty. In some instances, the displaying the predicted cost comprises: determining whether the water budget is a first tier of a plurality of budget tiers; detecting that the predicted water usage at the property is predicted to exceed a second tier water budget during the budget period of time; identifying a second cost per unit volume of water usage in excess of the water budget and less then the second tier water budget; and calculating the cost to utilize the predicted water usage by multiplying the cost per unit volume of water by the predicted water usage and adding the results with the results of multiplying the second cost per unit volume of water by the predicted water usage in excess of the water budget.

Other embodiments provide methods of controlling water usage that comprise: predicting, at an irrigation controller that controls irrigation over a give property, a water usage over a selected period of time, where the predicting comprises predicting prior to the selected period of time; determining, at the irrigation controller, water usage over the selected period of time; determining, at the irrigation controller, whether the determined water usage has a threshold difference from the predicted water usage over the selected period of time; and generating a notification that a leak is detected.

Further, the determining the water usage over the selected period of time can comprise determining the water usage while irrigation is not active. Additionally or alternatively, the determining the water usage can comprise detecting a consistent water usage over multiple different periods of time, including the selected period of time. In some instances, determining water usage over the selected period of time can comprise: determining water usage during an irrigation of a zone; determining that the water usage during irrigation of the zone exceeds a predicted water usage for the irrigation zone; and determining whether a difference between the water usage during the irrigation of the zone and a predicted water usage for the irrigation zone is consistent with a previously measured difference between a previous water usage during a previous irrigation of the zone and the predicted water usage.

Further embodiments include methods of controlling costs relative to water usage. Some of these embodiments comprise: identifying a budget period of time; identifying a water budget dictating a fixed volume of water usable during the fixed budget period of time; receiving, at an irrigation controller configured to control irrigation over a given property, a measured water usage of water used at the property; determining, at the irrigation controller, a water usage over the budget period as a function of the received measured water usage; determining whether the water usage over the budget period is less than the water budget; determining an amount of unused water as a function of the water budget and the water usage when the water usage over the budget period is less than the water budget; and obtaining a monetary benefit proportional to the determined unused water.

In some implementations, the obtaining the monetary benefit proportional to the determined unused water comprises selling the unused water. Additionally, in some instances, the selling the unused water can additionally comprise obtaining credits for each volume of unused water, and selling the credits to a third party. Obtaining the monetary benefit proportional to the determined unused water can further comprise receiving a reduction in cost for the water usage over the budget period. Alternatively or additionally, receiving the reduction is the cost for the water usage over the budget period comprises receiving a reduction in cost at a first rate per unit volume of unused water that is greater than a cost at a second rate per unit volume of the water usage over the budget period. Some embodiments, in obtaining the monetary benefit proportional to the determined unused water further receive an increase in a subsequent water budget proportional to the determined unused water.

Some embodiments provide methods of controlling costs relative to water usage, comprising: receiving a notification that water usage at a property was less than a volumetric water budget during a budget period; receiving information identifying an amount of under used water relative to the water budget as a result that the water usage at the property was less than the water budget during the budget period; and obtaining a monetary benefit proportional to the determined under used water. Further, some of these embodiments in obtaining the monetary benefit proportional to the determined under used water comprise selling the under used water. Additionally or alternatively, the selling of the under used water can comprise obtaining credits for each volume of under used water, and selling the credits to a third party.

Still further embodiments include methods of controlling irrigation. These methods comprise: receiving water usage measurements; correlating, at the irrigation controller, the measured water usage with irrigation runtimes; predicting water usage as a function of the correlated measured water usage and the irrigation runtimes; and determining whether adjustments to irrigation are needed as a function of the predicted water usage. The correlating, in some implementations, further comprises: correlating the measured water usage with evapotranspiration (ET) data corresponding to the measured water usage; and the predicting the water usage further comprises predicting the water usage as a function of predicted ET and the correlation of water usage to the ET data. Additionally or alternatively, the correlating can further comprise: correlating the measured water usage with an irrigation time to achieve a desired water delivery, where the irrigation time is duration where active irrigation is implemented to achieve the desired water delivery.

In some of these embodiments, the methods further comprise: receiving sensor data; and the predicting the water usage comprises predicting the irrigation time to achieve the desired water delivery comprises determining a time over the active irrigation until a water level within soil is obtained. Further, the receiving sensor data may include receiving soil moisture data. The predicting the irrigation time to achieve the desired water delivery, in some embodiments, further comprises: identifying a soil moisture level prior to initiating the active irrigation; and the correlating the measured water usage with the irrigation time comprises correlating difference in soil moisture levels with the irrigation time. Further, in some implementations, the correlating the measured water usage comprises correlating a range of soil moisture levels with an irrigation time. Additionally or alternatively, the correlating can comprise: correlating the measured water usage with an irrigation time to achieve a desired water delivery, where the irrigation time is a duration where active irrigation is implemented to achieve the desired water delivery. Other embodiments further comprise: receiving sensor data; and predicting the irrigation time to achieve the desired water delivery comprises determining a time over the active irrigation until a water level within the soil is obtained.

Additional embodiments provide methods of controlling irrigation. These embodiments comprise: receiving water usage measurements; correlating measured water usage with evapotranspiration (ET) data that corresponds to the measured water usage; predicting water usage as a function of the correlated measured water usage and the ET data; and determining whether adjustments to irrigation are needed as a function of the predicted water usage. The predicting of the water usage, in some instances, comprises predicting an ET value as a function of an ET value for a budget period. The budget period, in some embodiments, is a month. Further, the predicting the ET value, in some embodiments, comprises determining predicted daily ET values by dividing the ET value for the budget period by a number of days in the budget period; and predicting the water usage as a function of one or more of the predicted daily ET values. In some implementations, the correlating the measured water usage with the ET comprises: identifying a measured amount of water delivered for a previous given period; determining an ET for the given period; and correlating a unit of ET to a unit of measured water. Further, some embodiments additionally comprise: receiving sensor data; determining a time to achieve a desired water delivery, where the time is measured from an initiation of irrigation for a given geographic region until the irrigation is terminated.

Alternatively or additionally, some embodiments further comprise: receiving sensor data; determining a time to achieve a desired water delivery, where the time is measured when active irrigation is implemented to achieve the desired water delivery at a given geographic region; determining a measured water usage as a function of the time to achieve the desired water delivery; and correlating the measured water usage with the sensor data. In some embodiments, the receiving sensor data comprises receiving soil moisture data; the time to achieve the desired water delivery is measured during the active irrigation until a water level within the soil is obtained; and the correlating the measured water usage with the sensor data comprises correlating difference in soil moisture levels with the irrigation time. Further, the geographic region can comprise one or more of: an irrigation zone; a region proximate a soil sensor; and a region having soil conditions substantially the same as soil conditions of a region proximate a soil sensor.

Other embodiments provide methods of controlling irrigation, comprising: receiving water usage measurements; correlating measured water usage with an irrigation time to achieve a desired water delivery, where the irrigation time is a duration where active irrigation is implemented to achieve the desired water delivery; and adjusting irrigation as a function of the correlated measured water usage and the irrigation runtimes. Some of these embodiments further comprise: receiving sensor data; and determining the irrigation time to achieve the desired water delivery comprises determining a time over the active irrigation until a water level within the soil is obtained. The receiving sensor data, in some instances, comprises receiving soil moisture data. Further, the determination of the irrigation time to achieve the desired water delivery can further comprise identifying a soil moisture level prior to initiating the active irrigation; and the correlating the measured water usage with the irrigation time can comprise correlating the difference in soil moisture levels with the irrigation time. In some embodiments, the correlating the measured water usage comprises correlating a range of soil moisture levels with an irrigation time. Additionally or alternatively, the irrigation time can comprise a sum of two or more irrigation runtimes separated by a non-active irrigation time where irrigation was not active.

Some embodiments provide systems, processes and/or methods of controlling irrigation. In some embodiments, methods are provided that identify a budget period and a water budget; receive a measured water usage from a meter; determine a current water usage during the budget period; calculate a predicted water usage during the budget period; determine whether the predicted water usage is predicted to exceed the water budget during the budget period; and adjust irrigation to reduce water usage during the budget period such that the predicted water usage over the budget period is predicted not to exceed the water budget during the budget period.

Several embodiments provide methods of controlling irrigation, at least in part, by identifying a water budget dictating a fixed volume of water that can be used during the budget period of time; receiving a water usage corresponding to water usage on a property where irrigation is to be controlled; determining a current water usage during the budget period of time as a function of the received water usage; calculating a predicted water usage during the budget period of time as a function of the determined current water usage and intended irrigation at the property during a remainder of the budget period of time; determining whether the predicted water usage is predicted to exceed the water budget during the budget period of time; and outputting a signal to initiate adjusting, at an irrigation controller that controls irrigation over at least part of the property to be irrigated without user interaction and in response to determining that the predicted water usage is predicted to exceed the water budget during the budget period of time, irrigation and water usage during the budget period of time such that an adjusted predicted water usage over the budget period of time, calculated as a function of the determined current water usage and the adjusted irrigation, is predicted not to exceed the water budget during the budget period of time.

Other embodiments provide methods of controlling irrigation by identifying a water budget period; identifying a water budget for the water budget period; receiving a water usage for a property where irrigation is to be controlled by an irrigation controller; identifying, corresponding to the property, one or more irrigation events during a remainder of the water budget period, where an irrigation event is an event identified in which irrigation is predicted to be activated; calculating an irrigation event predicted irrigation water usage for each of the identified one or more irrigation events; summing the irrigation event predicted irrigation water usage of each of the identified one or more irrigation events; determining a predicted water usage as a function of the received water usage and the sum of the irrigation event predicted irrigation water usage; determining whether the predicted water usage is predicted to exceed the water budget during the water budget period; and outputting a signal to initiate adjusting, at the irrigation controller, irrigation to be implemented on one or more of the one or more irrigation events when the predicted water usage is predicted to exceed the water budget during the water budget period.

While the invention herein disclosed has been described by means of specific embodiments, examples and applications thereof, numerous modifications and variations could be made thereto by those skilled in the art without departing from the scope of the invention set forth in the claims.

What is claimed is:

1. A method of controlling irrigation, the method comprising:
   receiving, at a central irrigation controller that is communicatively coupled over a distributed communication network with each of multiple different irrigation systems that are each remote and geographically distributed at one of multiple different site locations and each of the irrigation systems comprising an irrigation controller configured to control one or more valves at the respective site location and to implement a respective irrigation schedule to control irrigation at the respective site location, water usage information corresponding to a first volumetric water usage at the respective site location, wherein the first volumetric water usage corresponds to volumetric water usage at the respective site location from a beginning of a budget period of time to a first time within the budget period of time;
   determining automatically, by the central irrigation controller, whether a volumetric water budget at the respective site location is predicted to be met for the budget period of time based on at least the first volumetric water usage;
   determining automatically, by the central irrigation controller in the event of predicting the volumetric water budget will not be met, an adjustment to the irrigation to be implemented by the respective irrigation controller, wherein the adjustment comprises a reduction of runtimes of a plurality of remaining irrigation events scheduled to occur during the budget period of time such that the adjustment substantially spreads a compensation for an amount of water usage that is predicted to exceed the volumetric water budget over the plurality of remaining irrigation events; and
   communicating, from the central irrigation controller, instructions to modify the irrigation schedule implemented by the respective irrigation controller in controlling irrigation at the irrigation site to effect the adjustment.

2. The method of claim 1 wherein the receiving step comprises:
   receiving, at the central irrigation controller, the water usage information taken by a water meter at the respective site location and corresponding to the first volumetric water usage at the respective site location having the irrigation controller.

3. The method of claim 1 wherein the budget period of time spans multiple irrigation cycles implemented by the irrigation controller at the respective site location.

4. The method of claim 3, wherein the first volumetric water usage during the budget period of time comprises an accumulation of volumetric water usage at least from two or more of the multiple irrigation cycles.

5. The method of claim 1, communicating, by the central irrigation controller, the water usage information to a separate water authority system associated with a municipal water authority that supplies water to the first site location.

6. The method of claim 1 further comprising:
   determining automatically, by the central irrigation controller, a predicted volumetric water usage at the respective site location, the predicted volumetric water usage is based at least on the first volumetric water usage and a second volumetric water usage predicted for a remainder of the budget period of time;
   wherein the determining automatically whether the volumetric water budget at the respective site location is predicted to be met step comprises:
   determining automatically whether the volumetric water budget at the respective site location is predicted to be met for the budget period of time based on at least the predicted volumetric water usage.

7. The method of claim 1, wherein the receiving the water usage information comprises receiving user inputted information used to determine the water usage information.

8. The method of claim 1, wherein the water usage information is based on known water flow rate information corresponding to one or more irrigation components at the site location.

9. The method of claim 1, further comprising:
   communicating, by the central irrigation controller, a notification to a user associated with the respective site location that the irrigation is to be adjusted.

10. The method of claim 9, wherein the communicating the notification comprises providing a predicted cost to exceed the water budget.

11. The method of claim 1, further comprising causing information corresponding to the adjustment to be displayed on a display that is part of the irrigation controller.

12. The method of claim 1, wherein the communicating the notification comprises communicating the notification to a display device associated with the customer and is separate from the irrigation controller.

13. The method of claim 1, further comprising communicating, by the central irrigation controller, information relevant to the first volumetric water usage at the site location to a display causing the information relevant to the first volumetric water usage to be displayed.

14. A system to control irrigation at multiple different irrigation site locations, comprising:
   a processor of a central irrigation controller;
   a transceiver coupled with the processor and one or more communication networks, wherein the transceiver is configured to provide communication between the central irrigation controller and multiple irrigation controllers each at one of the multiple different site locations that are geographically distributed, and wherein the central irrigation controller is separate from the irrigation controllers and each of the irrigation controllers is configured to control the operation of one or more valves distributed over the respective site location in accordance with an irrigation schedule implemented by the respective irrigation controller; and a memory, of the central irrigation controller, that stores executable program code, wherein the processor is configured to execute the executable program code to:

receive water usage information corresponding to a first volumetric water usage at a first site location of the multiple site locations having a first irrigation controller of the multiple irrigation controllers, wherein the first volumetric water usage corresponds to volumetric water usage at the first site location from a beginning of a budget period of time to a first time within the budget period of time;

determine automatically whether a volumetric water budget at the first site location is predicted to be met for the budget period of time based on at least the first volumetric water usage, the volumetric water budget for use at the first site location during the budget period of time;

determine automatically, in the event of predicting the volumetric water budget will not be met, an adjustment to irrigation to be implemented by the first irrigation controller, wherein the adjustment comprises a reduction of runtimes of a plurality of remaining irrigation events scheduled to occur during the budget period of time such that the adjustment substantially spreads a compensation for an amount of water usage that is predicted to exceed the volumetric water budget over the plurality of remaining irrigation events; and communicate instructions to modify the irrigation schedule, wherein the instructions provide changes to be made by the first irrigation controller to implement the modification to the irrigation schedule to control the opening and closing of the one or more valves at the first site location coupled with the first irrigation controller in controlling water released through water delivery devices fluidly coupled with a corresponding one of the one or more valves in controlling irrigation at the first irrigation site to effect the adjustment.

15. The system of claim 14, wherein the budget period of time spans multiple irrigation cycles implemented by the first irrigation controller.

16. The system of claim 14 wherein the processor is configured to receive the water usage information, wherein the water usage information is taken by a water meter at the first site location and corresponding to the first volumetric water usage at the first site location having the first irrigation controller.

17. The system of claim 14, wherein the processor is further configured to execute the executable program code to:

determine automatically a predicted volumetric water usage at the first site location, the predicted volumetric water usage is based at least on the first volumetric water usage and a second volumetric water usage predicted for a remainder of the budget period of time;

wherein the processor is further configured to determine automatically whether the volumetric water budget at the first site location is predicted to be met for the budget period of time based on at least the predicted volumetric water usage.

18. The system of claim 14, further comprising:

a display device communicatively coupled with the processor, wherein the display device is configured to display information corresponding to the first volumetric water usage.

19. The system of claim 14, wherein the processor is further configured to cause the communication of the water usage information to a separate water authority system associated with a municipal water authority that supplies water to the first site location.

20. The system of claim 14, wherein the processor is configured to cause a notification to be communicated through the transceiver to a user associated with the first site location that the irrigation is to be adjusted.

21. The system of claim 20, wherein the processing, in causing the communication of the notification, is configured to communicate the notification to a display device associated with the user, wherein the display device is separate from the first irrigation controller and the central irrigation controller.

* * * * *